US011209576B2

(12) United States Patent
Patscheider et al.

(10) Patent No.: US 11,209,576 B2
(45) Date of Patent: Dec. 28, 2021

(54) TEMPERATURE DRIFT COMPENSATION FOR LIQUID LENSES

(71) Applicant: OPTOTUNE CONSUMER AG, Dietikon (CH)

(72) Inventors: Roman Patscheider, Winterthur (CH); David Niederer, Kuttigen (CH); Pit Gebbers, Glattbrugg (CH); Daniel Borer, Schlieren (CH); Christopher Laning, Windisch (CH); Stephan Smolka, Zurich (CH)

(73) Assignee: OPTOTUNE AG, Dietikon (CH)

( * ) Notice: Subject to any disclaimer, the term of this patent is extended or adjusted under 35 U.S.C. 154(b) by 171 days.

(21) Appl. No.: 15/737,287

(22) PCT Filed: Jun. 17, 2016

(86) PCT No.: PCT/EP2016/064098
§ 371 (c)(1),
(2) Date: Dec. 17, 2017

(87) PCT Pub. No.: WO2016/203029
PCT Pub. Date: Dec. 22, 2016

(65) Prior Publication Data
US 2018/0136372 A1    May 17, 2018

(30) Foreign Application Priority Data

Jun. 17, 2015   (WO) ................. PCT/EP2015/063662

(51) Int. Cl.
*G02B 3/12*    (2006.01)
*G02B 1/06*    (2006.01)
(Continued)

(52) U.S. Cl.
CPC ............... *G02B 3/14* (2013.01); *G02B 7/028* (2013.01); *G02B 26/004* (2013.01)

(58) Field of Classification Search
None
See application file for complete search history.

(56) References Cited

U.S. PATENT DOCUMENTS

| 6,188,526 B1 | 2/2001 | Takanari et al. |
| 2012/0081795 A1 | 4/2012 | Seung-Tae et al. |

(Continued)

FOREIGN PATENT DOCUMENTS

| CN | 102150063 A | 8/2011 |
| CN | 103454705 A | 12/2013 |

(Continued)

OTHER PUBLICATIONS

CTE of Water titled as "Properties of Distilled Water" downloaded on Aug. 5, 2020 from the engineering fundamentals website https://www.efunda.com/materials/common_matl/show_liquid.cfm?MatlName=WaterDistilled4 (Year: 2020).*

*Primary Examiner* — Darryl J Collins
(74) *Attorney, Agent, or Firm* — JMB Davis Ben-David

(57) ABSTRACT

The invention relates to a lens, comprising a container (100) defining a volume (V) which is filled with a transparent liquid (2), wherein the container (10) comprises a transparent and elastically deformable membrane (20) and a rigid member (30), wherein the membrane (20) and the rigid member (30) delimit said volume (V), and a lens shaping element (200) that contacts the membrane (20) and defines an area (21) of said membrane (20), which area (21) has an adjustable curvature for adjusting the focal length of the lens (1). According to the invention, the lens (1) is configured to compensate a thermal expansion of the liquid (2) and/or a change of the refractive index of the liquid (2) due to an increased temperature of the liquid (2) in order to reduce an unwanted thermally induced change of the focal length of the lens (1).

46 Claims, 26 Drawing Sheets

(51) Int. Cl.
  *G02B 3/14* (2006.01)
  *G02B 26/00* (2006.01)
  *G02B 7/02* (2021.01)

(56) References Cited

U.S. PATENT DOCUMENTS

2012/0170920 A1* 7/2012 Moreau .................... G02B 3/12
  396/72
2015/0183932 A1* 7/2015 Katayama .................. C08J 5/18
  257/40

FOREIGN PATENT DOCUMENTS

| EP | 2447742 | 5/2012 | |
|---|---|---|---|
| EP | 2465816 | 6/2012 | |
| EP | 2837957 | 2/2015 | |
| FR | 2950154 | 3/2011 | |
| WO | 2015/052233 | 4/2015 | |
| WO | WO-2015052233 A1 * | 4/2015 | ............... G02B 3/14 |

* cited by examiner

TEMPERATURE DRIFT COMPENSATION FOR LIQUID LENSES

CROSS-REFERENCE TO RELATED APPLICATIONS

This is the U.S. National Stage of International Application No. PCT/EP2016/064098 filed on Jun. 17, 2016, which was published in English under PCT Article 21(2), which in turn claims priority to International Application No. PCT/EP2015/063662 filed on Jun. 17, 2015.

The invention relates to a lens comprising a container defining a volume which is completely filled with a transparent liquid, wherein the container comprises a transparent and elastically deformable membrane and a rigid member, wherein the membrane and the rigid member participate in delimiting said volume, and wherein the lens further comprises a lens shaping element that contacts the membrane and defines an area of said membrane, which area has an adjustable curvature for adjusting the focal length of the lens.

A problem with liquid lenses that often arises is the fact that the liquid expands with increasing temperature leading to an increasing curvature of said area of the membrane which finally leads to a thermal drift of the focal length of the lens.

Therefore, the problem underlying the current invention is to provide a lens of the afore-mentioned kind that is improved concerning this disadvantage of a thermal drift of the focal power of the lens.

This problem is solved by a lens having the features of claim 1. Preferred embodiments of the present invention are stated in the sub claims and are described below.

According to claim 1, the lens comprises a container defining a volume which is preferably completely filled with a transparent liquid, wherein the container comprises a transparent and elastically deformable membrane and a rigid member, wherein the membrane and the rigid member participate in delimiting said volume, and a lens shaping element (also denoted as a lens shaper) that contacts the membrane and defines an area of said membrane, which area has an adjustable curvature for adjusting the focal length of the lens (particularly this area defines an aperture of the lens). Particularly, the lens is configured to let light pass through said area of the membrane and through said volume, wherein the light is deflected upon passing the membrane depending on the curvature of the membrane due to the fact that the liquid comprises a refractive index that differs from the refractive index of the medium (e.g. air) surrounding the lens.

Particularly, in an embodiment, the lens according to the invention is configured such that the optical part of the lens and the means for compensating said thermal drift(s) are locally separated from each other, while being coupled to each other by said liquid.

Further, preferably, the lens may comprise an actuator (see below) that is configured to act on the membrane or liquid for adjusting the curvature of said area and therewith the focal length of the lens.

Further, according to the invention, the lens is configured to compensate a thermal expansion (i.e. an expansion due to an increased temperature) of the liquid and/or a change of the refractive index of the liquid due to an increasing temperature of the liquid in order to reduce an unwanted thermally induced change of the focal length of the lens. In the context of the present invention, to compensate a thermal expansion of the liquid and/or a change of the refractive index of the liquid means that said compensation is performed such that the focal power of the lens changes less than 0.5 dpt, particularly less than 0.4 dpt, particularly less than 0.3 dpt, particularly less than 0.2 dpt, particularly less than 0.1 dpt over a temperature range of at least 30° C. (e.g. from 20° C. to 50° C.). In this sense, a constant focal length or power means that the focal power of the lens changes less than 0.5 dpt, particularly less than 0.4 dpt, particularly less than 0.3 dpt, particularly less than 0.2 dpt, particularly less than 0.1 dpt over said temperature range.

When the temperature of the lens changes, generally the liquid's volume as well as the RI of the liquid changes. Particularly, the effect on focal length of the volume change is opposite to the effect on focal length of RI change for positive membrane deflection when the lens is in the convex state. The effect on focal length of the volume change is cumulative to the effect on focal length or RI for negative membrane deflection when the lens is in the concave state.

Therefore, in some embodiments of the invention the lens may be configured such that the effect of volume change and RI on focal length cancel each other for a designed focal length or a focal length range, i.e. the lens is self-stabilizing.

Particularly, in general there are three cases: the temperature induced change in volume and the temperature induced RI change exactly oppose each other. In such a case compensation is already achieved.

In case the effect of the temperature induced increase in the liquid's volume is stronger than the decrease in RI, the temperature stabilizing mechanism needs to oppose volume change (i.e. diminish change in lens curvature).

Further, in case the change in RI dominates the effect of the temperature induced increase in the liquids volume, the temperature stabilizing mechanism needs to amplify volume change (i.e. increase change in lens curvature assuming a convex lens).

Particularly, it is one objective of the present invention to have a temperature independent (i.e. constant focal length or focal power), wherein e.g. both volume and RI effects are considered/compensated.

However, in some embodiments of the invention only the volume expansion may be compensated, particularly when the curvature of the lens is kept sufficiently flat.

Further, in some embodiments merely the change in RI may be compensated.

Particularly, the membrane can be made of at least one of the following materials: a glass, a polymer, an elastomer, a plastic or any other transparent and stretchable or flexible material. For example, the membrane may be made of a silicone-based polymer such as poly(dimethylsiloxane) also known as PDMS or a polymer material such as polyurethanes or a biaxially-oriented polyethylene terephtalate (e.g. "Mylar").

Further, said liquid may be a silicone oil or a fluorinated polymer.

Furthermore, the rigid element is preferably rigid compared to the membrane. Particularly, the stiffness of the first optical element is at least 10 times higher than that of the membrane.

The rigid element can be made of or comprise glass, a plastic, a polymer or metal.

The lens shaper can be an injection molded part, or can be made of or comprise a metal, a glass, or it can be a silicon (e.g. etched) shaper.

Particularly, the membrane may be carried by the rigid lens shaper or a rigid ring, particularly a metal ring or a metal lens shaper, that is configured to absorb/withstand the tension of the membrane so as to reduce a distortion of the (e.g. PDMS) ring member described below.

According to an embodiment of the present invention, the container further comprises a ring member for compensating said thermal expansion of the liquid, wherein said ring member is connected to the rigid member and extends circumferentially along an extension plane and comprises a dimension (e.g. height) in a direction perpendicular to said extension plane. Particularly, also the ring member participates in delimiting said volume of the container.

Further, according to an embodiment of the present invention, the ring member is configured to predominantly expand in said direction so that said dimension increases with increasing temperature, particularly more pronounced than a radial dimension of the ring member.

Further, according to an embodiment of the present invention, the linear thermal expansion coefficient of the ring member is one of equal to, smaller, or larger than the linear thermal expansion coefficient of said liquid.

Further, according to an embodiment of the present invention, the ring member is in thermal contact with said liquid and is configured to expand when the temperature of the liquid increases such that said volume increases, wherein said increase in volume corresponds to an increase of the volume of the liquid that occurs when the temperature of the liquid increases, such that the curvature of said area of the lens remains constant when the temperature of the lens and therefore of the liquid increases. This is particularly the case, when the membrane is in a substantially flat state.

In the context of the present invention, constant means that a change in the curvature merely results in a change of less than 0.5 dpt, particularly less than 0.4 dpt, particularly less than 0.3 dpt, particularly less than 0.2 dpt, particularly less than 0.1 dpt of the focal power over a temperature range of at least 30° C.

Further, according to an embodiment of the present invention, said volume comprises a first section that may define an aperture of the lens, wherein the first section comprises a first diameter, and wherein said volume comprises an adjacent second section having a second diameter that is larger than the first diameter of the first section. Preferably, the second section is arranged such that it is increased when the ring member undergoes an expansion due to an increasing temperature, wherein particularly the second section may have a constant volume.

Further, preferably, said first and second section comprise a different height in a direction perpendicular to said diameters.

Particularly, said first and second diameter extend parallel to said extension plane such that a small increase of said dimension of the ring due to an increased temperature induces a comparably large increase of said volume due to the relatively large second diameter. This constitutes an efficient lever effect.

Further, according to an embodiment of the present invention, the rigid member comprises a linear thermal expansion coefficient that is smaller than the linear thermal expansion coefficient of the ring member and/or of said liquid, particularly if the liquid has a negative change of the refractive index with increasing temperature and the rigid member comprises a linear thermal expansion coefficient that is smaller than the linear thermal expansion coefficient of the ring member and/or of said liquid, if the liquid has a positive change of the refractive index with increasing temperature.

Further, according to an embodiment of the present invention, the ring member is arranged in a circumferential groove of the rigid member so as to suppress a radial expansion of the ring member due to an increased temperature so that the ring member predominantly expands in said direction of its height.

Further, according to an embodiment of the present invention, the ring member protrudes out of said groove in said direction normal to said extension plane. Alternatively, the ring member may be completely arranged in said groove, i.e., does not protrude out of it.

Further, according to an embodiment of the present invention, the thermal expansion of the ring member in said direction is suppressed by a fixture means such that the ring member predominantly thermally expands in a radial direction running perpendicular to said direction.

Further, according to an embodiment of the present invention, the lens comprises a bimetal actuator which is configured to expand the ring member or container in said direction for compensating a thermal expansion of the liquid in said volume.

Further, according to an embodiment of the present invention, the container further comprises a chamber for compensating said thermal expansion of the liquid, which chamber defines a further volume separated from said volume, which further volume is filled with a further liquid (particularly, the further liquid can be the same liquid that is in said volume of the lens through which the light that is to be deflected passes).

Preferably, in an embodiment, said further volume comprises a dimension in said direction that is larger than the dimension of the liquid in said volume or said volume in the same direction, wherein particularly said further volume extends into a circumferential groove of the rigid member, and is further delimited by said ring member and a further ring member for compensating said thermal expansion of the liquid in said volume, wherein said ring member protrudes from an inner edge of the groove in said direction and is encompassed by the further ring member that protrudes from an outer edge of the groove in said direction. In other words, the chamber is delimited by a circumferential wall member comprising said two ring members.

Further, according to an embodiment of the present invention, the rigid member comprises a base extending along said extension plane and a protrusion (or dome) protruding from said base in said direction normal to said extension plane, wherein said ring member encompasses said protrusion.

Preferably, in an embodiment, the ring member and said protrusion define a circumferential gap being filled with said liquid, which gap forms part of said volume of the container.

Further, in an embodiment, the base comprises a step extending circumferentially around said protrusion for centering the ring member with respect to said protrusion. Preferably, in an embodiment, the base comprises a further circumferential step for receiving a glue for attaching the ring member to the base so that said glue cannot be drawn into said gap due to capillary forces.

Further, according to an embodiment of the present invention, said protrusion comprises a face side facing said membrane, wherein said face side comprises a recess, so that a liquid layer between a bottom of the recess and the membrane is thicker than a liquid layer between a boundary region of the recess forming a part of the face side and an opposing region of the membrane. By means of this recess said first and second section of said volume can be formed, wherein the first section corresponds to the volume of the recess and the second section corresponds to the liquid layer on top of the first section, i.e. between the face side of the protrusion and the membrane. Hence, when the ring member expands the second sections undergoes a comparably large increase in volume since its diameter (or footprint) is larger than the diameter (or footprint) of the first section of the volume.

Further, according to an embodiment of the present invention, the rigid member forms a transparent optical element facing the membrane. Particularly, in an embodiment, the rigid member forms a corrective optical element, e.g. a lens.

Further, in this regard, in an embodiment, the rigid member comprises a further side facing away from a side that faces the membrane (e.g. from the face side of said protrusion), wherein said further side comprises a recess having a bottom with a curved surface for deflecting light passing through the rigid member.

Further, according to an embodiment of the present invention, the membrane is connected to the ring member. Preferably, in an embodiment, the membrane is connected to a face side of the ring member facing away from the rigid member.

Further, according to an embodiment of the present invention, the rigid member comprises an aperture in the form of a through hole for passing light through the rigid member, wherein the membrane is connected to the rigid member, and wherein a transparent optical element (e.g. out of a plastic or a glass) is connected to the ring member, particularly to a face side of the ring member, and faces the membrane. Here, the liquid is arranged between the membrane and the optical element, which delimits said volume.

Further, according to an embodiment of the present invention, for compensating said thermal expansion of the fluid, the lens comprises a first and a second spring means being in thermal contact with the liquid, wherein each spring means is preloaded against the membrane such that the latter is in a force equilibrium position. Preferably, said two spring means comprise a different change of Young's modulus with temperature so that said force equilibrium position of the membrane depends on the temperature of the liquid in a way that said thermal expansion and/or refractive index change of the liquid is compensated. In other words, due to the temperature dependence of the elastic properties of said spring means, the equilibrium position o the membrane shifts such that an increase of the volume of the liquid due to an increasing temperature is compensated by an increase of the volume of the container that holds the liquid or by a change of the position of the lens shaping element.

Further, according to an embodiment of the present invention, the container comprises a bottom comprising a transparent expansion element (e.g. comprising polycarbonate), which expansion element is connected to the rigid element and faces the membrane, wherein the expansion element is configured to expand with increasing temperature such that said bottom of the container bends outwards for compensating the thermal expansion of the liquid. Due to this outward bending, said volume of the lens increases such that the increase in the volume of the liquid itself and/or the change in the refractive index is compensated.

Further, according to an embodiment of the present invention, the container comprises a contraction element comprising a negative thermal expansion coefficient, wherein the contraction element participates in delimiting said volume of the container such that the contraction element contracts with increasing temperature leading to an increased volume of the container for compensating said thermal expansion of the liquid.

According to a further embodiment of the present invention, the lens comprises a pump being configured to pump discrete amounts of liquid into or out of the volume of the container so as to compensate a thermal expansion of the liquid and a change of the refractive index of the liquid due to an increasing temperature of the liquid at the same time.

Further, according to an embodiment of the present invention, said volume is separated into a lens volume (i.e. the volume adjacent said area of the membrane through which volume the light to be deflected by the lens passes) and a reservoir volume being in flow connection with said lens volume, wherein the reservoir volume is configured to expand when the temperature of the liquid increases such that said reservoir volume increases, wherein said increase in reservoir volume corresponds to an increase of the volume of the liquid that occurs when the temperature of the liquid increases such that the curvature of said area of the membrane remains constant (see definition of "constant curvature" above) when the temperature of the lens/liquid increases such that the focal length (or power) of the lens does not change (i.e. stays constant, see also above).

Further, according to an embodiment of the present invention, the rigid member comprises a lens barrel section and a reservoir section protruding from the lens barrel section, wherein the reservoir section encompasses the reservoir volume and wherein the lens barrel section encompasses the lens volume.

Further, according to an embodiment of the present invention, the container further comprises a ring member, wherein said ring member is connected to the rigid member, particularly to a face side of the reservoir section.

Further, according to an embodiment of the present invention, this rigid member extends circumferentially along an extension plane running e.g. parallel to the optical axis of the lens and comprises a dimension (e.g. height) in a direction perpendicular to said extension plane. Further, particularly, this ring member participates in delimiting said reservoir volume.

Further, according to an embodiment of the present invention, this ring member is in thermal contact with said liquid and is configured to expand when the temperature of the liquid increases such that said reservoir volume increases, wherein said increase in reservoir volume corresponds to an increase of the volume of the liquid that occurs when the temperature of the liquid increases such that the curvature of said area of the membrane or the focal length or focal power of the lens remains constant (as defined above) when the temperature of the lens and therefore of the liquid increases.

Further, according to an embodiment of the present invention, this ring member is configured to predominantly expand in said direction so that said dimension increases with increasing temperature, particularly more pronounced than a radial dimension of the ring member.

Further, according to an embodiment of the present invention, also here, the linear thermal expansion coefficient of the ring member is equal to or smaller (but may also be larger) than the linear thermal expansion coefficient of said liquid. Further, according to an embodiment of the present invention, the rigid member comprises a linear thermal expansion coefficient that is smaller than the linear thermal expansion coefficient of the ring member and/or of said liquid.

Further, according to an embodiment of the present invention, the lens further comprises an actuator configured to adjust the curvature of said area of the membrane in order to adjust the focal length of the lens by exerting a force onto the membrane.

Further, according to an embodiment of the present invention, the actuator is configured to act on the lens shaping element or on a boundary region of the membrane to adjust the curvature of said curvature-adjustable area.

In one embodiment, the lens shaper is attached to the ring member and is configured to be axially movable (e.g. in said direction or in the direction of the optical axis). Here the lens shaper may be axially moved by the actuator in order to adjust the curvature of said area of the membrane.

In another embodiment, the lens shaper is attached to the membrane and has a radius being smaller than the radius/diameter of the ring member and is axially moveable. Here, the lens shaper may be moved by the actuator in said axial direction.

In yet another embodiment the lens shaper is attached to the membrane and fixed in the axial direction (i.e. in said direction or in the direction of the optical axis), wherein the actuator is configured to act on an (e.g. outer) boundary region of the membrane in order to deform said area of the membrane defined by the lens shaper.

Further, according to an embodiment of the present invention, the actuator is designed to push liquid in or out of said reservoir volume out of or into the lens volume for adjusting the curvature of said area of the membrane (e.g. for adjusting the focal length of the lens or for compensating said thermal expansion of the liquid and/or said change of the refractive index of the liquid)

Further, in an embodiment, the actuator comprises a piston that is configured to press against a deformable wall of the reservoir volume, which wall is particularly connected to the ring member, wherein said wall comprises a circumferential boundary region and a central deformable portion, wherein particularly the boundary region comprises a linear thermal expansion coefficient that is smaller than the linear thermal expansion coefficient of the ring member and/or of said liquid. Particularly, said coefficient of the boundary region corresponds to that of the rigid member/reservoir section.

Further, according to an embodiment of the present invention, the actuator is pretensioned against the membrane by means of a spring member for compensating said change of the refractive index of the liquid with temperature. For example the spring constant of the spring member changes with temperature making the actuator less efficient at lower temperatures to compensate the higher refractive index of the liquid in case the lens is in a convex state.

Further, in an embodiment, a temperature dependent spring attached to the actuator not only compensates for changes in the refractive index to keep the focal power constant for the convex and concave state. The required tilt to stabilize an image increases with increasing temperatures as the refractive index decreases for increasing temperature. Therefore, the spring attached to the actuator is preferably softer at higher temperatures to in-situ compensate for temperature effects during stabilization.

Further, according to an embodiment of the present invention, for compensating said change of the refractive index of the liquid, said actuator comprises a coil and a temperature-dependent resistor being thermally coupled to the liquid, wherein the resistor is configured such that when the temperature of the liquid increases, an electrical current that flows through the coil decreases such that the force of the actuator onto the membrane decreases, too. Here, particularly, the actuator further comprises a magnet interacting with the coil when an electrical current flows through the latter such that a force is exerted on the membrane by the actuator that adjusts the curvature of said area of the membrane.

Further, according to an embodiment, the lens is configured to compensate a thermal expansion or contraction of the liquid and/or a change of the refractive index (RI) of the liquid due to a change in temperature of the liquid in order to reduce an unwanted thermally induced change of the focal length of the lens.

Particularly, in an embodiment, said change in temperature of the liquid results from an external temperature change (i.e. heat or cold from the environment of the lens, which is preferably modeled using a uniform temperature distribution of the liquid) and/or at least one internal heat source or heat sink of the lens (e.g. an actuator for adjusting the curvature of said area of the membrane of the lens, which introduces heat into the liquid in a dynamical fashion, which is preferably modeled using a non-uniform distribution of temperature. Particularly, this means that said heat source or heat sink can be spatially localized.

Further, in an embodiment, said change in temperature (particularly due to effects taking place inside the lens (e.g. heat created by internal heat sources such as an actuator driven with an electrical current or a heat sink due to a non-uniform heat dissipation resulting from different heat conducting and heat insulating materials that are used in the lens body) results in a non-uniform distribution of the temperature of the liquid.

Further, in an embodiment, said change in temperature is time-dependent as internal heat sources can be turned on and off and can change its heat power. Particularly, time-dependent means, that the change in temperature varies in time.

Particularly this change in temperature is not uniformly time dependent, but diverging and/or converging with respect to any two arbitrary spatial locations within the lens.

Further, see also above, according to an embodiment, the lens comprises an actuator configured to adjust the curvature of said area of the membrane in order to adjust the focal length of the lens (e.g. by exerting a force onto the membrane).

Further, in an embodiment, the lens comprises a control unit that is configured to provide a control signal for controlling said actuator so as to adjust the curvature of the lens (and eventually said focal length/focal power of the lens), wherein said control signal is generated such that it compensates for said change in temperature in order to reduce said unwanted thermally induced change of the focal length of the lens, i.e., so as to maintain a constant focal power of the lens that does not change with the temperature of the liquid.

Further, in an embodiment, the lens comprises at least one sensor, wherein the control unit is configured to generate said control signal using values from the at least one sensor, wherein said at least one sensor is one of: a temperature sensor configured to measure a temperature at a particular and defined position inside the lens or close to the lens, preferably in the vicinity of the of the liquid, a displacement sensor (e.g. a Hall sensor or an optical sensor) configured to measure a displacement of the actuator of the lens with respect to the container of the lens (or the equilibrium state/off state of the actuator) or configured to measure the deflection of the membrane (e.g. with respect to its equilibrium state), a motion sensor configured to detect a relative motion or acceleration of the lens with respect to the environment that can be quantified, a sensor configured to measure the power of said actuator. Of course, the lens according to the invention may also comprise several sensors, e.g. an arbitrary selection of the above stated sensors.

Further, according to an embodiment, the lens may comprises a memory particularly a semiconductor memory, more particularly a non-volatile memory, for storing (past) values measured by said at least one sensor or said several sensors.

Further, according to an embodiment, the lens may comprise calibration data obtained by calibrating the lens (e.g. during production of the lens) or recalibrating the lens in the final usage case at certain recurring intervals and stored in a calibration data memory (e.g. a semiconductor memory, particularly non-volatile memory) of the lens, which calibration data memory may be formed by the same memory in which said sensor values stored.

Further, according to an embodiment, the control unit is configured to execute a control algorithm that generates said control signal using said values and/or calibration data as well as a functional model in order to compensate for said change in temperature, temperature distribution, temperature profile and/or temperature gradient(s).

Preferably, the control algorithm compromises several sub control algorithms relating to different aspects of compensating thermal drifts in the focal length/focal power of the lens that may be executed in parallel or in series by the control unit.

Furthermore, according to an embodiment of the present invention, the control algorithm comprises a first and a second sub control algorithm (or control loop), wherein the control unit is configured to execute these two sub control algorithms in series, wherein the first sub control algorithm accounts for time-dependent (i.e. dynamic) changes in temperature of the liquid and corresponding temperature gradients inside the liquid, particularly due to at least one time-dependent local heat source inside the lens (e.g. actuator) while the second sub control algorithm accounts for overall changes in the temperature of the liquid (e.g. due to a temperature change in an environment of the lens) assuming a uniform heat distribution inside the liquid of the lens (see also above).

Further, according to an embodiment, the first sub control algorithm uses a functional model describing said time-dependent changes in the temperature of the liquid (e.g. by evaluating the sum of several n-th order lag-elements), wherein said first sub control algorithm is configured to dynamically adjust the focal length (or focal power) of the lens (e.g. by subtracting a drift correction computed by the first sub control algorithm from the set focal length), which so-corrected focal length then forms an input for said second sub control algorithm.

Further, according to yet another embodiment of the present invention, the actuator comprises at least a first coil for adjusting the curvature of said area of the membrane, wherein the actuator applies and electrical current to the first coil in order to generate a force acting on the membrane for adjusting said curvature, and a second coil wound around said at least one first coil of the actuator.

Further, according to an embodiment of the present invention, the actuator of the lens is configured to be operated in a constant power mode with respects to time scales of milliseconds, seconds, minutes, hours, or days, or particularly even longer time intervals, such that a local heat source of the lens, e.g. the actuator, (particularly all heat sources of the lens) does not change over time after reaching its steady state heat distribution.

Here, particularly, the second coil may comprises a plurality of windings, wherein one half of the windings is wound in a winding direction while the other half of the windings is wound in the opposite winding direction so that the second coil does not exert any force on the membrane when an electrical current is applied to the second membrane. Preferably, the lens is configured to adjust an electrical current flowing through the second coil such that a total consumed power of the at least one first coil of the actuator and the second coil remains constant and a local heat source distribution generated by the actuator does not change.

Further, in an alternative embodiment of the constant power mode operation, said second coil does not need to be wound in two opposite directions, but the lens is configured to adjust a ratio between the electrical currents in said at least one first coil and in said second coil such that the total consumed power is constant and said ratio ensures that a net force of the actuator can be varied and used for adjusting the focal length of the lens.

Further, according to an embodiment of the constant power mode operation, the actuator of the lens is configured to adjust the curvature of said area of the membrane during a duty cycle (i.e. the actuator of the lens is only used at a fraction of its time which is defined by the time required to adjust said curvature), wherein the lens is configured to drive the actuator at a different power outside the respective duty cycle, wherein said power is chosen such that the average total power of the actuator remains constant and the local heating source formed by the actuator does not change its properties over time resulting in a time-independent local heat source.

Further, according to yet another embodiment, the lens is configured to compensate for a temperature gradient inside the liquid using at least one of: a spatial separation of the actuator from the container of the liquid, a thermal insulation, arranging the membrane inside or on a lens shaping element or some other lens holder that induces a counteracting gradient, a heater comprised by the lens, which heater is configured to keep the lens temperature constant, an active or passive cooling means, e.g. forced convection, or natural convection.

Preferably, the heater may be arranged close or thermally coupled to one, some or any optically relevant parts of the lens. Particularly, in an embodiment, the heater is arranged close to the liquid, or in the liquid, or in thermal contact to the liquid of the lens.

Furthermore, as mentioned above, the lens may comprise an actuator that is configured to generate an actuator force for adjusting the curvature of said area of the membrane of the lens, wherein a change in said actuator force may results not only in a local heating source but also in a membrane strain softening caused by viscoelasticity of the membrane material depending on temperature.

Here, according to an embodiment, the lens may be configured to measure the deflection of the membrane to determine said strain softening of the membrane (particularly by means of membrane position sensitive sensors of the lens), wherein said control unit is configured to also compensate for the temperature dependent strain softening upon controlling of said actuator/focal length of the lens.

Furthermore, according to yet another aspect of the present invention, an optical device is disclosed, comprising: a first and a second transparent (and particularly flat) cover element, wherein said two cover elements face each other, a (e.g. flexible) lateral wall via which said cover elements are connected to each other such that a container is formed, wherein said container is filled with a transparent liquid comprising a temperature-dependent refractive index (RI). According to the invention, the optical device comprises three pin assemblies that are designed to tilt the first cover element with respect to the second cover element, so as to form the container into a variable prism for refracting light passing through the container (e.g. through the second cover element, the liquid and the first cover element or vice versa), wherein at least two of said pin assemblies are adjustable for tilting said first cover element with respect to the second cover element, and wherein said at least two pin assemblies are configured to undergo a thermal expansion so as to compensate a thermal drift of the refractive index of the liquid in order to reduce an unwanted thermally induced change of said refracting of said light.

Particularly, this optical device advantageously solves the specific problem of providing a tunable prism whose refractive power, i.e. the deflection of a beam passing through the optical device described above, can be stabilized also in case of temperature changes of the liquid of the tunable prism which alter the refractive index of said liquid and therefore the angle under which light passing the prism is deflected due to refraction.

Preferably, according to an embodiment, the at least two pin assemblies each comprise a tunable linear thermal expansion coefficient (CLTE).

Further, according to an embodiment of the optical device, for tuning the linear thermal expansion coefficient of the respective pin assembly, the respective pin assembly consists of at least two different materials having different linear thermal expansion coefficients.

Preferably, according to an embodiment, each of the at least two pin assemblies comprises an outer pin and an inner pin, wherein the outer pin comprises a linear thermal expansion coefficient that differs from the linear thermal expansion coefficient of the inner pin.

Preferably, in an embodiment, the linear thermal expansion coefficient of the outer pin is smaller than the linear thermal expansion coefficient of the inner pin. However, depending on the specific situation, the linear thermal expansion coefficient of the outer pin may also be larger than the linear thermal expansion coefficient of the inner pin.

Further, according to an embodiment, an outer thread of the outer pin engages with an inner thread of a holding means that is fixed to the second cover element, which holding means faces the first cover element, so that the outer pin can be moved towards the first cover element by a corresponding rotation of the outer pin with respect to the holding means such that the outer pin comprises a portion of variable length that extends from the holding means towards the first cover element.

Further, according to an embodiment, an outer thread of the inner pin engages with an inner thread of the outer pin such that the inner pin comprises a portion of variable length that extends from the outer pin towards the cover element, wherein an end section of the inner pin is configured to interact with the first cover element for tilting the first cover element with respect to the second cover element, particularly said end section may be mechanically connected to the first cover element.

Further, according to an embodiment, the inner pin of the respective adjustable pin assembly is rotationally fixed with respect to the holding means.

Advantageously, this allows for adjusting the effective length of said two pin assemblies for adjusting the tilt of the first cover element with respect to the second cover element, and furthermore to alter the racial of said portions of said outer and inner pin of the respective adjustable pin assembly.

Particularly, in detail, the outer pin is configured to be rotated in a first direction and thereby moved towards the first cover element, wherein due to said rotational fixation an effective length of the respective pin assembly decreases and the spatial position of the first cover element changes correspondingly, and wherein due to said rotational fixation said portion of the outer pin increases and said portion of the inner pin decreases when the outer pin is rotated in the first direction and thereby moved towards the first cover element leading to a corresponding change of the tunable linear thermal expansion coefficient of the respective pin assembly.

Furthermore, particularly, the outer pin is also configured to be rotated in a second direction opposite the first direction and thereby moved away from first cover element, wherein due to said rotational fixation an effective length of the respective pin assembly increases and the spatial position of the first cover element changes correspondingly, and wherein due to said rotational fixation said portion of the outer pin decreases and said portion of the inner pin increases when the outer portion is rotated in the first direction and thereby moved away from the first cover element leading to a corresponding change of the tunable linear thermal expansion coefficient of the respective pin assembly.

In another embodiment one may also have the situation (e.g. by designing the pitches of the treads of the pins accordingly) that the effective length of the respective pin assembly decreases when the outer pin is rotated in the first direction and moved away from the first cover element and that the effective length of the respective pin assembly increases when the outer pin is rotated in the second direction and moved towards the first cover element.

The invention can be used in various fields among them ophthalmology equipment such as phoropters, refractometers, pachymeters, biometrie, perimeters, refrakto-keratometers, refractive lens analyzers, tonometers, anomaloscop, contrastometers, endothelmicroscopes, anomaloscopes, binoptometers, OCT, rodatests, ophthalmoscopes, RTA or in lighting, machine vision, laser processing, mobile phone cameras, light shows, printers, metrology, head worn glasses, medical equipment, robot cams, motion tracking, microscopes, telescopes, endoscopes, binoculars, research, surveillance cameras, automotive, projectors, ophthalmic lenses, range finder, bar code readers, web cams.

Further explanations and other aspects and features of the present invention will be given below.

The invention will be better understood and objects other than those set forth above will become apparent when consideration is given to the following detailed description thereof. Such description makes reference to the annexed drawings, wherein.

Figure 13:
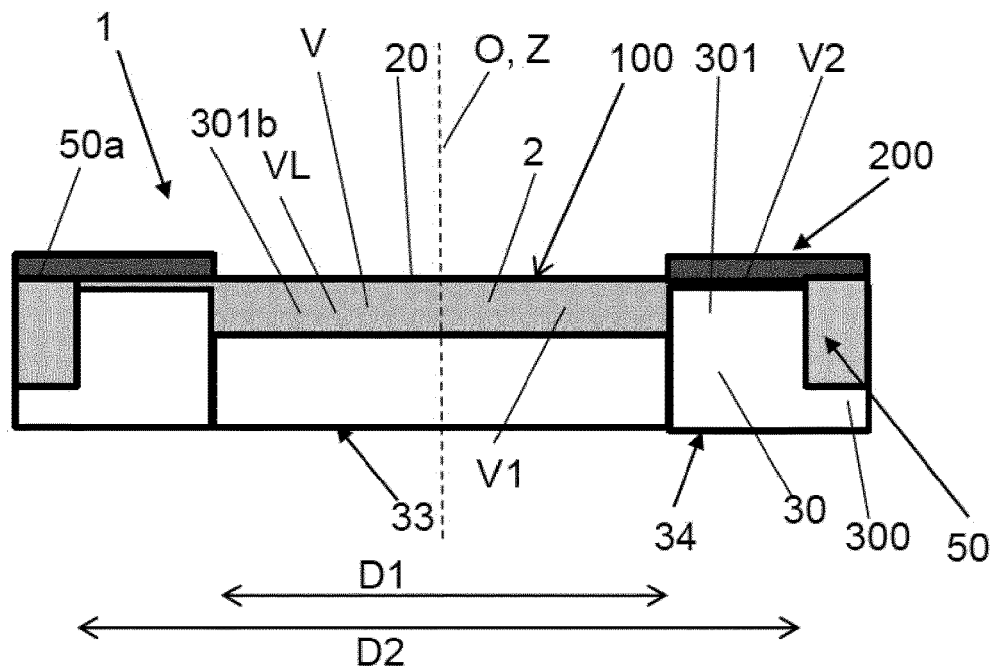
Figure 14:
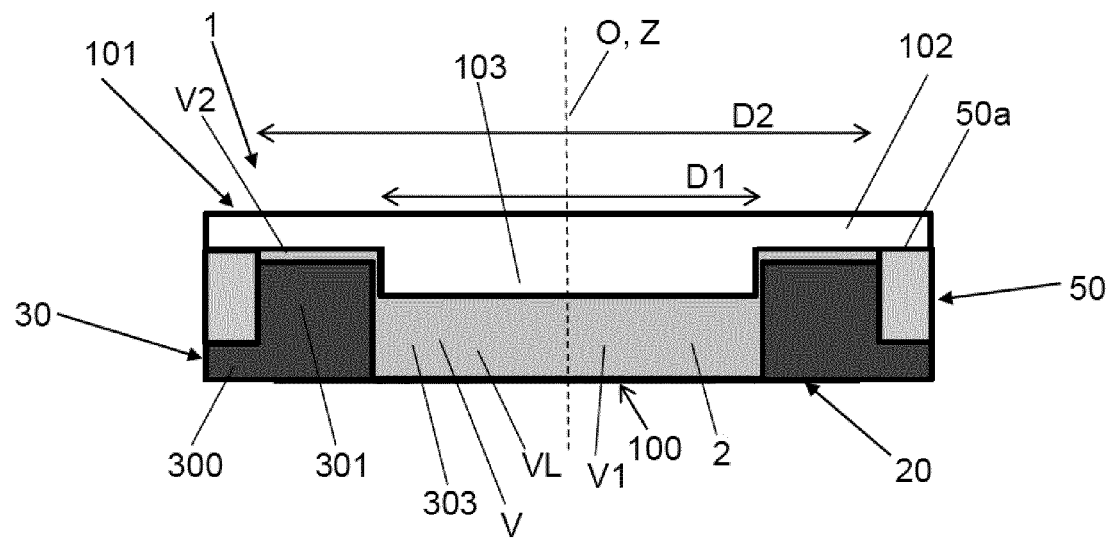

FIG. 13 shows a schematical cross sectional view of an embodiment of the present invention comprising a ring member encompassing a protrusion of the rigid member and a lens shaper connected to the ring member, wherein the volume comprises a first section defining the aperture of the lens and second section having a larger footprint than the first section that extends to the ring member in the radial direction of the lens;

FIG. 14 shows a schematical cross sectional view of modification of the embodiment shown in FIG. 13

Figure 15:
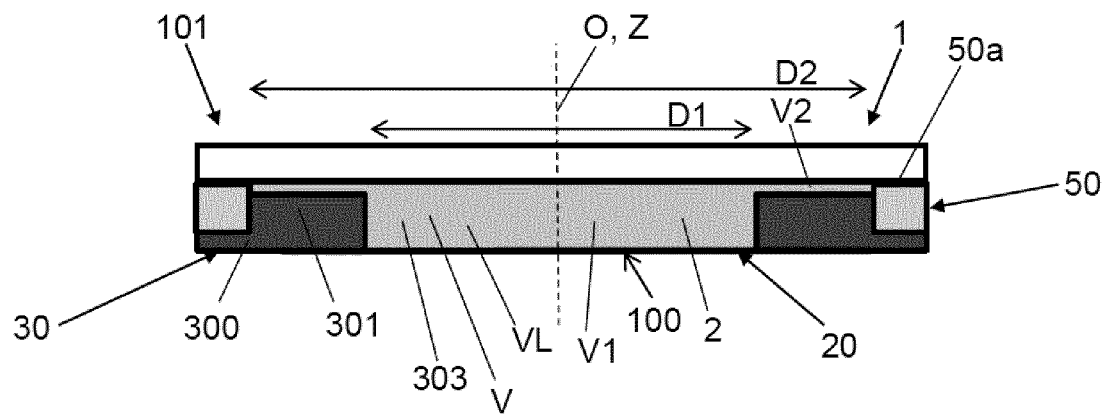

FIG. 15 shows a schematical cross sectional view of modification of the embodiment shown in FIG. 14.

Figure 1:
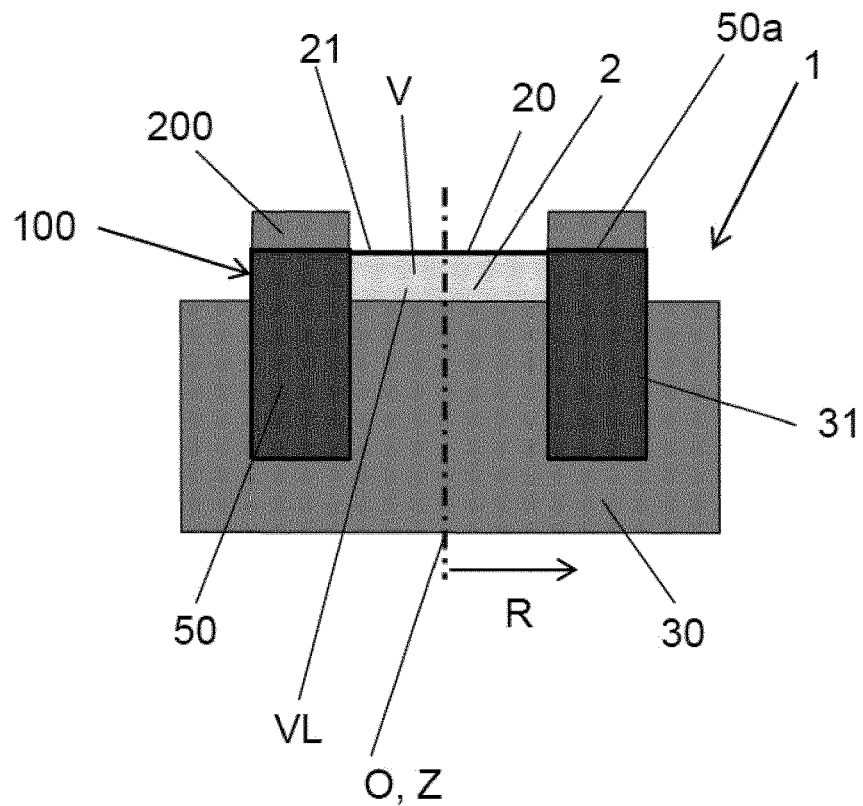
FIG. 1 shows a schematical cross sectional view of an embodiment of a lens according to the invention having a ring member arranged in a groove of a transparent rigid member of the lens.
Figure 16:
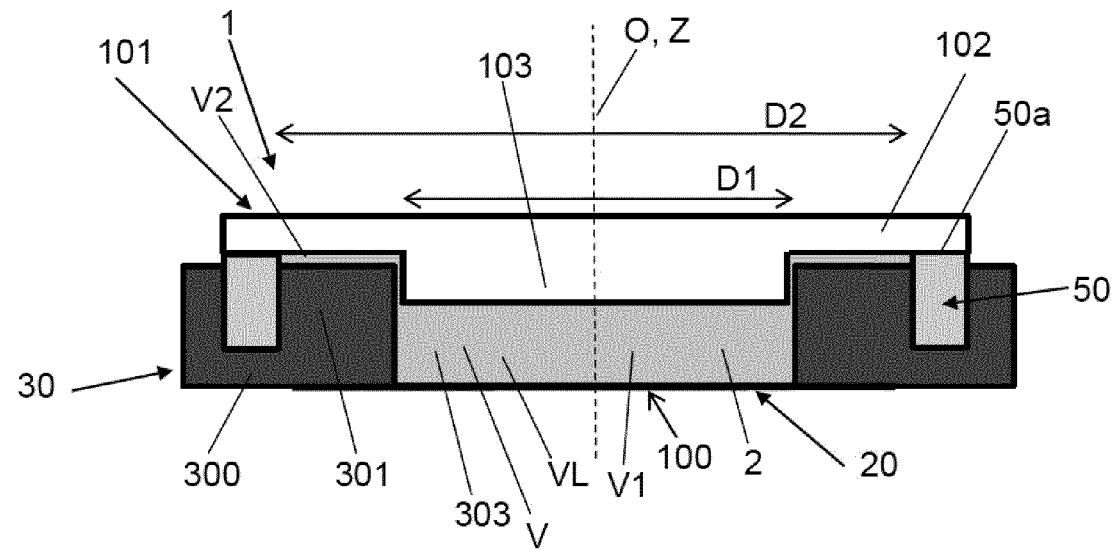
Figure 17:
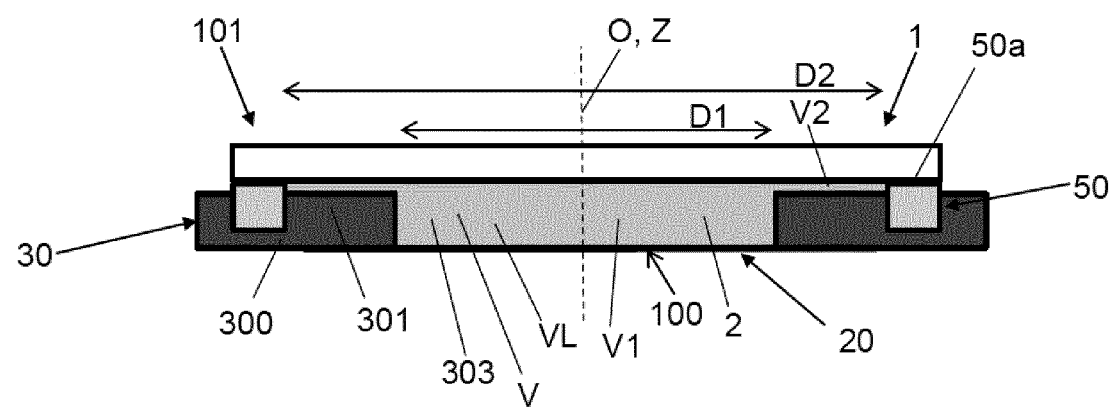
Figure 18:
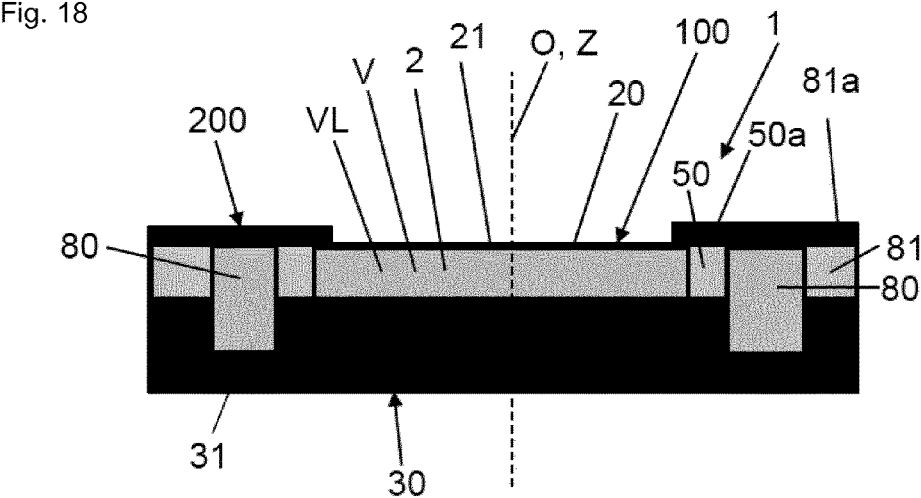
Figure 19:
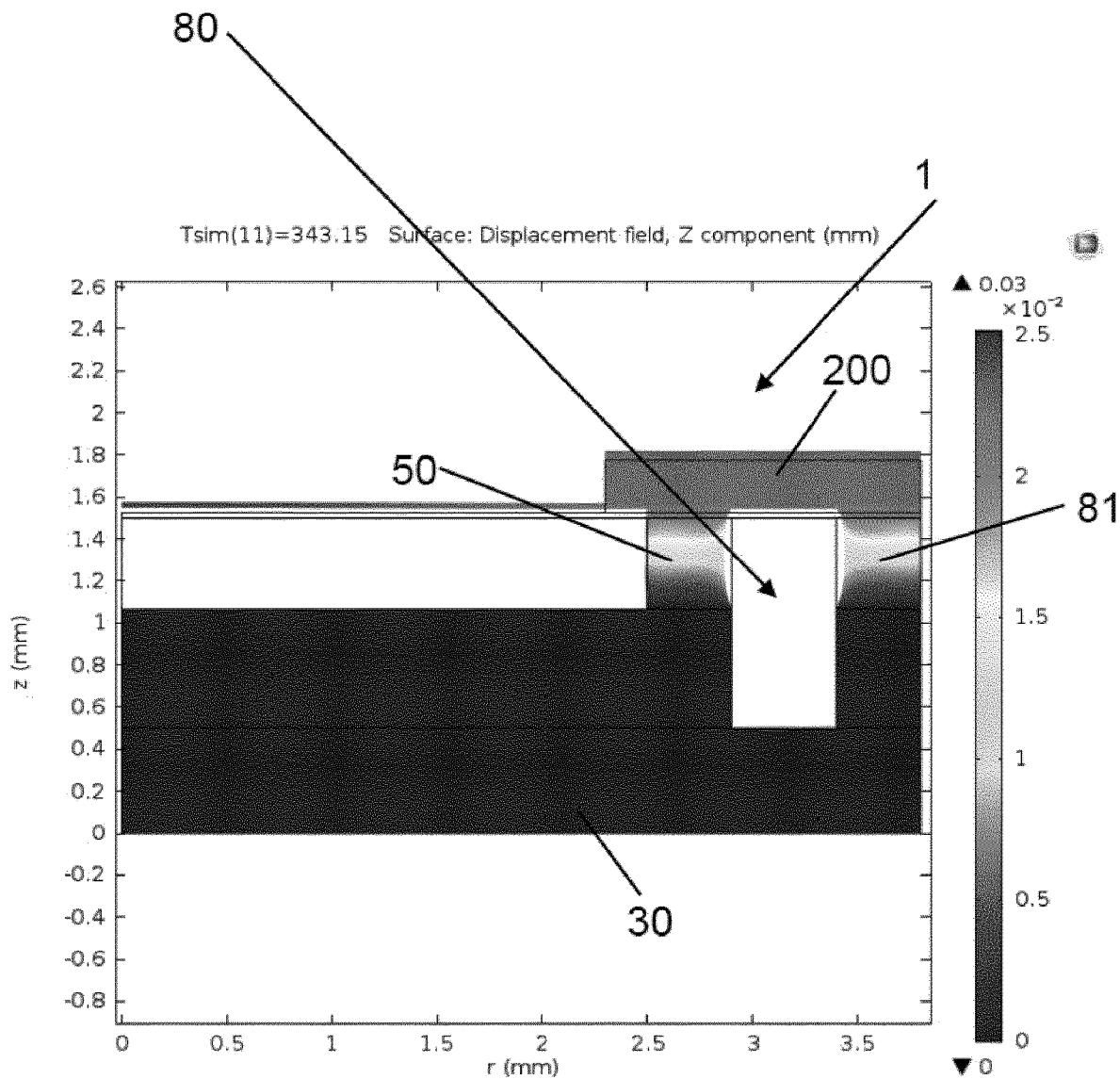
Figure 20:
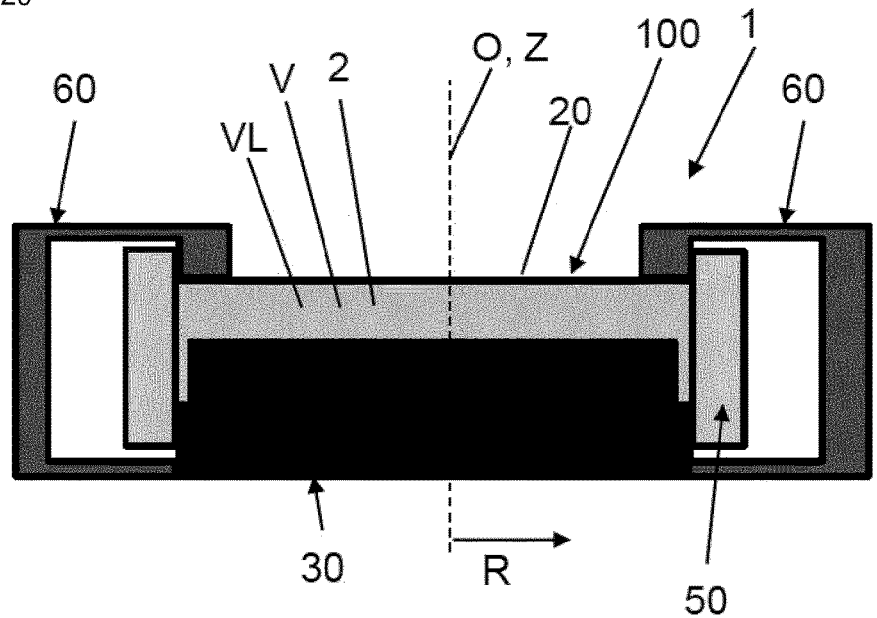
Figure 21:
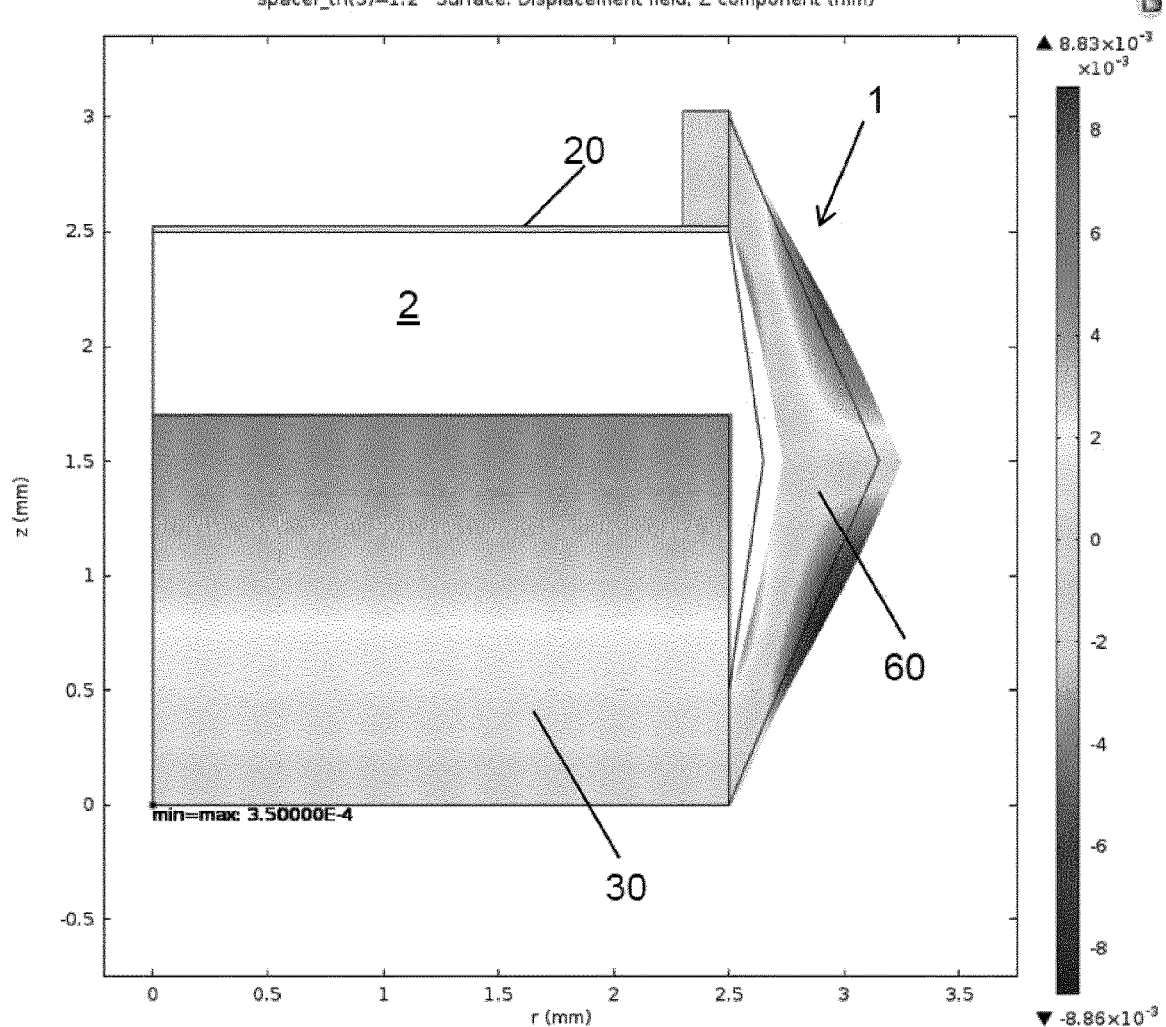
Figure 22:
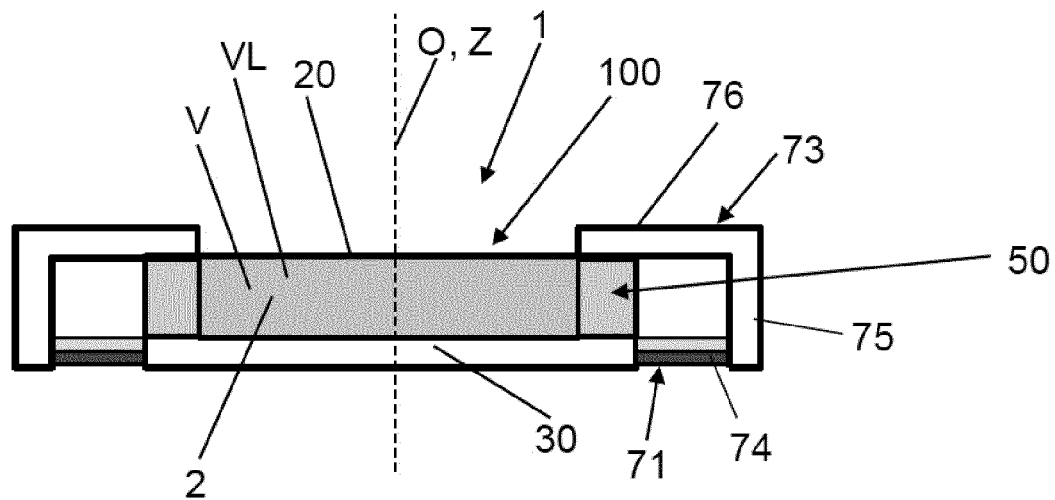
Figure 23:
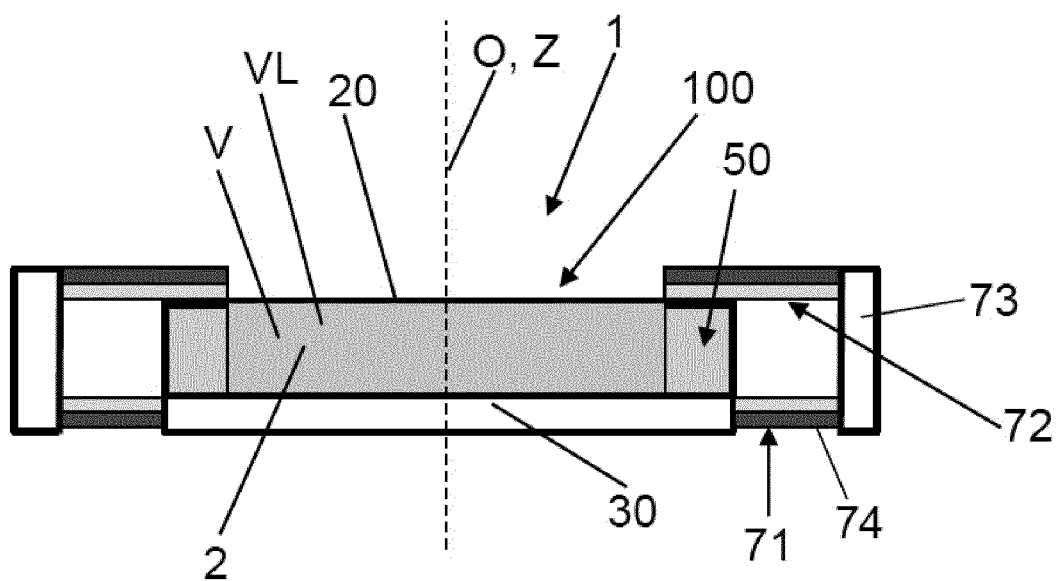
Figure 24:
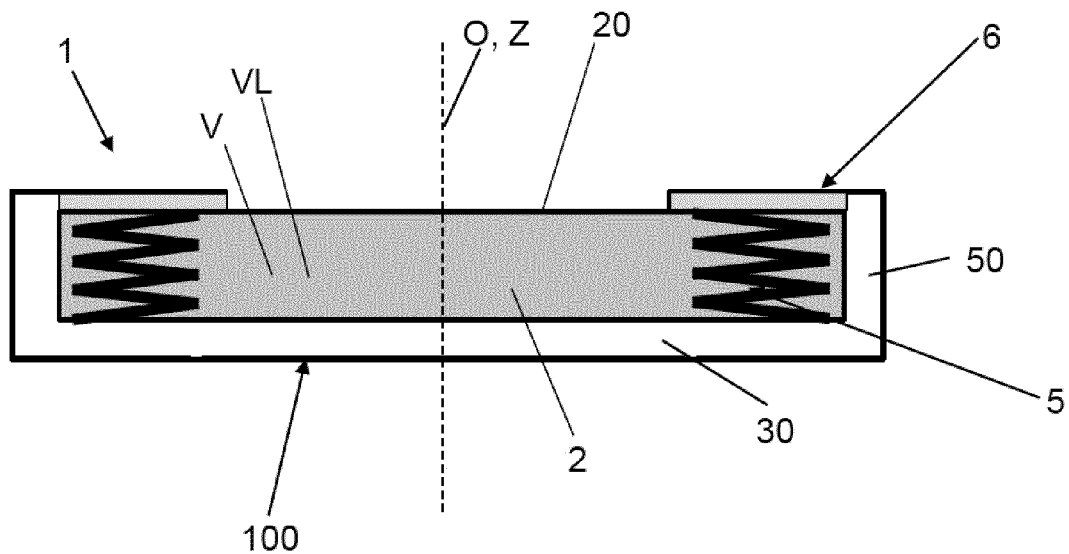
Figure 25:
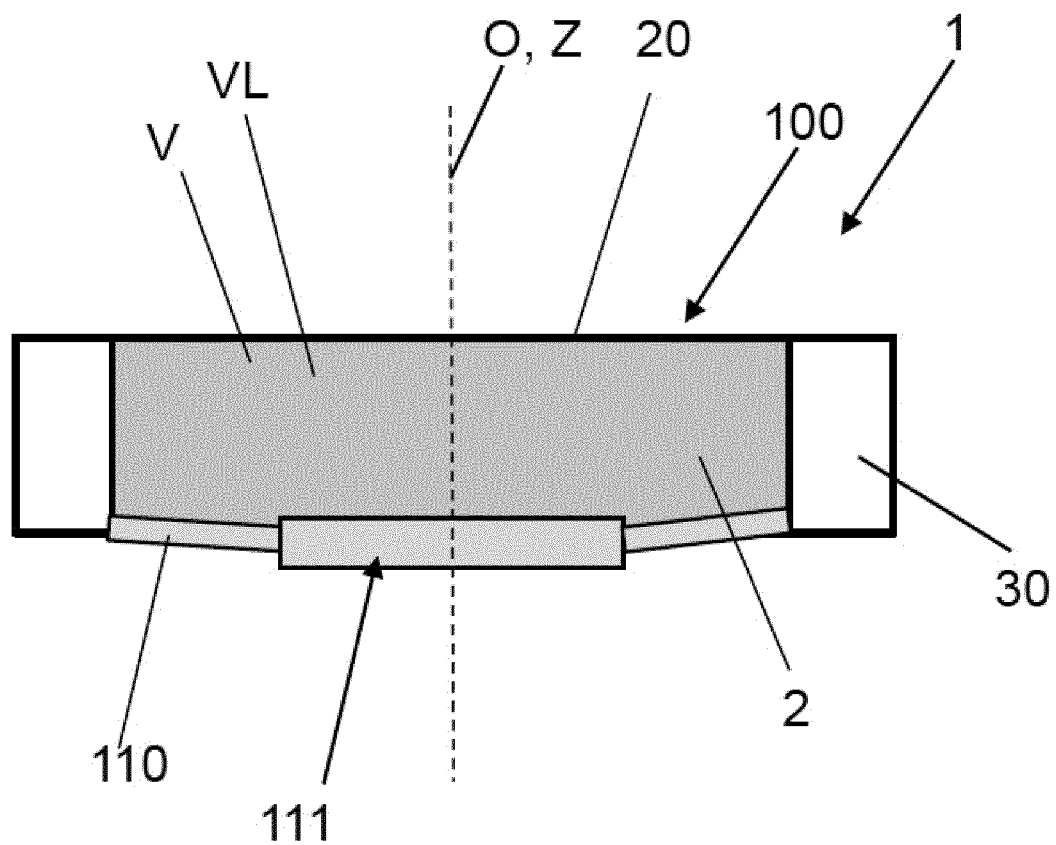
Figure 26:
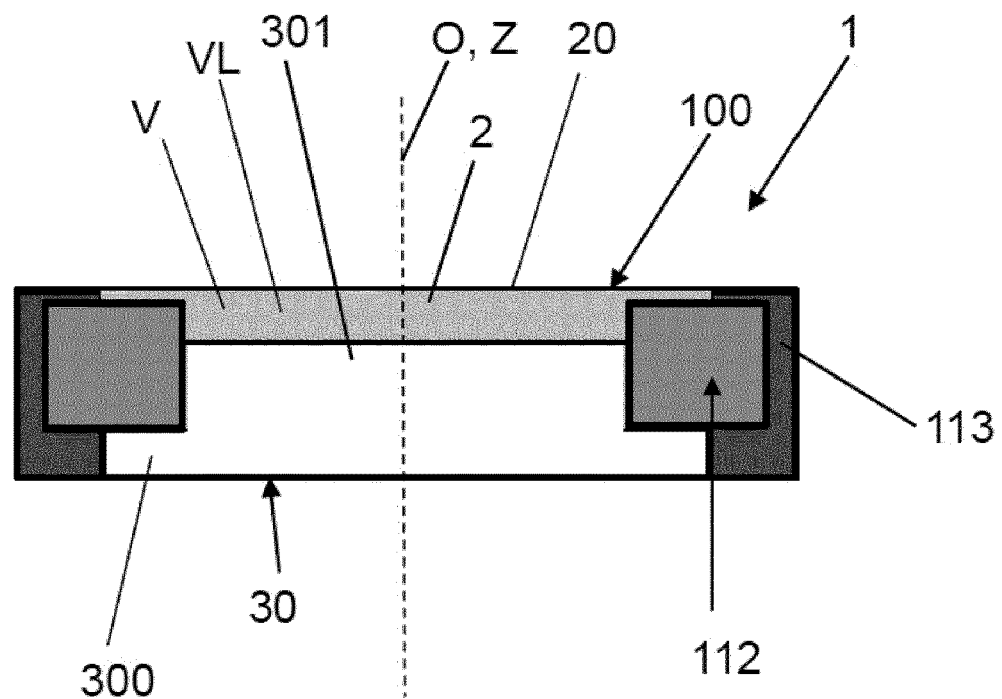
Figure 27:
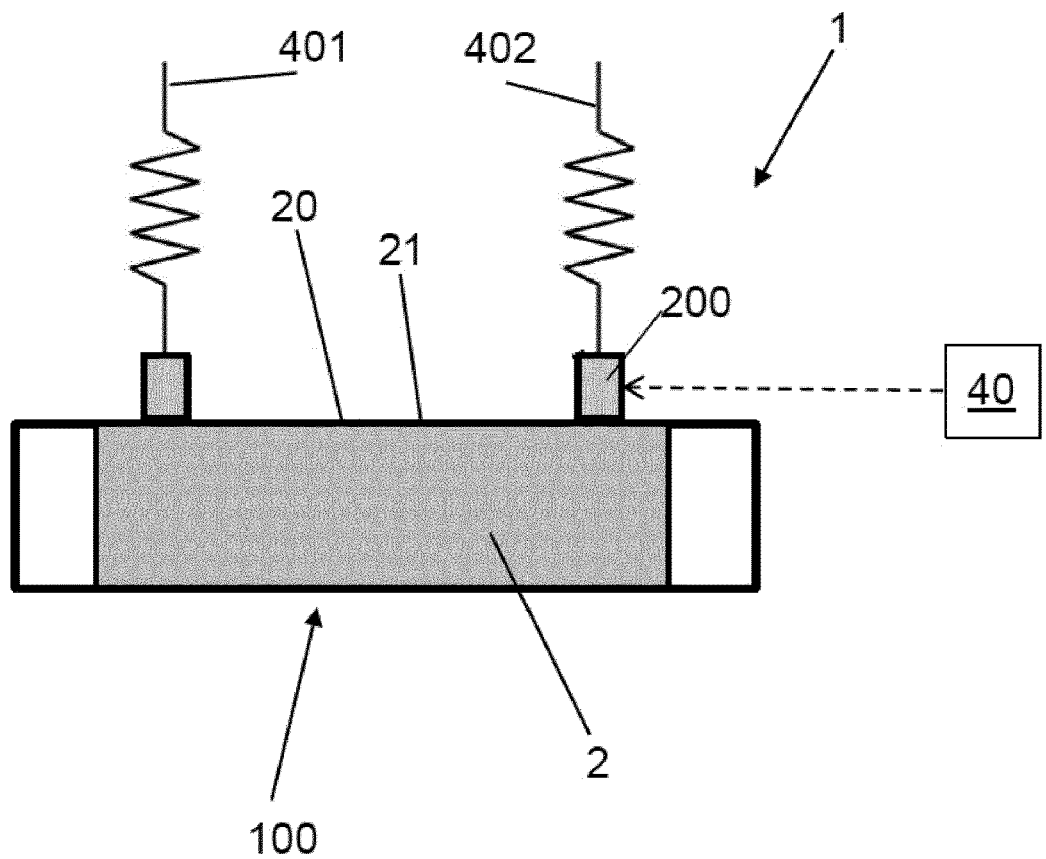
Figure 28:
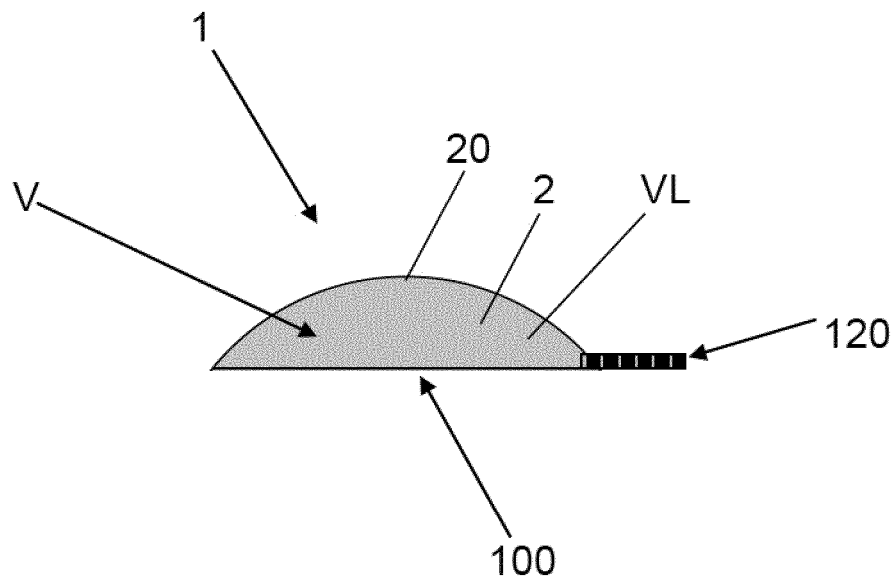
Figure 29:
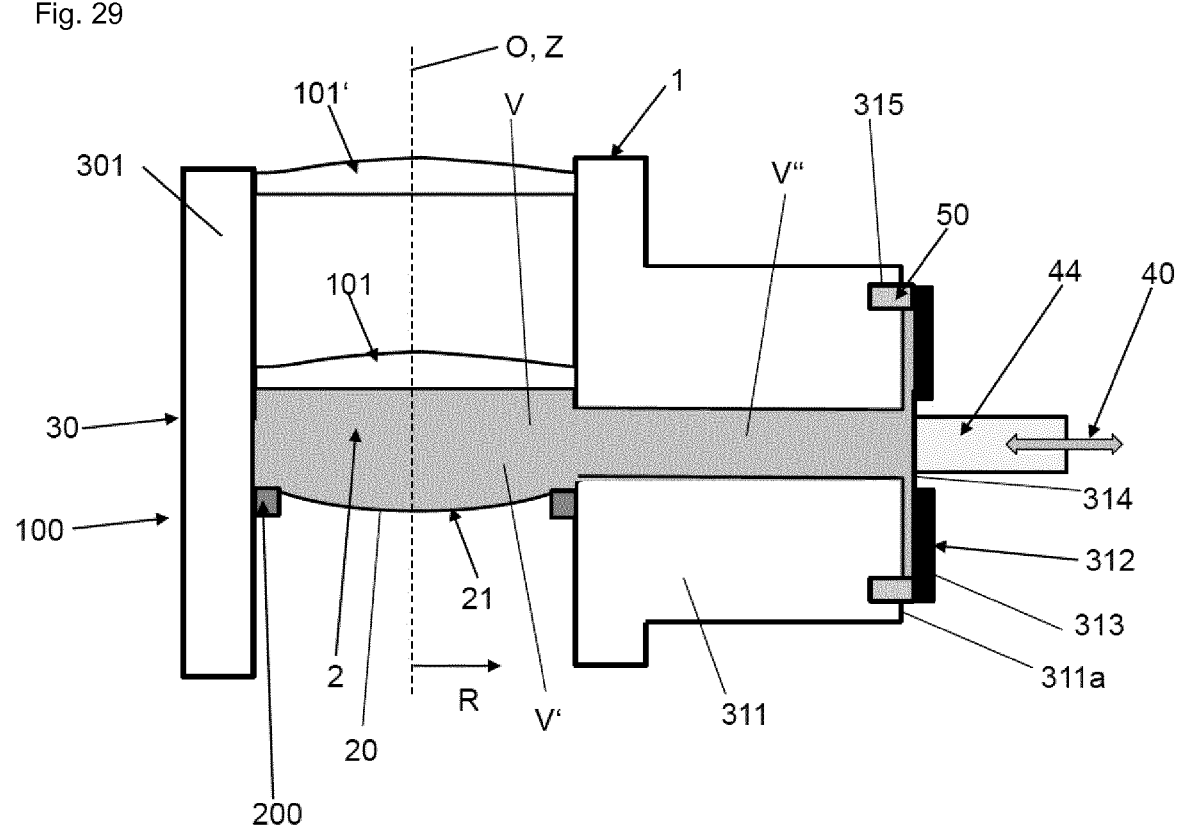
Figure 30:
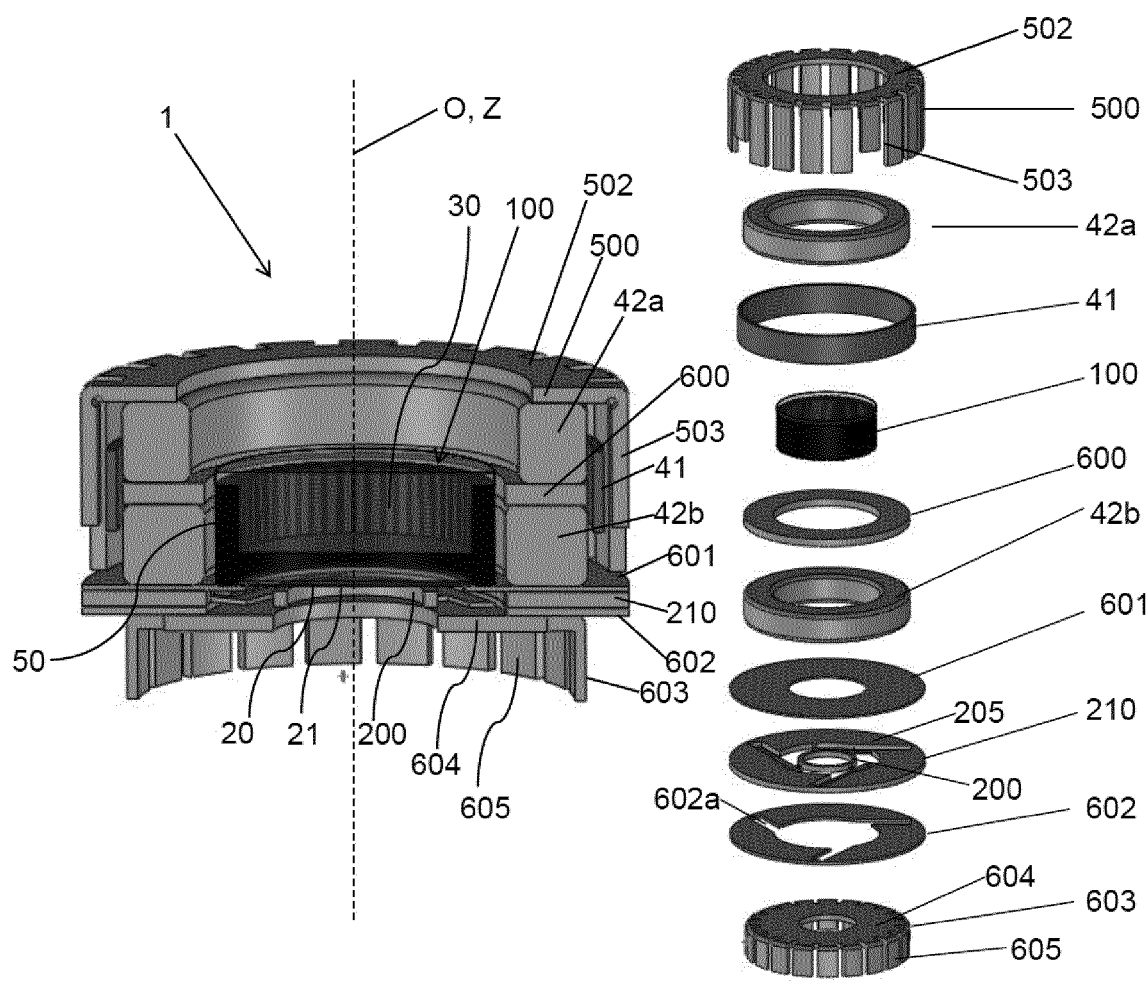
Figure 31:
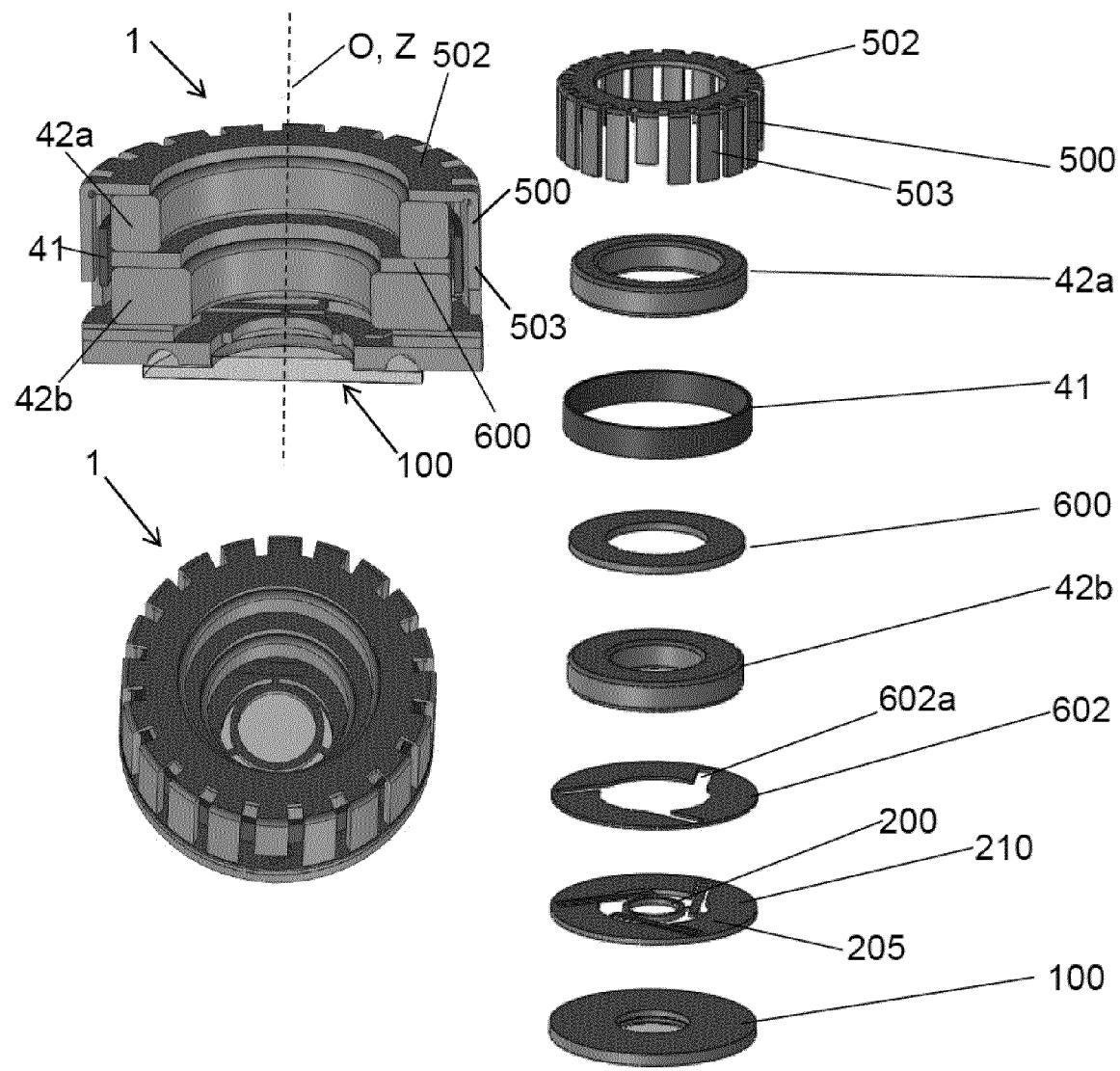
Figure 32:
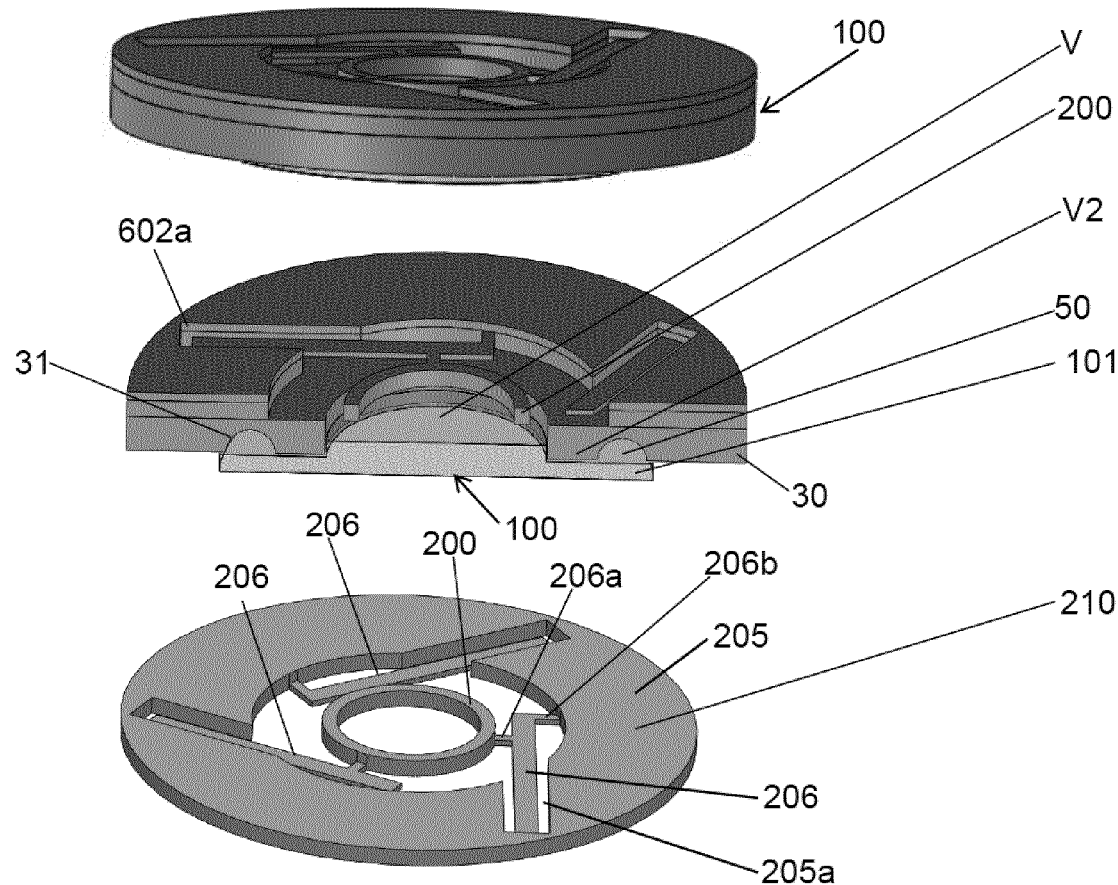

FIG. 16 shows a schematical cross sectional view of modification of the embodiment shown in FIG. 1;

FIG. 17 shows a schematical cross sectional view of modification of the embodiment shown in FIG. 16;

FIG. 18 shows a schematical cross sectional view of a further embodiment of the lens according to the invention, wherein the lens comprises a further chamber filled with a liquid for compensating a thermal drift of the focal power of the lens FIG. 19 shows a graph showing the expansion of the chamber with temperature;

FIG. 20 shows a schematical cross sectional view of a further embodiment of the lens according to the invention, wherein the ring member is constrained by a fixture means so that the ring member expands in a radial direction with increasing temperature;

FIG. 21 shows a graph showing the radial expansion of the ring member with temperature;

FIG. 22 shows a schematical cross sectional view of a further embodiment of the lens according to the invention, wherein the lens comprises a bimetal actuator;

FIG. 23 shows a schematical cross sectional view of a modification of the lens shown in FIG. 22;

FIG. 24 shows a schematical cross sectional view of a further embodiment of the lens according to the invention, wherein the lens comprises two spring means interacting with the membrane;

FIG. 25 shows a schematical cross sectional view of a further embodiment of the lens according to the invention, wherein the lens comprises an expansion element, particularly comprising polycarbonate;

FIG. 26 shows a schematical cross sectional view of a further embodiment of the lens according to the invention, wherein the lens comprises a contraction element comprising a negative thermal expansion coefficient;

FIG. 27 shows a schematical cross sectional view of a further embodiment of the lens according to the invention, wherein the lens comprises an actuator for adjusting the curvature of a central area of the membrane, wherein said actuator is pretensioned against the membrane by means of a spring member for compensating a thermal drift of the refractive index of the liquid or a volume change of the liquid;

FIG. 28 shows a schematical cross sectional view of a further embodiment of the lens according to the invention, wherein the lens comprises a discrete volume pump for compensating the expansion and RI change simultaneously;

FIG. 29 shows a schematical cross sectional view of a further embodiment of the lens according to the invention, wherein the lens comprises a rigid member in the form of a lens barrel from which a reservoir section protrudes for housing a reservoir for the liquid from which liquid can be pushed into the lens volume or drawn off the lens volume and transferred to the reservoir volume;

FIG. 30 shows a cross sectional view of an embodiment of the lens according to the invention, as well as an exploded view showing individual components;

FIG. 31 shows a cross sectional view of a further embodiment of the lens according to the invention, as well as an exploded view showing individual components FIG. 32 shows components of FIG. 31

Figure 6:
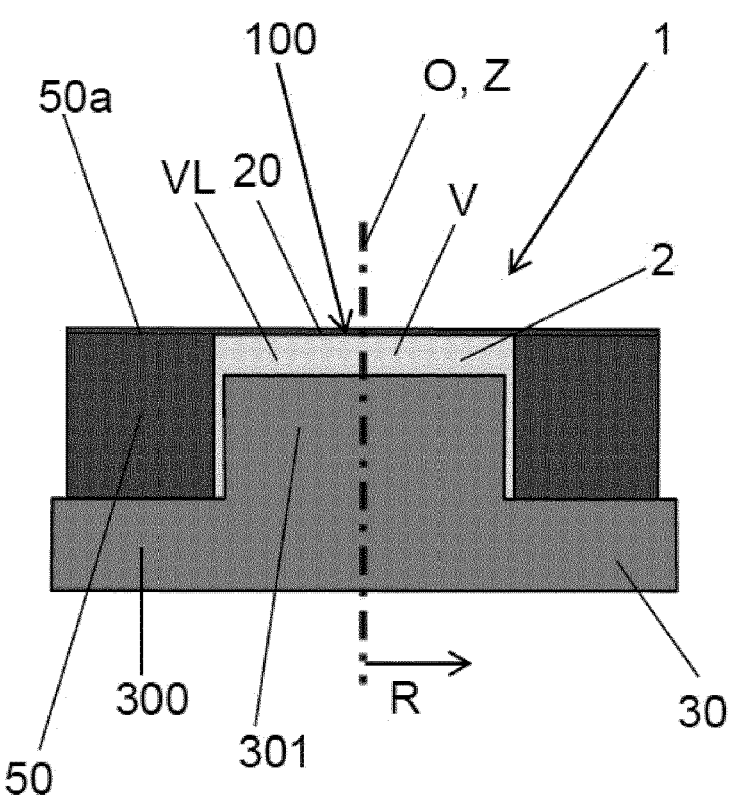
FIG. 6 shows a schematical cross sectional view of an embodiment of a lens according to the invention, wherein the rigid member comprises a protrusion protruding from a base of the rigid member, which protrusion is encompassed by the ring member.
Figure 33:
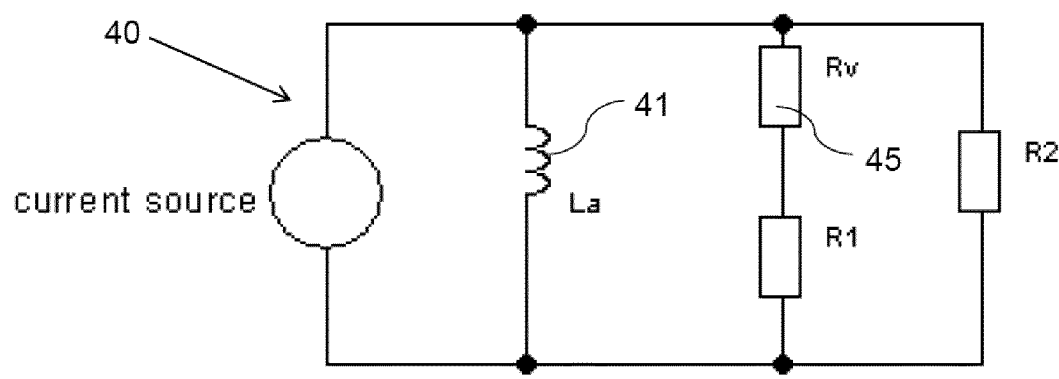
Figure 34:
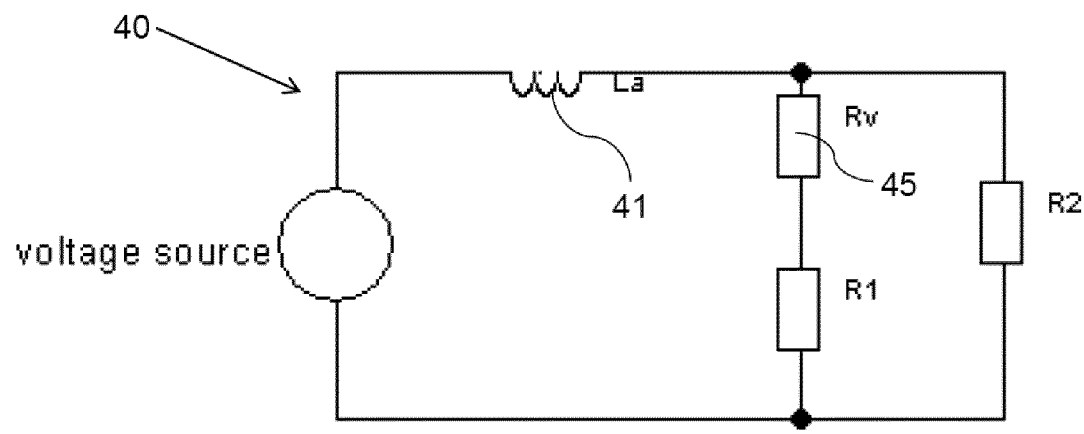
Figure 35:
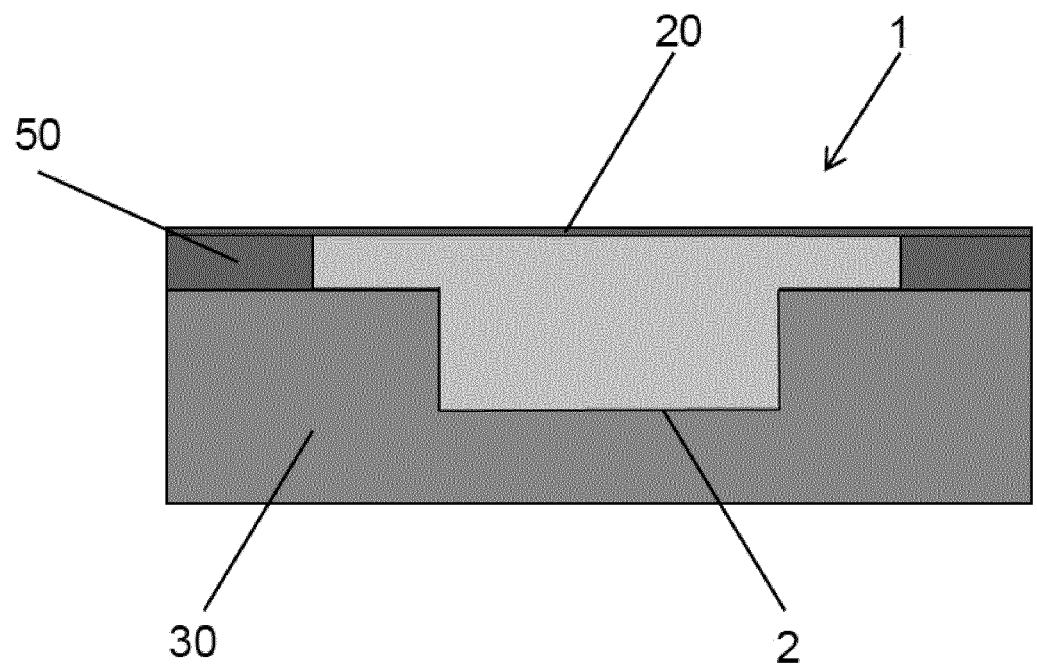
Figure 36:
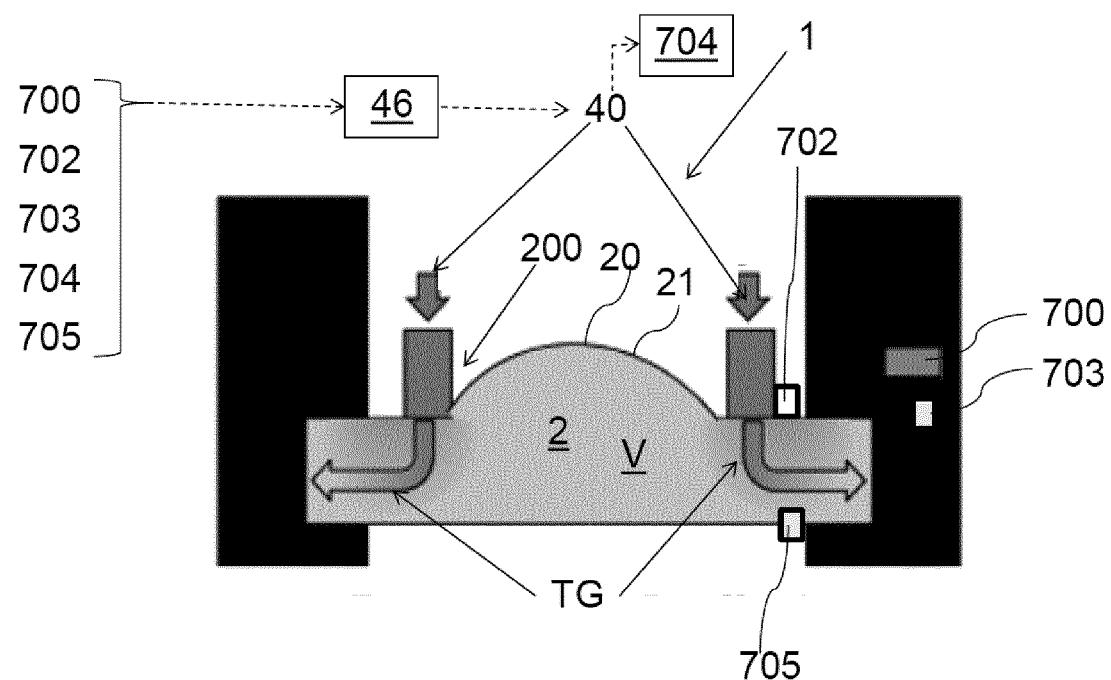
Figure 37:
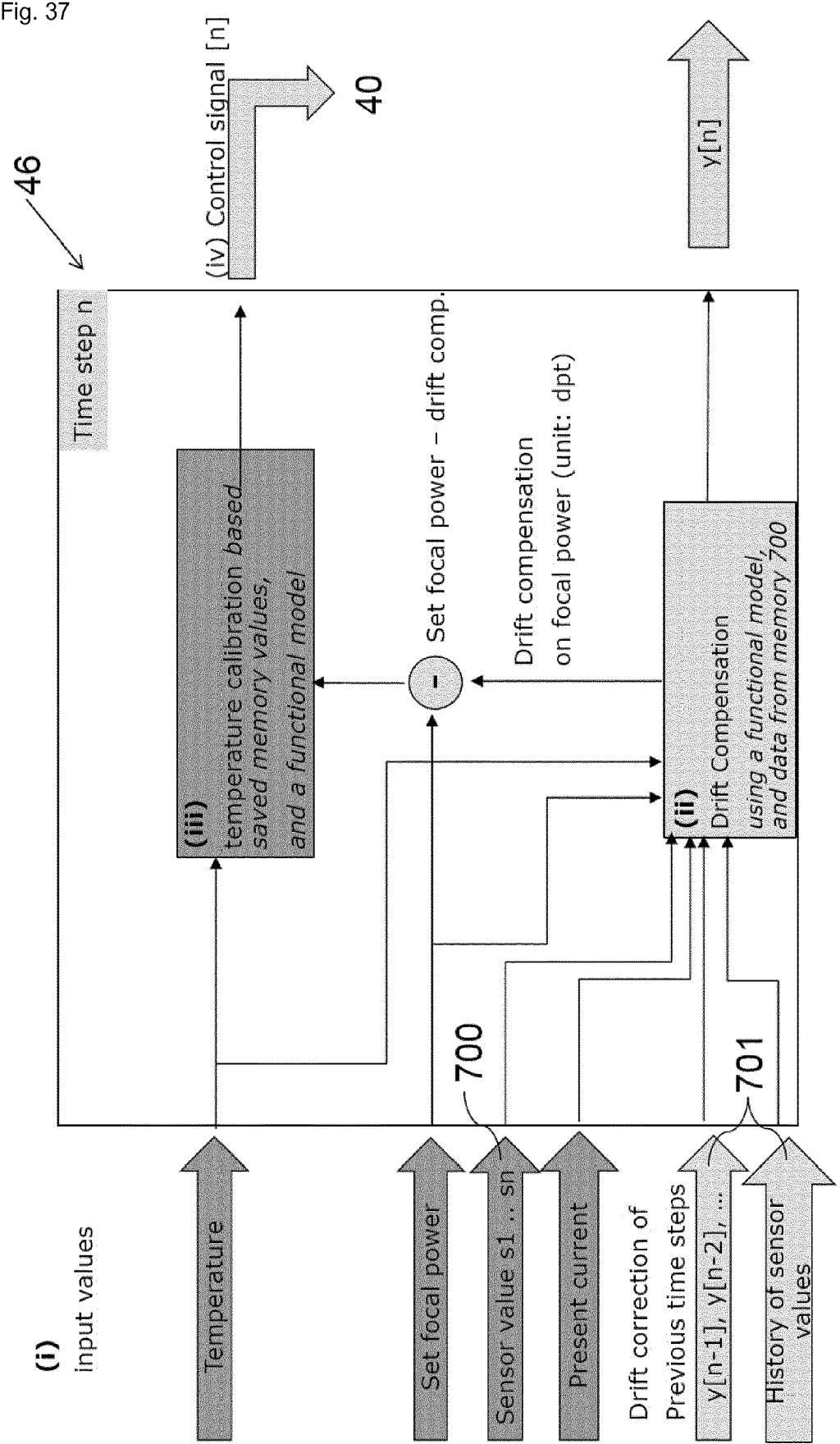

FIG. 33 shows a circuit for compensating a thermal drift of the refractive index of the liquid using a current-controlled coil of the actuator;

FIG. 34 shows a circuit for compensating a thermal drift of the refractive index of the liquid using a voltage-controlled coil of the actuator;

FIG. 35 shows a modification of the embodiment shown in FIG. 6 in case the CTE of the ring member is larger than that of the liquid;

FIG. 36 shows a schematic illustration of a lens according to the invention, wherein temperature gradients influencing the liquid and the refractive index of the letter are generated due to heat created by an actuator of the lens;

FIG. 37 shows a schematic representation of a control algorithm according to the present invention used for controlling an actuator of the lens according to the invention in order to compensate for external as well as internal heat sources and particularly viscoelastic changes in the membrane.

Figure 38:
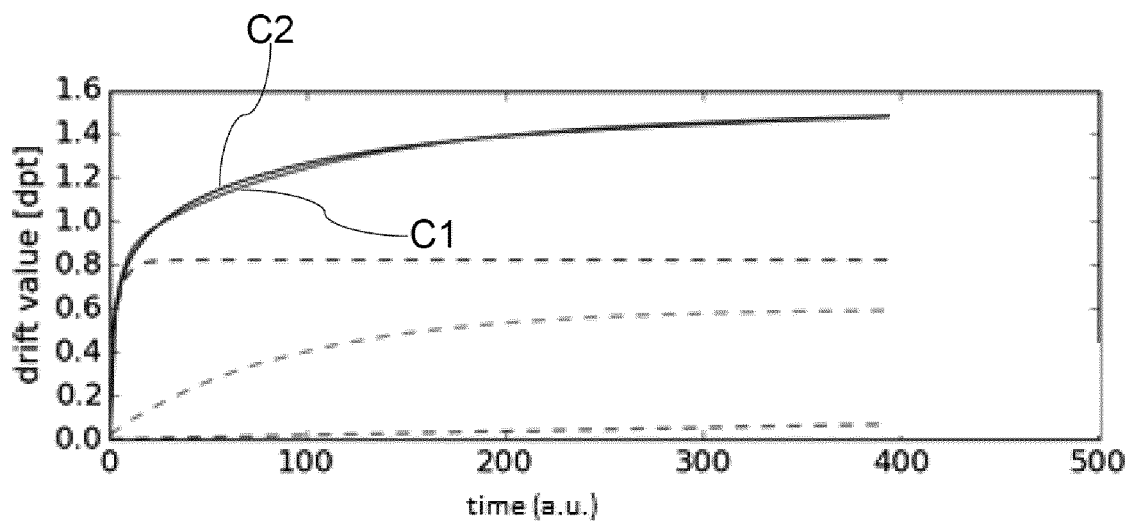
Figure 39:
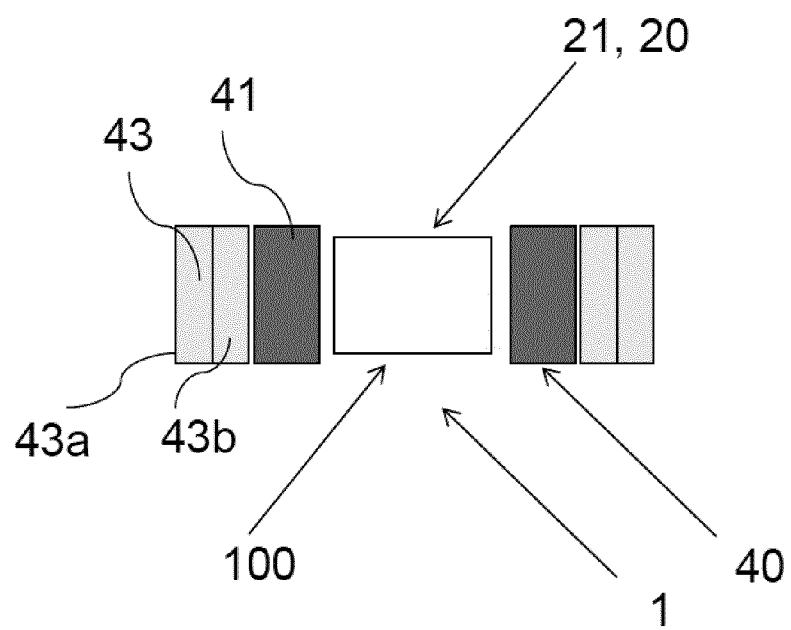
Figure 40:
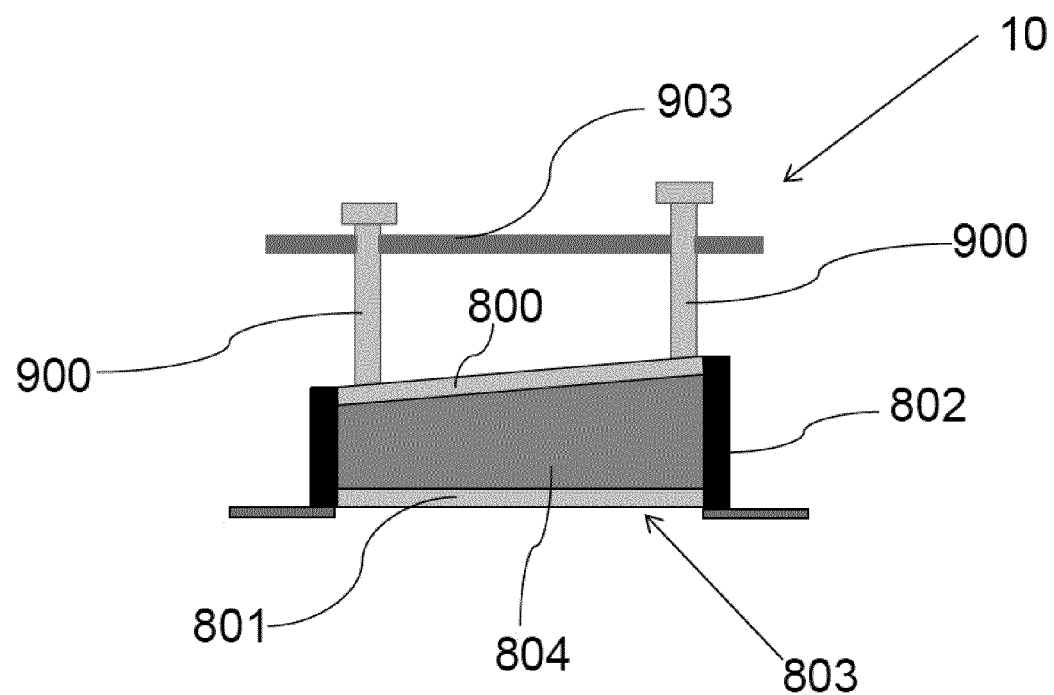
Figure 41:
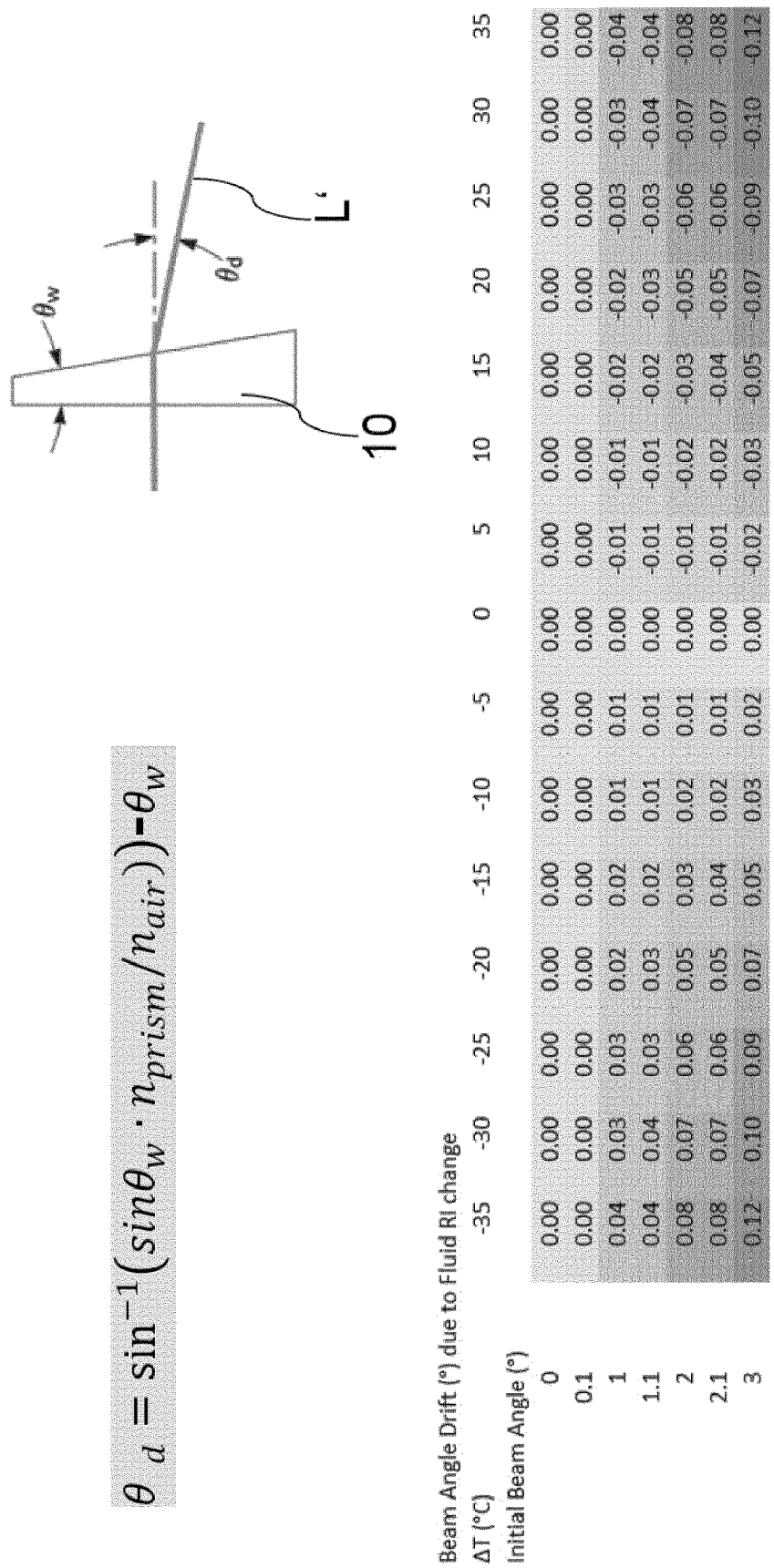
Figure 42:
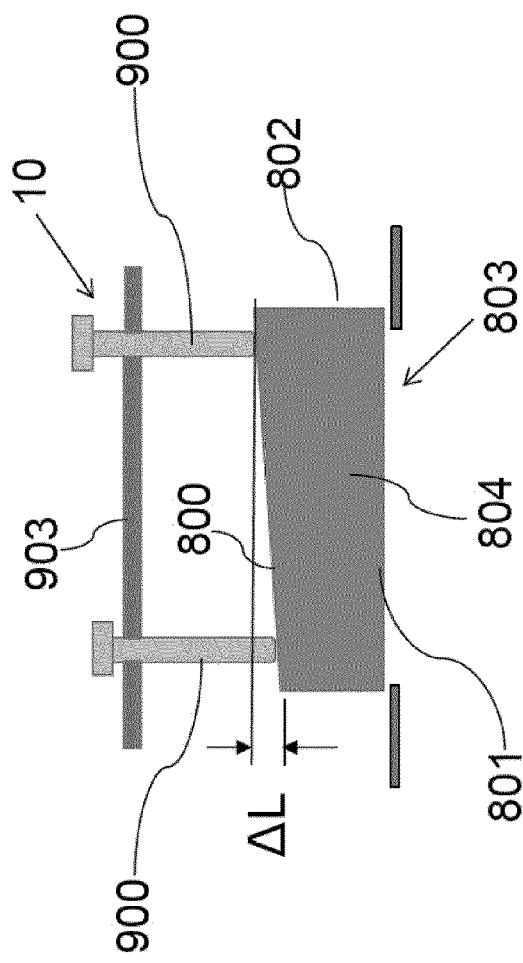
Figure 43:
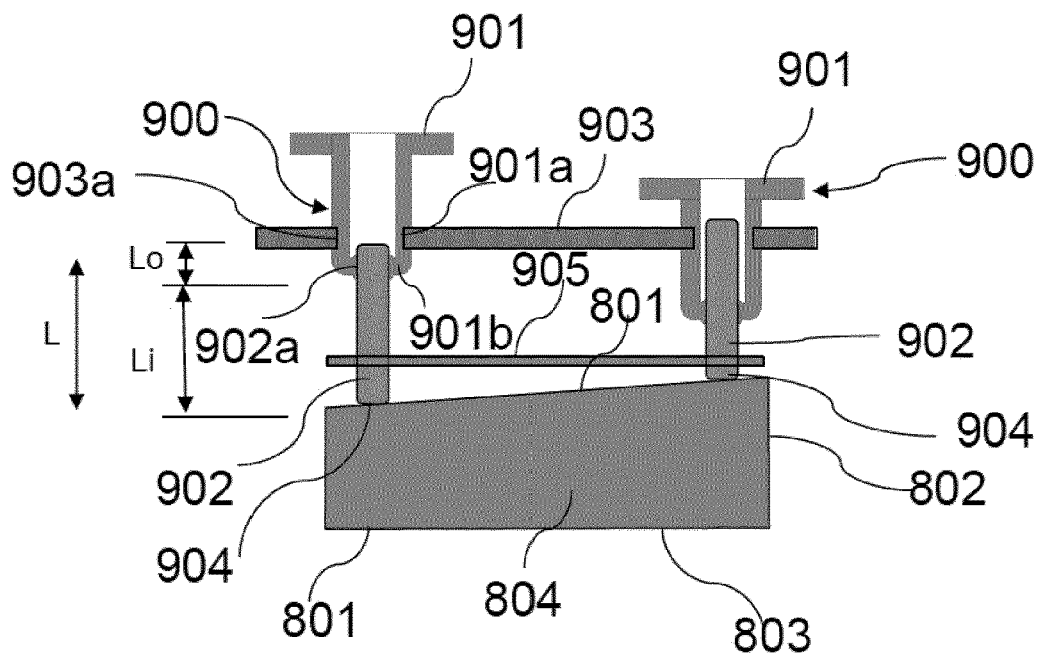
Figure 44:
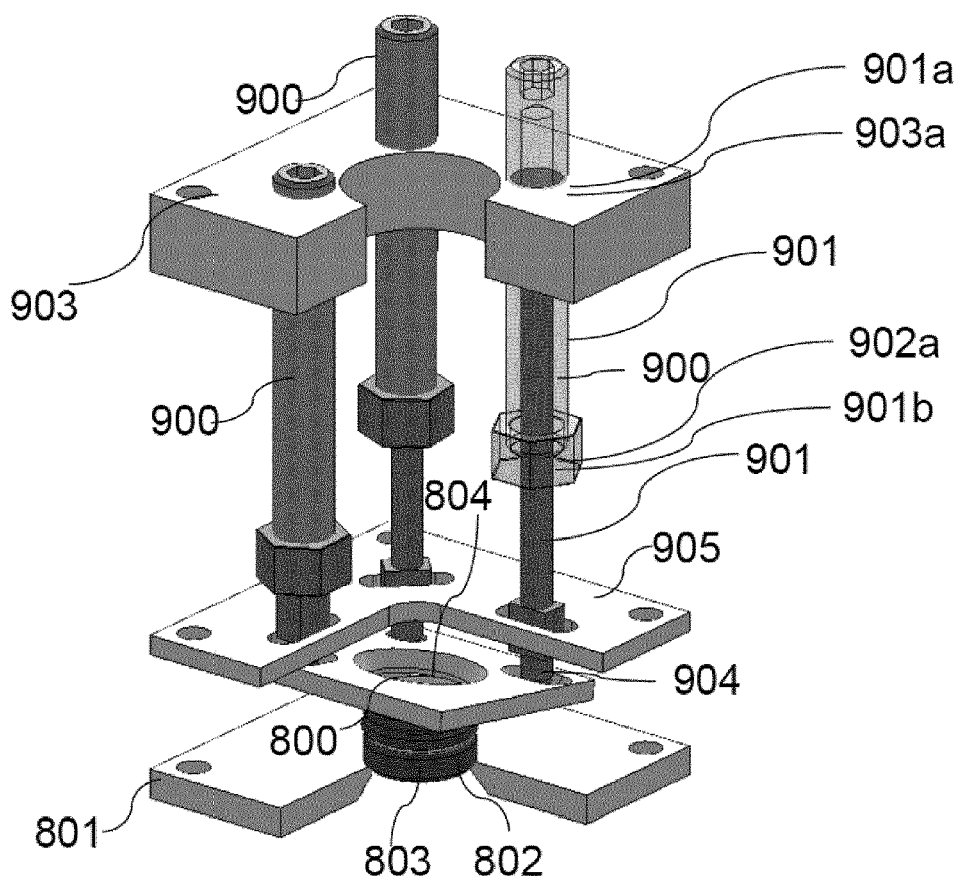

FIG. 38 shows an accumulated drift value (dpt) of the focal power of the lens (solid curve C1) according to the invention versus time. In this figure the accumulated drift value is modelled (solid curve C2) by the sum of three first order lag elements (dashed lines) that have different magnitude and different time constants;

FIG. 39 shows a schematic cross sectional view of the lens according to the invention comprising a second dummy coil of an actuator of the lens for receiving an electrical current so that the total electrical power in all courts of the actuator is constant;

FIG. 40 shows a schematic cross sectional view of an optical device according to the invention (tunable prism);

FIG. 41 shows the beam angle drift (table) of a light beam passing through a prism consisting out of a liquid in a glass container due to a change in the liquid's refractive index RI resulting from a change in temperature $\Delta T$;

FIG. 42 demonstrates the reduction in beam angle drift achieved by the present invention;

FIG. 43 shows a schematic cross sectional view of an embodiment of an optical device (tunable prism) according to the invention; and FIG. 44 shows a perspective view of an embodiment of an optical device (tunable prism) according to the invention.

FIG. 1 shows an embodiment of a lens 1 according to the invention which comprises a container 100 defining a volume V which is filled with a transparent liquid 2. The container 100 comprises a transparent and elastically deformable membrane 20, a transparent rigid member 30, as well as a ring member 50, wherein the membrane 20, the rigid member 30 and the ring member 50 delimit said volume V.

Here, the transparent rigid member 30 and the membrane 20 extend along a fictitious extension plane and face each other in a direction z in which the optical axis O of the lens 1 extends (said optical axis O and said direction z extend perpendicular to said extension plane), wherein the liquid 2 is arranged between the membrane 20 and the rigid member 30. The ring member 50 forms a circumferential lateral wall of the container 100 that extends along said extension plane and comprises a height or dimension extending in said direction z. Particularly, the optical axis O forms a cylinder axis of the ring member 50.

Further, the ring member 50 comprises a circumferential face side 50a facing away from the rigid member 30. The membrane 20 is attached to said face side with a boundary region of the membrane, wherein a lens shaping element 200, particularly in the form of an annular, particularly circular, member, is attached to the boundary region of the membrane 20 such that the boundary region of the membrane 20 is arranged between said face side 50a and between the lens shaper 200. The lens shaper 200 surrounds an opening of the lens shaper 200 and contacts the membrane along an e.g. circular line. Thus, the lens shaper defines an area 21 (delimited by said line) which is covers said opening of the lens shaper 200 and constitutes a curvature-adjustable area 21 of the membrane 20. In case the lens shaper is a circular annular member said area 21 can assume a spherical curvature. Correspondingly, the lens 1 is a spherical lens in this regard.

Of course the lens shaper 200 may also comprise other contact lines for yielding other curvatures.

Particularly, the ring member 50 and the lens shaper 200 may have a (hollow) cylindrical shape, respectively.

In order to adjust the curvature of said area 21, the ring member 50 is elastically deformable in the direction z (i.e. in the direction of the optical axis O) and the lens shaper 200 is configured to be moved in or counter to the direction z (i.e. along the optical axis O of the lens 1). By means of such an axial movement the lens shaper 200, a force can be exerted onto the membrane that adjusts said curvature as intended. This is due to the fact that the volume V is filled with the incompressible liquid 2, so that an axial movement of the lens shaper 200 that tends to compress the volume 200 leads to an increased convex curvature of said area 21 of the membrane 20 due to the incompressible liquid 2 filling said volume V. At the same time, an axial movement of the lens shaper 200 that tends to expand the volume V leads to a decreased curvature of said area 21 of the membrane. The equilibrium position or curvature of the membrane 21 can be adjusted by means of the amount of liquid 2 that is filled into the volume V. Therefore, light that passes said area 21 of the membrane, the volume V and the rigid member 30 along the optical axis O can be deflected according to the curvature of said area 21. The focal length of the lens 1 can thus be adjusted by adjusting the curvature of said area 21. The lens shaper 200 can be moved axially manually or by means of an actuator 40 as described herein and further below. Further, as described above, the lens shaper 200 can also act on the membrane 20 in other ways in order to adjust said curvature of said area 21 which here defines an aperture of the lens 1.

However, during usage of the lens 1, the temperature of the lens 1 and therefore of the liquid 2 residing in said volume V of the container 200 may change and particularly increase for various reasons. Such an increasing temperature leads to an increase of the volume VL of the liquid 2 and therefore to an increased (e.g. convex) curvature of said area 21 of the lens 1 and thus to a decreasing focal length. Further, the refractive index (RI) of the liquid 2 may change (e.g. decrease) when the temperature changes (e.g. increases). Usually, the RI decreases when the temperature of the material (here liquid 2) rises such that the focal power of the lens decreases, i.e. the focal length increases.

Therefore, the lens 1 is configured to compensate such a thermal expansion of the liquid 2 and/or a change of the refractive index of the liquid 2 due to an increased temperature of the liquid 2 in order to reduce an unwanted thermally induced change of the focal length of the lens 1.

Particularly, in order to accomplish a compensation of the thermal drift of the volume VL of the liquid 2 in the embodiment shown in FIG. 1, the ring member 50 is arranged in a circumferential groove 31 of the rigid member 30 such that the ring member 50 protrudes out of said groove in said direction z with its face side 50a ahead. Particularly, the rigid member 30 can be made of polycarbonate, wherein said ring member 50 (i.e. the lateral wall of the container 100) may consist of silicone that may be molded into said groove 31.

Further, the ring member 50 comprises a comparably high linear coefficient of thermal expansion (CTE), e.g. similar or smaller than the linear coefficient of thermal expansion of the liquid 2 (which may be derived from the volumetric value), whereas the rigid member 30 comprises a smaller linear CTE than the liquid 2 and the ring member 50 (however, the CTE of the ring member 50 may also be larger than the linear coefficient of thermal expansion of the liquid 2, see below FIG. 35).

Therefore, in the radial direction R that extends along said extension plane (i.e. perpendicular to the direction z or optical axis O), the rigid member 30 expands less than the liquid 2 due to the smaller linear CTE of the rigid member 30. Normally, this would lead to a change of the volume V of the liquid container 100, wherein the increasing curvature of the area 21 of the membrane 20 caused by the increasing intrinsic volume VL of the liquid 2 (that increases faster than the actual volume V of the container 100) causes an unwanted thermal change of the lens' focal power.

However, here, the ring member 50 is dimensioned such that its expansion in z direction due to an increasing temperature yields an increase of the volume V of the container 100 that approximately corresponds to the increase of the volume VL of the liquid 2. In this way, the curvature of said area 21 stays essentially constant in particular infinite when the temperature of the lens 1/liquid 2 changes. Particularly, the dimension/height of the ring member 50 in z direction is larger than the height of the liquid 2 in the volume V in the same direction z. Thus considering the linear expansion in z direction, the lateral wall (ring member) 50 of the container 100 of the lens 1 will expand more than the liquid 2 if their linear CTEs are equal for instance.

Particularly, in order to amplify the expansion of the ring member 50 in z direction with respect to the liquid 2, the lateral expansion of the ring member 50 (i.e. in the radial direction R) can be restricted by arranging the ring member 50 in said groove 31 as described above so that some part of the expansion gets redirected into said direction z. In this way, the expansion of the ring member 50 in z direction can be higher than the actual linear CTE, i.e. the thermal expansion of the ring member 50 in z direction can be amplified as needed.

Preferably, the ring member 50 (e.g. silicone) is molded into said groove, particularly such that no air is trapped inside the groove 31. Further, the liquid 2 can be filled into the volume V of the container by injecting it into the volume V with a syringe needle through the ring member 50.

Figure 2:
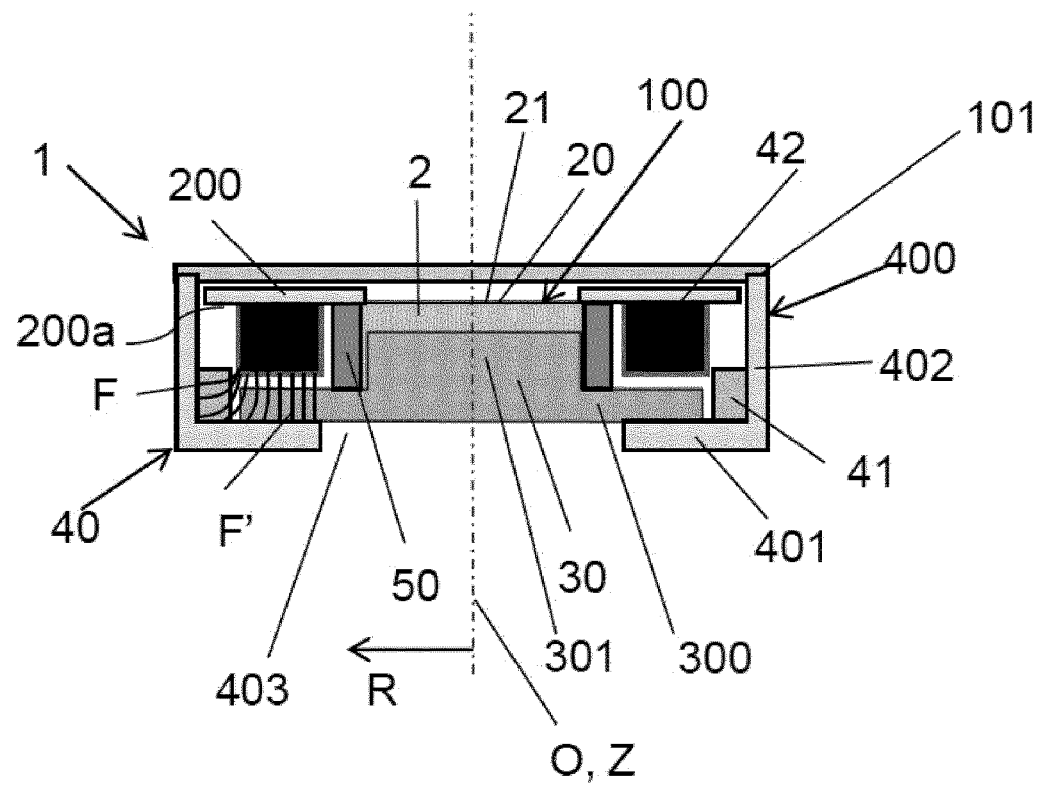
FIG. 2 shows a schematical cross sectional view of an embodiment of a lens according to the invention having a ring member surrounding a protrusion of the rigid member, wherein the lens comprises an actuator having a coil and a magnet, wherein the magnet is connected to the lens shaper and the coil to a housing of the lens.
Figure 3:
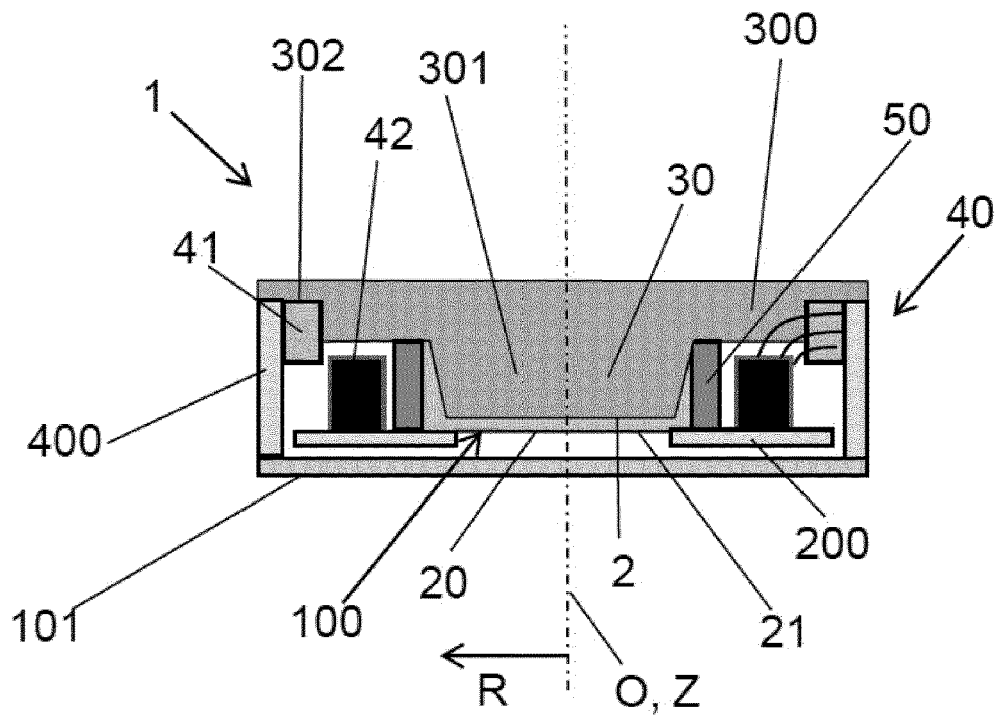
FIG. 3 shows a schematical cross sectional view of a modification of the lens shown in FIG. 2.

It is to be noted however, that the CTE of the ring member 50 may also be larger that the CTE of the liquid 2 as shown in FIG. 35. Here, the distance between the rigid optical member 30 (e.g. plastic lens) having the smallest thermal expansion and the membrane 20 is larger in the optical path than on the edge where the ring member is arranged, which allows for a compensation of a temperature induced increase in the volume V of the liquid 2 although the CTE of the ring member 50 is higher than that of the liquid 2. FIGS. 2 and 3 show different ways of providing an actuation for the lens shaper 200 by means of an actuator 40. It is to be noted that in FIGS. 2 and 3 the ring member 50 is not arranged in a groove 31 of the rigid member 30 as shown in FIG. 1. However, the concepts of FIGS. 2 and 3 can be readily applied to the embodiment shown in FIG. 1 as well.

According to FIG. 2, the lens 1 comprises, similar to the configuration described with reference to FIG. 1, a container 100 defining a volume V which is filled with a transparent liquid 2, wherein said container 100 comprises a transparent and elastically deformable membrane 20, a transparent rigid member 30, as well as a ring member 50, wherein the membrane 20, the rigid member 30 and the ring member 50 delimit said volume V.

Like before, the transparent rigid member 30 and the membrane 20 extend along a fictitious extension plane and face each other in a direction z in which the optical axis O of the lens 1 extends (said optical axis O and said direction z extend perpendicular to said extension plane). The liquid 2 is arranged between the membrane 20 and the rigid member 30. The ring member 50 forms a circumferential lateral wall of the container 100 that extends along said extension plane and comprises a height or dimension extending in said direction z, wherein in contrast to FIG. 1, the ring member 50 is not arranged in a groove of the rigid member 30 but encompasses a protrusion 301 of the rigid member 30 that protrudes from a base 300 of the rigid member 30 in the z direction, which will be described in detail below.

Again, the ring member 50 has a dimension (height) in the z direction that is larger than the height of liquid 2 in the volume V of the container 100, wherein the membrane 20 is attached between the lens shaper 200 and the face side 50a of the ring member 50 as described in conjunction with FIG. 1.

The actuator 40 comprises a coil 41 and a magnet 42 as well as an energy source and a control unit for controlling the actuator 40 which energy source and control unit are not shown in FIG. 2. The control unit is configured to apply an electric current or a voltage to the coil 41 so that the current/magnetic field generated by the coil 41 interacts with the magnetic field F, F' of said magnet 42 in order to generate an axial movement of the lens shaper 200, which is magnetically conductive. For this, the lens shaper 200 extends beyond the ring member 50 in the radial direction R and the magnet 42 (or several magnets) is connected to a resulting free portion of a lower side 200a of the lens shaper 200, which lower side 200a faces the rigid member 30 in z direction.

In the z direction, the magnet 42, which is magnetized in the z direction, faces a circumferential bottom region 401 of a magnetic field return structure 400 for guiding the magnetic field generated by the magnet 42. This bottom region 401 extends perpendicular to the optical axis O/direction z and delimits an opening 403 of the magnetic field return structure 400 through which light passing through the membrane 20, the volume V and the rigid member 30 can exit the lens 1. Further, the bottom region 401 may support the base 300 of the rigid member 30.

The return structure 400 further comprises a lateral region 402 that projects from an outer edge of the bottom portion 401 (the return structure 400 thus comprises an L-shaped profile or cross section) and encompasses the magnet 42, the lens shaper 200, the ring member 50, said volume V, the membrane 20, as well as the coil 41. A face side of the lateral portion 402 that faces away from the bottom portion 401 of the return structure 400 is connected to a transparent cover element (e.g. cover glass) 101 that extends perpendicular to the optical axis O/direction z and faces and protects the membrane 20 in the latter direction. The cover element 101 and the return structure 400 provide a housing of the lens 1.

Further, the coil 41 extends circumferentially around the periphery of the base 300 of rigid member 30 and is arranged in a corner formed by the lateral and the bottom portion 402, 401 of the return structure 400. The coil 41 is arranged radially outwards from the magnet 42 so that a first portion F of the magnetic field of the magnet 42 comprises magnetic field lines in the vicinity of the coil 41 that extend along the radial direction R. Thus, this portion F of the magnetic field of the magnet 42 generates an axial (Lorentz) force on the magnet 42 when a current flows through the coil 41 (controlled by the control unit) and thus on the lens shaper 200 that runs along the z direction/optical axis O and—depending on the direction of the current in the circumferential coil 41—pushes the lens shaper 200 away from the rigid member 30 to which the coil is coupled in said axial direction z or towards the rigid member 30 in said axial direction z. In the first case the curvature of said central area 21 of the membrane 20 decreases, while in the second case it increases due to the presence of the (incompressible) liquid 2 in the volume V of the container 100.

Further, the magnetic field of the magnet 42 comprises a second portion F' comprising magnetic field lines that extend along the axial direction (i.e. along the z direction or the optical axis O) and impinge on the bottom portion 401 of the return structure 400. This field F' results in an attractive force (pulling the lens shaper towards the rigid member 39) which increases when the volume V is compressed resulting in a negative spring. Particularly, said force is attractive due to the fact that the magnetic field lines "like" to be closed (lower energy state), so the magnet is pulled down. As the magnet lowers itself, it is pulled down stronger as the air gaps diminish.

FIG. 3 shows a modification of the embodiment shown in FIG. 2, wherein in contrast to FIG. 2, the return structure 400 now merely comprises a lateral portion 400 forming a cylinder wherein the cover element 101 is attached to one face side of the return structure (as before) while the rigid member 30 is attached to the other face side of the return structure 400. Further, the base 300 of the rigid member 30 comprises a circumferential step 302 which receives the coil 41. Since the bottom region 401 of the return structure 400 is missing, there is no attractive force resulting from a field portion F' as in the embodiment shown in FIG. 2.

Figure 4:
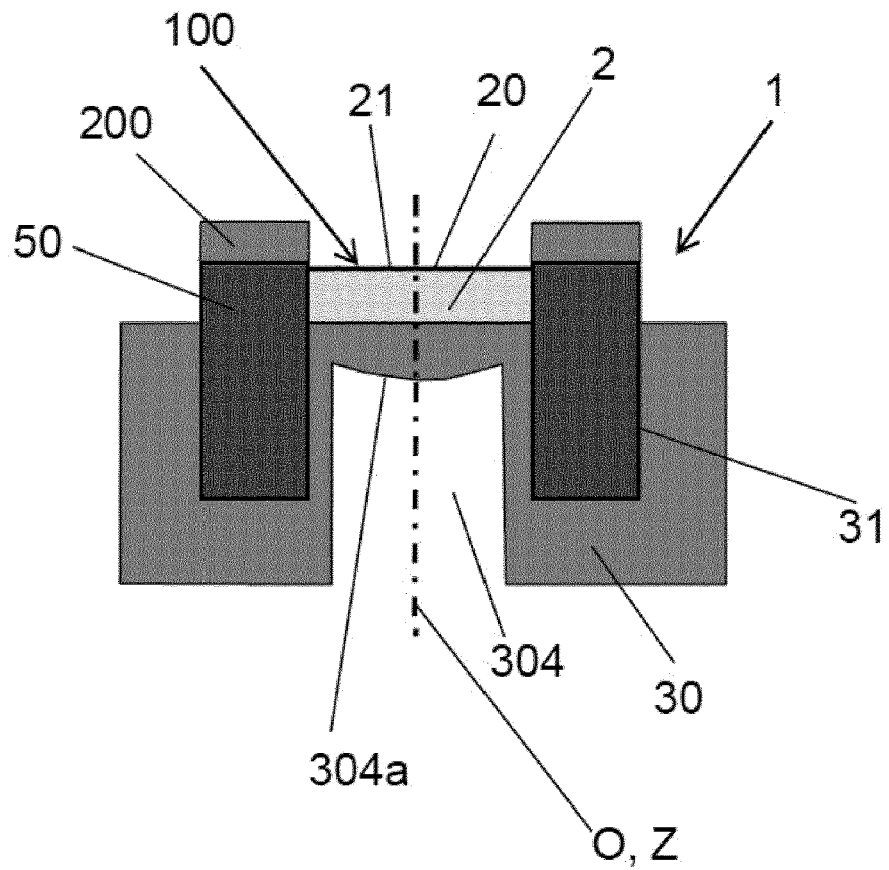
FIG. 4 shows a schematical cross sectional view of a modification of the lens shown in FIG. 1, wherein the rigid member comprises a recess having a curved bottom for forming the rigid member into a lens itself.

FIG. 4 shows a further embodiment of the present invention which is a modification of the embodiment shown in FIG. 1. Here, in addition, the rigid member 30 comprises a recess 304 having a bottom 304a that forms a convex surface region of the rigid member 30 allowing deflection of light that enters or leaves the lens 1 through this surface region 304a. Thus, by forming a defined recess into the rigid member 30, a corrective optical element forming part of the lens 1 can be provided that is configured to deflect light passing the lens 1 in a defined manner.

Figure 5:
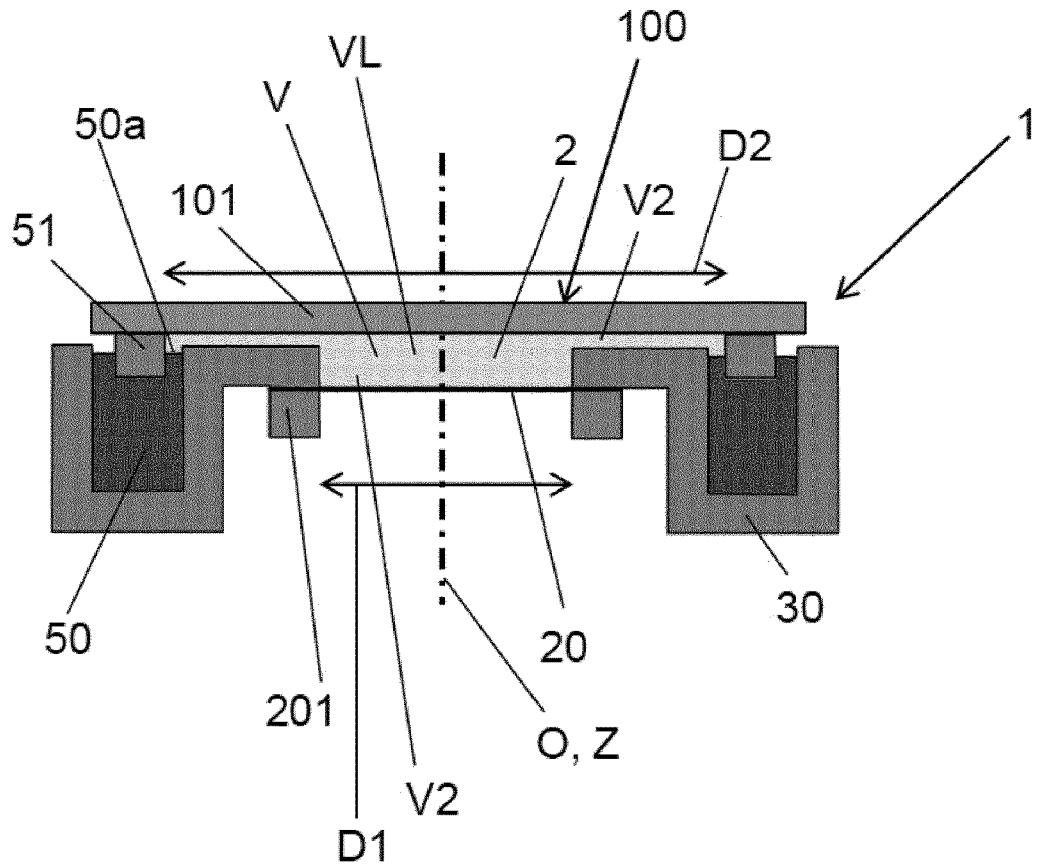
FIG. 5 shows a schematical cross sectional view of an embodiment of a lens according to the invention, wherein the rigid member comprises a through hole and wherein the ring member is completely arranged inside a groove of the rigid member.

FIG. 5 shows, as an alternative to FIGS. 1 to 4, the ring member 50 may not protrude out of the groove 31 of the rigid member 30. In such a case a rigid circumferential member 51 may be connected to the face side 50a of the ring member 50 according to FIG. 5. This face side 50a may be arranged flush with a boundary region of the groove 31 or may be arranged completely inside the groove 31, wherein then the rigid circumferential member protrudes out of the groove 31.

Particularly in case the rigid member 30 is not transparent, the latter may comprise a through hole 303 (e.g defining an aperture of the lens 1) wherein the membrane 20 is attached to a boundary region delimiting said through opening on a side of the rigid member that faces away from a transparent cover element 101 that is arranged on the other side and connected to the rigid circumferential member 51. In this way, a container 100 comprising a volume V is provided, wherein said volume V is delimited by the membrane 20, the rigid member 30, the transparent cover element 101, the circumferential member 51 and particularly by the ring member 50. Here, the liquid 2 is arranged between the membrane 20 and the cover element 101 so that light can pass through the lens 1 via the through hole 303, membrane 20, volume V and cover element 101.

A lens shaper is not shown in FIG. 5 but may contact an outer side of the membrane 20 that faces away from the cover element 101 so as to define said curvature-adjustable area of the membrane 20 (e.g. along a circular contact line as described above). This lens shaper (e.g. an annular or circular member) may be moved by means of an actuator in the axial direction as described herein, i.e. in the z direction (or along the optical axis O), which extends perpendicular to the membrane 20 as well as to the cover element 101. Due to this axial movement the curvature of said area 21 of the membrane 20 defined by the lens shaper can be adjusted.

Furthermore, the membrane 20 is attached to a circumferential membrane carrier 201 (e.g. a membrane carrier ring), wherein a boundary region of the membrane is arranged between the rigid member (i.e. between the boundary region of the through hole 303) and the membrane carrier 201. Particularly, the membrane 20 is pre-assembled on the membrane carrier 201 if it suits the production process.

Furthermore, the compensation effect can be increased by increasing the radius or diameter of the ring member 50 and circumferential member 51 while the aperture 303 of the lens remains constant. Then, a relatively small expansion of the ring member in the axial direction yields a comparatively large increase of the volume V. In other words, the volume V comprises a first section V1 adjacent the membrane 20 having a first diameter D1 corresponding to the diameter of the aperture 303 and an adjacent second section V2 having the larger (second) diameter D2 of the circumferential member 51. Preferably, the second section V2 is formed as a thin gap that is kept as thin as possible in order to minimize the total amount of the optical liquid 2. Particularly, this embodiment is advantageous where space in the z direction is limited, but space in the radial direction R is available.

FIG. 6 shows another embodiment of a lens 1 according to the invention which is a modification of the embodiment shown in FIG. 1 and relates to a certain configuration of the rigid member 30 that is also used in the embodiments shown in FIGS. 2 and 3. In contrast to FIG. 1 the ring member 50 is not arranged in a groove 31 of the rigid member 30 but rests on a base 300 of the rigid member that extends perpendicular to the optical axis O/direction z and encompasses a cylindrical protrusion 301 that protrudes from the base 300 towards the membrane 20. In other words, this embodiment comprises a free standing ring member 50.

Figure 7:
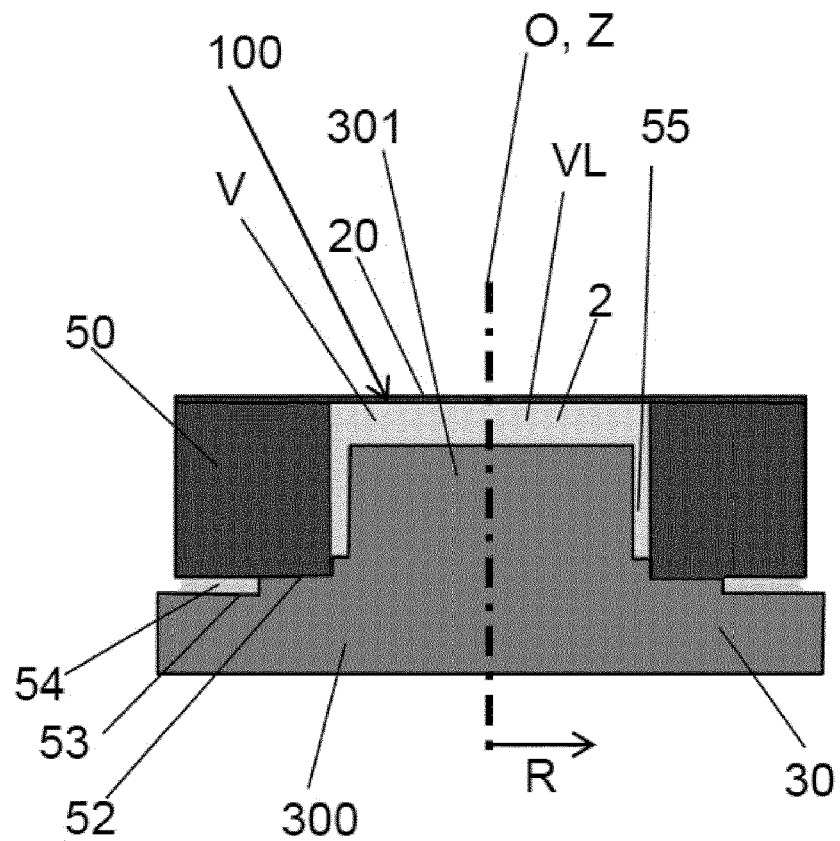
FIG. 7 shows a modification of the lens shown in FIG. 6, wherein the base comprises two circumferential steps for centering the ring member and for receiving a glue for attaching the ring member to the base.

Further, as shown in FIG. 7 that relates to a modification of the embodiment shown in FIG. 6, the base 300 may comprise a circumferential step 52 extending around the protrusion 301, which step 52 is configured to center the ring member 50 with respect to the protrusion 301, wherein the step 52 is configured to receive an inner edge of the ring member 50 in a form-fitting manner so that the latter surrounds the protrusion 300 and is merely separated from the protrusion 300 in the radial direction R by a small gap 55 extending around the protrusion 300.

Further, the base 300 may comprise a further circumferential step 53 that is arranged more outwards in the radial direction than the step 52, wherein a glue 54 is applied to this further step 53 so as to bond the ring member 50 to the base 300. Due to the further step 53, said glue 54 cannot flow into the gap 54 due to capillary forces. A further step may be present which allows to take up any excess liquid.

Again, the radial expansion of the liquid container 100 is smaller than the radial expansion of the liquid 2, as the former is limited by the rigid member's 30 linear CTE, the linear expansion of the ring member 50 in z direction can be used to compensate a thermal expansion of the liquid's volume VL, since the dimension (height) of the ring member 50 in z direction is sufficiently larger than the average height of the liquid 2 in this direction z. As described before, the dimension of the ring member 50 in z direction is chosen such that the temperature induced expansion of the ring member 50 generates an increase of the volume V of the container that preferably matches the increase of the liquid volume VL so that the curvature of the central area of the membrane 20 is not affected by an increasing temperature of the lens 1/liquid 2. In particular, in the case the membrane is flat, the focal power of the lens will remain basically zero.

The rigid member 30 can be made of polycarbonate or another optically transparent material.

Figure 8:
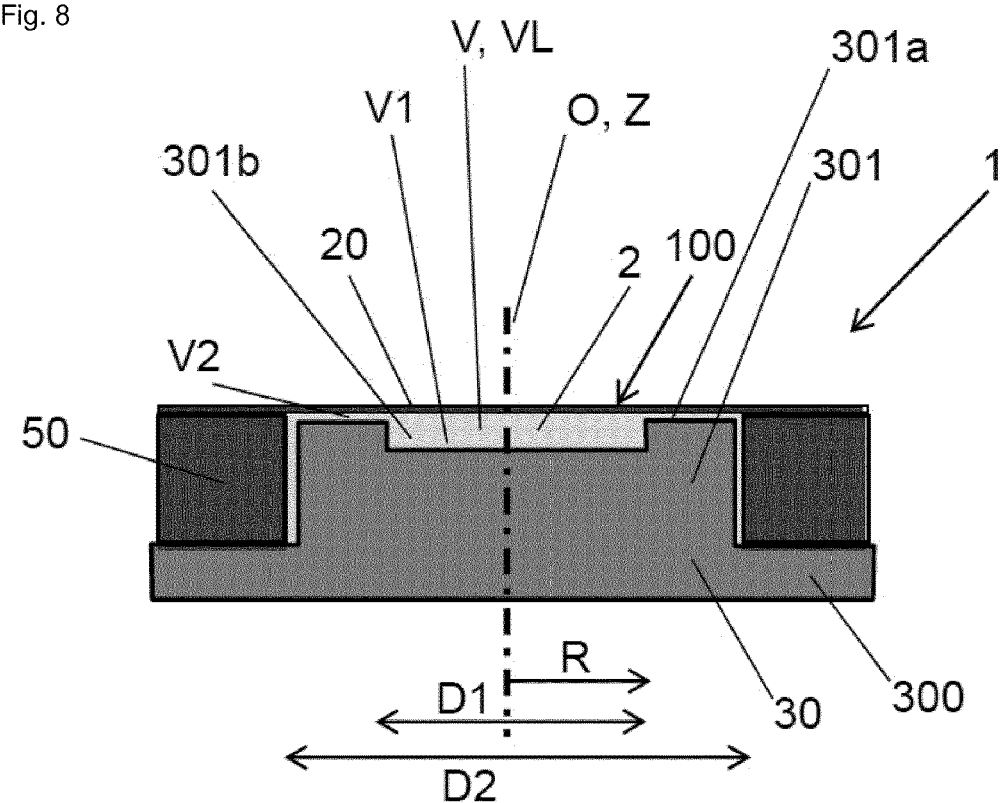
FIG. 8 shows a further modification of the lens shown in FIG. 6, wherein said protrusion comprises a recess facing the membrane.

FIG. 8 shows a further modification of the embodiment shown in FIG. 6, wherein in contrast to FIG. 6, the protrusion 301 of the rigid member 30 does not comprise a flat face side 301a facing the membrane, but a face side 301a comprising a recess 301b.

Due to this recess 301b said volume V of the container comprises a first section V1 namely the volume of the recess that comprises a first diameter D1, and an adjacent second section V2 having a second diameter D2 that is larger than the first diameter D1 of the first section V1. Hence a small expansion of the ring member 50 in the z direction results in a relatively large increase of the volume V due to the larger second diameter D2.

In other words, the effect of the expansion of the ring member 50 is amplified by increasing its diameter D2 while limiting the container's volume V by adding a region with low container depth (outside recess 301b).

Figure 9:
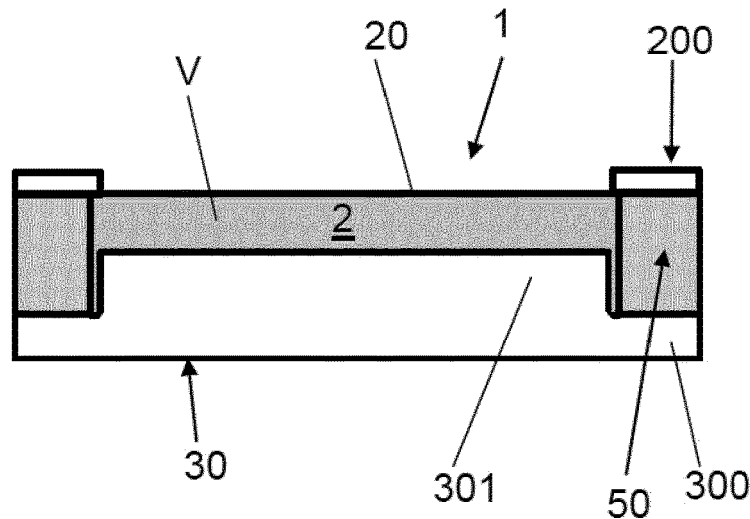
FIG. 9 shows a schematical cross sectional view of an embodiment of the present invention comprising a rigid member having a protrusion and a ring member surrounding the latter, wherein the ring shaper is attached to the ring member.

FIG. 9 shows an embodiment of the lens according to the invention corresponding to FIG. 6 wherein in FIG. 9 a lens shaper 200 is also shown that is attached to the face side 50a of the ring member 50 as described earlier, wherein a boundary region of the membrane 20 is arranged between the face side 50a of the rigid member 50 and the lens shaper 200.

Figure 10:
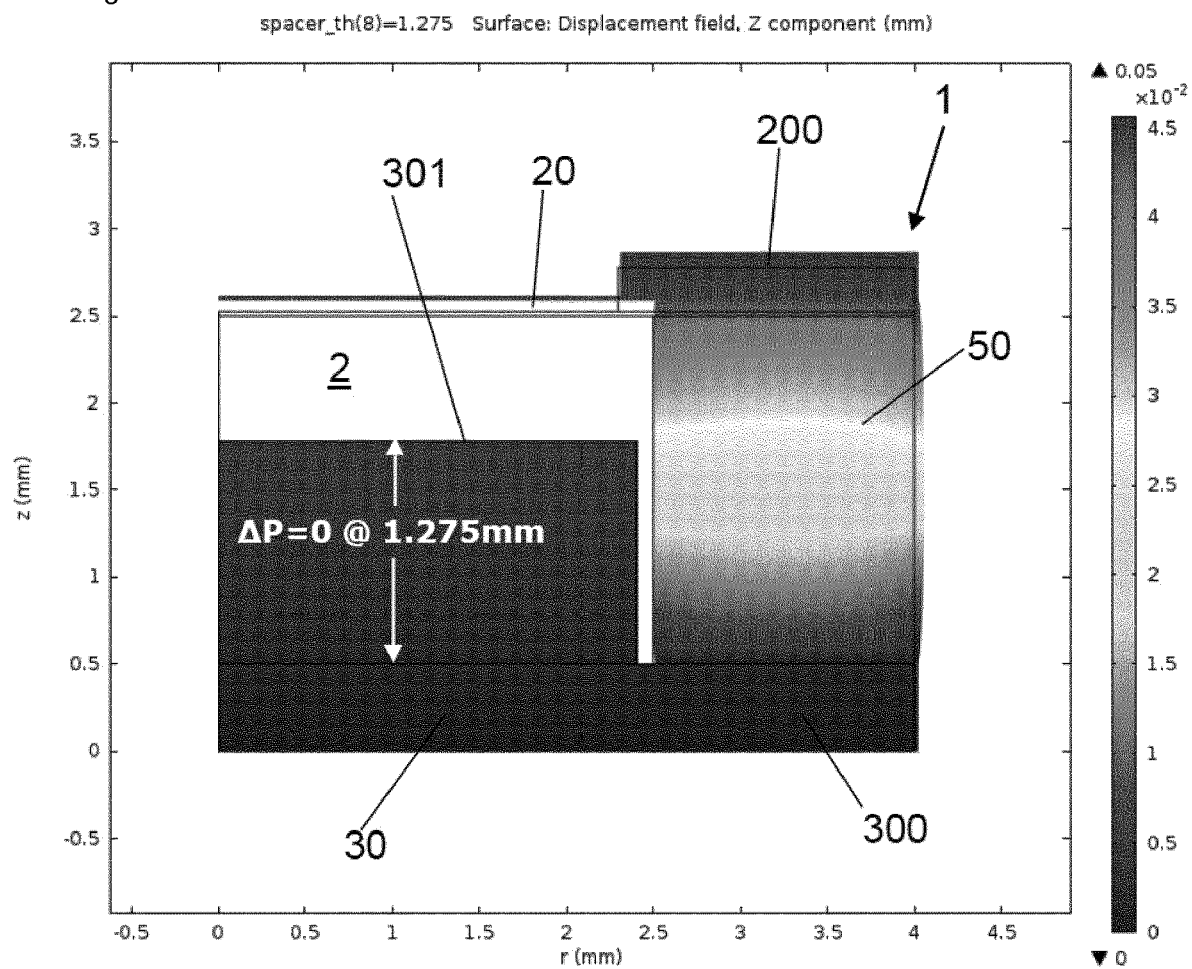
FIG. 10 shows a graph showing an expansion of the ring member with temperature.

FIG. 10 shows the typical displacement field (z component) of the ring member 50 for embodiments of the ring member 50 as shown in FIG. 9 indicating an expansion of the ring member in z direction (e.g. height of the ring member in z direction increases from 2.5 mm to 2.545 mm upon increasing the temperature of the lens by 60° C.

FIG. 10 indicates that the expansion of the ring member 50 in z direction can be amplified choosing the height of the ring member 50 in z direction to be larger than the (average) thickness of the liquid layer 2. Here, the ring member 50 may be made out of a polymer.

Figure 11:
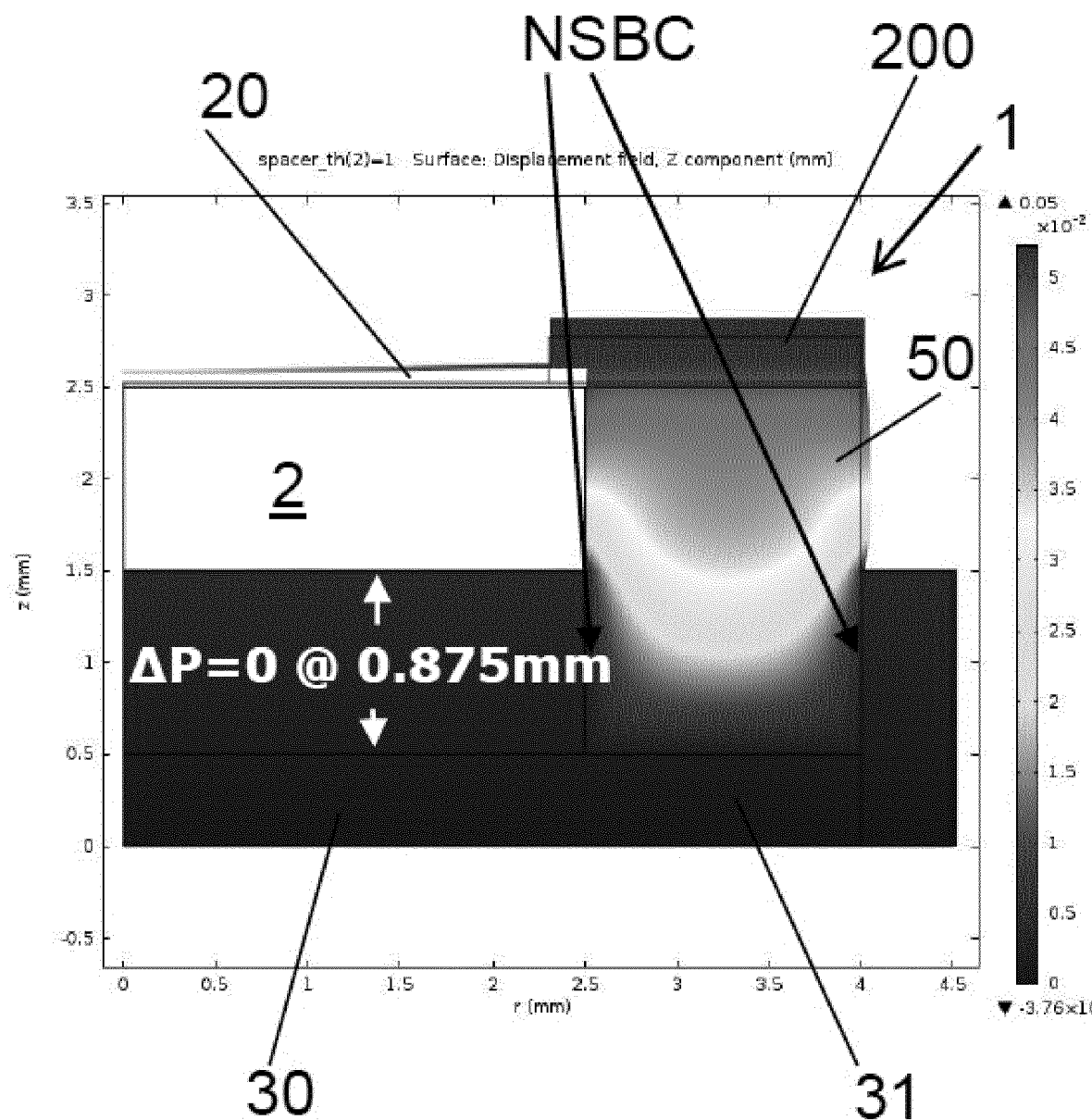
FIG. 11 shows a graph showing an expansion of the ring member (no slip boundary conditions)
Figure 12:
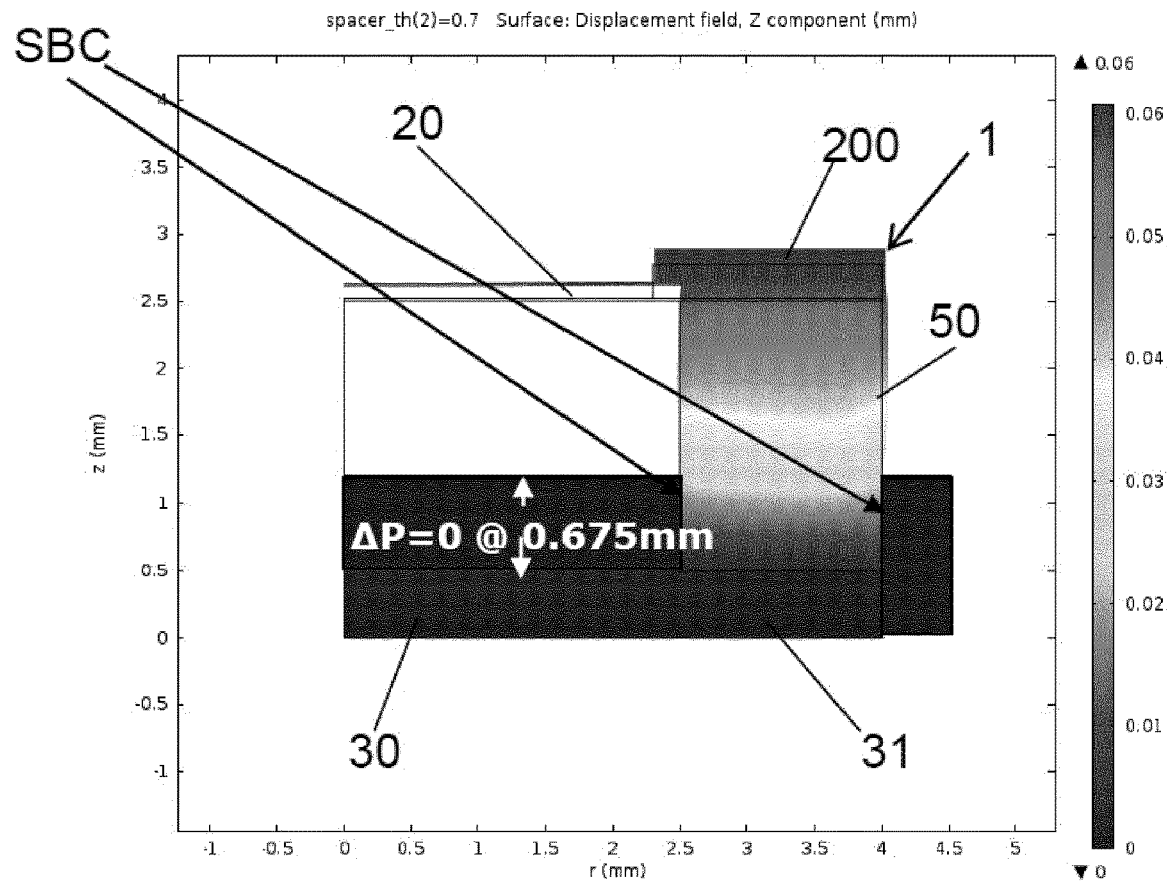
FIG. 12 shows a graph showing an expansion of the ring member (with slip boundary conditions)

Further, FIGS. 11 and 12 show the displacement field (z component) for embodiments where the ring member protrudes out of a groove 31. Here, the ring member's 50 expansion is amplified by not allowing it to expand laterally, so that due to its incompressibility it needs to move in the z direction. FIG. 11 shows the situation with no slip boundary conditions (NSBC), i.e., the ring member 50 is attached to the side walls of the groove 31, and FIG. 12 shows the situation with slip boundary conditions (SBC), where the ring member 50 can slip with respect to said side walls of the groove 31.

FIG. 13 shows a further embodiment of the kind shown in FIG. 8, wherein here, in contrast to FIG. 8 no gap is present between the protrusion 301 of the rigid member 30. Further, in contrast to FIG. 8, the rigid member comprises a first circumferential outer part 34 comprising the (circumferential) base 300 and the (circumferential) protrusion 301 as well as an inner transparent part (e.g. glass) 33 that is arranged in a through hole formed by the protrusion 301, wherein the inner part 33 comprises a smaller height in the z direction (i.e. in the direction of the optical axis O) so that again the rigid member 30 forms a recess 301b that corresponds to the first section V1 of the volume V having the first diameter D1 while the adjacent second section V2 of the volume V of the lens' container 100 comprises the larger second diameter D2. Here, the second section V2 of the volume V is delimited laterally by the ring member 50 so that a small expansion of the ring member 50 in z direction yields a relatively large increase of the second volume section V2. In other words, the effect of the expansion of the ring member 50 is also amplified by increasing its radius/(second) diameter D2 while limiting the container's volume V by adding a region with a low container depth (outside said recess or region 301b adjacent said inner part 33).

Again, as described before, the lens shaper may be connected to the face side 50a of the ring member 50, wherein the boundary region of the membrane 20 is arranged between said face side 50a and the lens shaper 200.

Further, FIG. 14 shows an embodiment of a lens 1 according to the invention which may be regarded as an inverted version of the embodiment shown in FIG. 6.

Here, the rigid member 30 is particularly not transparent, but comprises a through hole 303 (e.g. defining an aperture of the lens 1). The rigid member 30 further comprises a circumferential base 300 and a protrusion 301 protruding from said base 300 in the axial direction z towards a transparent cover element 101 (e.g. cover glass). The protrusion 301 and base 300 encompass the through hole 303 while the ring member 50 rests on the base 300 of the rigid member 30 and encompasses the protrusion 301, wherein the ring member 50 projects past the protrusion 301 of the rigid member 30 in the axial direction z. Further, the membrane 20 is attached to the rigid member 30, namely to a side of the base 300 of the rigid member 30 facing away from the cover element 101, such that it covers said through hole 303 while the transparent cover element 101 is connected with a base 102 of the cover element 101 to the face side 50a of the ring member 50 such that a circumferential gap V2 is formed between a face side 301a of the protrusion 301 and a base 102 of the cover element 101.

The optical liquid 2 is filled into a volume V of the container 100 of the lens 1, which volume V is delimited by the membrane 20, the cover element 101, the rigid member 30 and the ring member 50 forming said container 100, wherein the liquid 2 is arranged between the cover element 101 and the membrane 20 in the z direction. Thus, light can pass the lens 1 by passing through the membrane 20, through the liquid 2 residing in said volume and through the cover element 101.

Further, the cover element 101 comprises a protrusion 103 protruding from the base 102 of the cover element 101 into the through hole 303 defined by the circumferential rigid member 30.

Since the liquid 2 extends in said gap (second volume section) V2 between the face side 301a of the protrusion 301 of the rigid member 30 and the base 102 of the cover element 101 in the radial direction R up to the ring member 50 which has an inner diameter D2 that is significantly larger than the diameter D1 of the through hole 303 (first volume section V1) the expansion of the ring member 50 in the axial direction (z direction or direction of optical axis O) is amplified according to the principle described above.

A lens shaper (e.g. annular or circular member) which is not shown in FIG. 14 may contact the outer side of the membrane 20 that faces away from the cover element 101 and may thus define a curvature-adjustable area having a curvature that can be adjusted according to the principles described herein.

FIG. 15 shows a modification of the embodiment shown in FIG. 14, wherein in contrast to FIG. 14, the cover element 101 does not comprise said protrusion 103, but merely a flat base or body 101 that is connected to the face side 50a of the ring member 50 as described above. Also here, the volume V comprises a first section V1 corresponding to said through hole 303 having a (first) inner diameter D1 as well as an adjacent second section V2 that comprises a larger (second) diameter D2 corresponding to the inner diameter of the ring member 50, such that a relatively small expansion of the ring member 50 in the axial direction (z direction or direction of the optical axis O) leads to a relatively large increase of the volume V as described above that allows for compensating the thermal drift of the volume VL of the liquid 2 as also described above.

FIG. 16 shows a modification of the embodiment shown in FIG. 14, wherein here in contrast to FIG. 14, the rigid member 30 does not comprise a protrusion 301, but a circumferential groove 31 in which the ring member 50 is arranged such that it protrudes out of the groove 31 in the axial direction z with its face side 50a which in turn is connected to said cover element 101.

FIG. 17 shows a modification of the embodiment shown in FIG. 16, wherein now the cover element 101 does not comprise a protrusion 103, but a flat side facing the membrane 20.

FIGS. 18 and 19 relate to an embodiment of a lens 1 according to the invention, wherein a separate liquid chamber 80 is used to compensate the expansion of the main volume V of the container 100 of the lens 1.

According to FIG. 18 the lens 1 comprises a container 100 defining a volume V which is filled with the transparent liquid 2, wherein the container 100 further comprises a transparent and elastically deformable membrane 20 and a rigid member 30. The membrane 20 and the rigid member 30 face each other in the axial direction (i.e. z direction or direction of the optical axis O of the lens 1) and delimit said volume V, wherein the liquid 2 is arranged between the membrane 20 and the transparent rigid member 30 in said axial direction.

The rigid member 30 comprises a circumferential groove 31 on a side facing the membrane 20, wherein now a ring member 50 protrudes from an inner edge of the groove in the axial direction z. A face side 50a of the ring member 50 that faces away from the rigid member 30 is connected to a boundary region of the membrane 20. Thus, also this ring member 50 delimits the volume V of the container 100 and forms a circumferential lateral wall of the container 100. Further, the lens comprises a further ring member 81 that protrudes from an outer edge of the circumferential groove 31, so that the chamber 80 is formed between the two ring members 50, 81, which chamber 80 reaches into the groove and thus comprise a height/dimension in the axial direction z that is larger than the height of the liquid 2 in said direction. The further ring member 81 also comprises a face side 81a which is connected to the boundary region of the membrane 20. As described before, a lens shaper 200 is connected to the face sides 50a, 81a of the ring members 50, 81 such that the boundary region of the membrane 20 is arranged between the face sides 50a, 81a and the lens shaper 200. The chamber 80 is filled with a liquid 2', too, which liquid 2' may be the same liquid that is filled into said volume V of the lens 1.

In case the temperature of the lens 1 rises, so does the temperature of the liquid 2' which causes an expansion of the volume of the liquid 2' in the chamber 80 which leads to an expansion of the rings members in the axial direction z that is used to compensate the temperature-induced increase of the volume VL of the liquid residing in volume V as is shown in FIG. 19 which shows the displacement field for the z component. Here, the expansion of the rigid members/liquid 2 in the axial direction Z is amplified by giving the chamber/liquid 2' a height/dimension in the axial direction z that is larger than the thickness of the liquid layer 2 in the main volume V in the same direction z.

FIGS. 20 and 21 relate to an embodiment where the compensating expansion of a circumferential ring or lateral wall member 50 of the lens does not take place in the axial direction of the lens 1 (z direction of direction of the optical axis O), but in the radial direction R so that the ring member 50 bulges outwards.

The lens 1 comprises a container 100 that comprises a transparent rigid member 30 extending perpendicular to the optical axis O of the lens 1 and a membrane 20 extending along the rigid member 30 and facing the latter in the axial direction of the lens (i.e. z direction or direction of optical axis O). The container 100 further comprises a ring member 50 that is connected to the rigid member and forms a circumferential lateral wall of the container 100. The membrane 20 is connected to the ring member 50, so that the volume V of the container 100 that is filled with the optical liquid 2 is delimited by the rigid member 30, the ring member 50 and the membrane 20.

Now, in contrast to the embodiments described before, the lens 1 comprises a fixture means 60 that is designed to suppress an expansion of the ring member 50 in the axial direction z of the lens 1 by rigidly connecting the membrane 20 to the fixture means 60. Here the material of the fixture means is chosen such that it has a sufficiently small CTE so that the fixture means 60 expands way less than the liquid 2 or ring member 50. The ring member 50 is now configured such that it expands/bulges radially outwards in the radial direction R when the temperature of the lens 1/liquid 2 increases such that the volume V of the container 100 increases by an amount that matches the temperature-induced increase of the volume VL of the liquid 2. The ring member 50 may be formed out of a polymer.

FIG. 21 shows the displacement field of the z component for this buckling of the lateral container wall 50 to the outside.

FIGS. 22 and 24 relate to embodiments of the lens according to the invention where the compensation of the thermal drift of the volume of the optical liquid 2 is compensated by means of bimetal actuators. Such an actuator comprises two different metals which are joined together such that they generate a mechanical displacement when being heated due to their different linear CTE According to FIG. 22 the lens 1 comprises a container 100 that comprises a transparent rigid member 30 extending perpendicular to the optical axis O of the lens 1 and a membrane 20 extending along the rigid member 30 and facing the latter in the axial direction of the lens (i.e. z direction or direction of optical axis O). The container 100 further comprises a ring member 50 that is connected to the rigid member and forms a circumferential lateral wall of the container 100. The membrane 20 is connected to the ring member 50, so that the volume V of the container 100 that is filled with the optical liquid 2 is delimited by the rigid member 30, the ring member 50 and the membrane 20.

Now, in order to expand the dimension/height of the ring member 50 in the axial direction of the lens 1, the lens comprises a bimetal actuator 71 that connects the rigid member 30 to the ring member 50 via a rigid coupling means 73, wherein the bimetal actuator 71 extends radially outwards (in the radial direction R) from the rigid member 30, wherein an outer end section 74 of the bimetal actuator is connected to the rigid coupling means that is in turn connected to a face side 50a of the ring member 50 which face side 50a faces away from the rigid member 30. Here, the coupling means 73 particularly comprises an L-shaped profile or cross section having a first portion 75 extending in the axial direction (starting from the bimetal actuator 71) and a second portion 76 extending in the radial direction R.

When the bimetal actuator 71 gets heated due to an increasing temperature of the lens 1/liquid 2, it bends upwards in the axial direction of the lens when looking from the center of the lens and thus expands the ring member 50 in the latter direction resulting in a larger volume V of the container 100 that can accommodate the increased volume VL of the liquid 2.

Advantageously the bimetal actuator can be arranged radially outwards from the volume V and thus allows one to reduce installation space in the axial direction of the lens 1.

Furthermore, FIG. 23 shows a modification of the embodiment shown in FIG. 22, wherein in contrast to FIG. 22, the second portion 76 of the coupling means is replaced by a second bimetal actuator 72 so that now the coupling means 73 is reduced to a cylindrical member 73 extending in the axial direction of the lens 1, which member 73 connects the two bimetal actuators with each other. Now, when the bimetal actuators 71, 72 get heated, the bend away from each other leading to an increased expansion of the ring member in the axial direction of the lens 1 (i.e. z direction or direction of the optical axis O).

FIG. 24 shows an embodiment of the lens 1 according to the invention present invention, wherein the equilibrium position of the membrane 20 is adjusted depending on the temperature so as to compensate an increased volume of the liquid 2 due to an increased temperature of the lens 1/liquid 2.

For this, the lens 1 comprises a container 100 defining a volume V being filled with a liquid 2 of volume VL, wherein the container 100 comprises a transparent rigid member 30 extending perpendicular to the optical axis O of the lens 1 (i.e. perpendicular to the z direction or axial direction of the lens 1), a ring member 50 forming a lateral wall of the container 100 and a membrane 20 connected to the ring member 50, which membrane faces the rigid member 30.

The lens 1 further comprises a first and a second spring means 5, 6 being in thermal contact with the liquid 2, wherein each spring means 5, 6 is preloaded against the membrane 20 such that the latter is in a force equilibrium position, wherein said two spring means 5, 6 have a different change of Young's modulus over a certain temperature range so that said force equilibrium position of the membrane 20 actually depends on the temperature of the liquid 2 in a way that said thermal expansion and/or refractive index change of the liquid 2 is compensated.

Particularly, the first spring means is arranged in the volume V and preloaded against the membrane 20 under compression and comprises a relatively small change in Young's modulus over temperature, while the second spring means presses against the membrane 20 from the other side and comprises a relatively large change in Young's modulus over temperature. Particularly, the first spring means 5 is made out of a steel, particularly a stainless steel, while the second spring means 6 is particularly made out of Ti or Al.

FIG. 25 shows an embodiment of the lens according to the invention, where the compensation of a temperature drift of the volume VL of the liquid is accomplished by means of an expansion element 110 that is configured to bulge outwards.

Here, the lens 1 comprises a container 100 having a transparent bottom 111 that comprises an expansion element 110, which expansion element 110 is connected to a circumferential rigid element 30 that forms a lateral wall of the container 100 and faces the membrane 20 that is connected to the lateral wall 30.

The container 100 comprises a volume V that is filled with an optical liquid 2, wherein said volume V is delimited by the membrane 20, the lateral wall 30, and the bottom and expansion element 111, 110.

The expansion element 110 is in thermal contact with the liquid and is configured to expand with increasing temperature such that said bottom 111 of the container 100 bends outwards leading to an increase of the volume V that accommodates the increased volume VL of the liquid and particularly also compensates a change in the RI so that the focal length or power of the lens stays constant.

FIG. 26 shows an embodiment of a lens according to the invention, where a compensation of a thermal drift of the volume VL of the liquid is achieved by means of a contraction element 112, i.e., the material 112 contracts when heated up and compensates liquid expansion.

For this, the lens 1 comprises a container 100 having a transparent rigid member 30 that is formed as described with respect to FIG. 6, wherein the protrusion 301 of said rigid member 30 is encompassed by the circumferential contraction element 112 which in turn is encompassed by a circumferential lateral wall 113 of the container that is connected to the rigid member 30 and to the membrane 20 which faces the rigid member 30. Here, the container 100 comprises a volume V which is filled by an optical liquid 2, wherein the volume V is delimited by the rigid member 30, by the contraction element 112, by the lateral wall 113 and by the membrane 20.

The contraction element 112 is in thermal (e.g. direct) contact with the liquid 2 and is configured to contract when the temperature of the lens 1/liquid 2 increases such that the volume V of the container 100 increases and is thereby able to accommodate the liquid 2 with its increased volume VL while the curvature of the central area of the membrane 21 remains constant and in particular flat. In this embodiment, the contraction element 112 comprises a negative linear CTE.

FIG. 27 shows an embodiment of a lens according to the invention that allows to compensate a thermal drift of the refractive index (RI) of the liquid 2.

For this, the lens 1 comprises a container 100 defining a volume V that is filled with a transparent liquid 2, wherein the volume V is delimited by a membrane 20 that comprises a central area 21 defined by a lens shaper 200 that contacts the membrane 20. Further, the lens 1 comprises an actuator 40 that is configured to act on the membrane 20, particularly via the lens shaper 200, so as to adjust the curvature of said area 21 (see also above).

Here, the actuator (e.g. the lens shaper 200) is pretensioned against the membrane 20 by means of a spring means 401, 402 for compensating said change of the refractive index of the liquid 2 with temperature and the change in the liquids volume, wherein the spring constant of the spring means 401, 402 is chosen such that it changes with temperature in a way that the actuator 40 is less or more efficient at a lower temperatures to compensate for a more efficient or less efficient optical liquid 2.

Particularly, the lens shaper 200 is pretensioned against the membrane 200 by means of said spring means 401, 402. Here, one may arrange the membrane 20 on the top as well as (alternatively) on the bottom of the lens.

FIG. 28 shows an embodiment of a lens 1 according to the invention that also allows for compensating temperature induced changes in the liquid's volume V and RI.

Particularly, the lens comprises a pump 120 being configured to pump discrete amounts of liquid 2 into or out of the volume V of the container 100 of the lens by means of which the curvature of the lens can be adjusted so as to compensate a thermal expansion of the intrinsic volume VL of the liquid 2 and a change of the refractive index of the liquid 2 due to an increasing temperature of the liquid 2 at the same time.

FIG. 29 shows a further embodiment of a lens 1 according to the invention, wherein particularly this lens 1 also uses a pump mechanism in order to adjust the curvature of a central area 21 of a membrane 20 of the lens 1 and a mechanism to compensate thermal drifts in the volume VL of the liquid 2 and in the RI of the liquid 2.

Particularly the lens comprises a container 100 that encompasses a volume V which is separated into a lens volume V' and a reservoir volume V" being in flow connection with said lens volume V', wherein the reservoir volume V" is configured to expand (see e.g. below) when the temperature of the liquid 2 increases such that said reservoir volume V" increases, wherein said increase in reservoir volume V" corresponds to an increase of the volume VL of the liquid 2 that occurs when the temperature of the liquid 2 increases such that the curvature of said area 21 of the membrane 20 is adjusted such that the focal length of the lens remains essentially constant when the temperature of the lens 1/liquid 2 changes.

Particularly, the container 100 comprises a rigid member 30 that comprises a cylindrical lens barrel section 310 extending in the axial direction of the lens (i.e. in the z direction or direction of optical axis O) and a reservoir section 311 protruding from the lens barrel section 310 in the radial direction R that runs perpendicular to the axial direction of the lens 1, wherein the reservoir section 311 encompasses the reservoir volume V" and wherein the lens barrel section 310 encompasses the lens volume V'. In the lens barrel section 310, the lens volume V' is further delimited by the membrane 20 which is carried by a ring member 200 (e.g. lens shaper) and a transparent optical element 101 facing the membrane. The lens barrel section 310 may comprise a further transparent optical element 101' facing said optical element 101.

Further, the container 100 comprises a ring member 50, wherein said ring member 50 is connected to a face side 311a of the reservoir section 311 that faces away from the barrel section 310, wherein particularly the ring member 50 is arranged in a groove 315 formed in said face side 311a. Further, ring member 50 extends circumferentially along an extension plane that runs parallel to the optical axis O of the lens 1. Furthermore, the ring member 50 also delimits the reservoir volume V" and is in thermal contact with said liquid 2. For compensating a thermal drift of the volume VL of the liquid, the ring member 50 is configured to expand in the radial direction R when the temperature of the liquid 2 increases such that said reservoir volume V" increases, wherein said increase in the reservoir volume V" substantially matches an increase of the volume VL of the liquid 2 that occurs when the temperature of the liquid 2 increases such that the curvature of said area 21 of the membrane 20 of the lens remains essentially constant (except for the change in refractive index of the lens) when the temperature of the lens 1 and therefore of the liquid 2 increases.

Further, the lens 1 comprises an actuator 40 configured to adjust the curvature of said area 21 of the membrane 20 in order to adjust the focal length of the lens 1 by exerting a force onto the membrane 20. Here, the actuator is designed to push liquid out of said reservoir volume V" into the lens volume V' for adjusting the curvature of said area 21 of the membrane. In an actively temperature compensated system, this actuation can also be used to compensate for the thermal expansion of the fluid and the thermal drift of the RI. For this, the controlling unit may be configured to control the actuator accordingly, depending on a measured temperature in the lens 1.

As shown in FIG. 29, the actuator 40 may comprises a piston 44 that is configured to press against a deformable membrane 314 of the reservoir volume V", which membrane 314 is particularly connected to the ring member 50, wherein said membrane 314 comprises a circumferential boundary region 313 and a non deformable portion 312 which acts as a lever for the expansion of the ring member 50.

FIGS. 30 to 32 shows two further embodiments of the lens 1 according to the invention that use different measures to compensate a thermal drift of the liquid's volume VL and a thermal drift of the RI of the liquid 2

FIG. 30 shows an embodiment of a lens 1 according to the invention that comprises a container 100 that is configured as described with respect to FIG. 6, wherein the membrane 20 is contacted by a lens shaper 200 forming part of a compliant lens-shaper structure 210 that gets softer over temperature so that it accomplishes a compensation of the thermal drift of the RI.

In detail, this structure 210 (cf. FIG. 32) comprises a circumferential carrier 205 to which the lens shaper 200 that is surrounded by the carrier 205 is coupled via spring members 206, wherein each spring member 206 forms or comprises a lever for moving the lens shaper 200 in the axial direction of the lens 1. Here, the lens shaper 200 is formed as a cylindrical ring. The levers 206 are arranged in corresponding recesses 205a of the carrier 205 and extend tangentially with respect to the lens shaper 200, wherein the levers 206 are each connected to the lens shaper 200 via a first pin 206a extending in the radial direction R and to the carrier 205 via a second pin 206b which is offset from the first pin 206a to generate a lever effect enabling a lower actuator force while still generating a strong enough force on the lens shaper 200. This lever effect is also beneficial to have a finer control of the lens shaper movement while allowing for a larger coil movement. The levers 206 are configured to be actuated with the coil 41 to axially move the lens shaper 200 for adjusting the curvature of a central area 21 of the membrane 20 defined by the lens shaper 200.

Further, the container 100 comprising the rigid member 30, the ring member 50 and the membrane 20 is surrounded by a structure comprising a top ring magnet 42a a bottom ring magnet 42b and a return structure 600 in the form of a washer for guiding the magnetic flux of a coil 41 (see below), which washer 600 is arranged between the ring magnets 42a, 42b in the axial direction of the lens 1 (z direction or direction of the optical axis O). This structure in turn is surrounded by said (voice) coil 41 which is connected to the levers 206.

Further, the lens 1 comprises a top return structure 500 for guiding the magnetic flux of the top and bottom ring magnet 42a and 42b, which top return structure 500 rests with a circumferential portion 502 on the top ring magnet 42a and comprises heat exchange fins 503 that protrude from said portion 502 in the axial direction of the lens 1 towards the container 100.

Further, the bottom ring magnet 42b rests on a washer 601 which in turn rests on the structure 210 which in turn rests on a further washer 602 that comprises recesses 602a for the levers 206 of structure 210. Said structure 210 rests on a circumferential portion 604 of a cover ring 603 that comprises barrel clamps 605 protruding from the circumferential portion 604 in the axial direction of the lens 1 (away from the container 100). The barrel clamps 605 are used to connect the lens to further components such as a lens barrel.

FIG. 31 shows a further embodiment of a lens 1 according to the invention which also allows one to compensate both the thermal drift of the liquid's 2 volume VL and the thermal drift of the RI of the liquid 2.

Here, the container 100 is configured according to the principles of the embodiment shown in FIG. 16, wherein here, the lens shaper 200 of the structure 210 (cf. FIG. 32) contacts the membrane 20 of the container 100 and defines the area 21 of the membrane 20 whose curvature is to be adjusted by the actuator in order to tune the focal length of the lens 1. Further, the lens 1 according to FIGS. 31 and 32 comprises the same actuator comprising components 500, 42a, 600, 41, 42b as described before. It is to be noted however, that the washer 601 is not present in the embodiment of FIG. 31 and the bottom ring magnet 42b directly rests on washer 602 which comprises said recesses 602a for the levers 206. Further, in contrast to FIG. 30, the lens shaper 200 contacts the membrane from above and not from below as is the case in FIG. 30. Concerning the embodiment of the lens 1 shown in FIGS. 31 and 32, the actuator for actuating the lens shaper 200 works as follows. A coil is moving in the magnetic field generated by the ring magnet 42b and 42a. The force generated by the coil onto the lens shaper depends on the strength of the magnetic field generated by the ring magnets and the applied current to the coil.

While the thermal volume expansion of a liquid-based tuneable lens 1 can be compensated by the container design as describe herein, an additional thermal effect is the change of the refractive index (RI) of the liquid 2.

In this regard FIGS. 33 and 34 show embodiments of the present invention that relate to controlling the coil 41 of an actuator 40 (see also above) such that the thermal drift of the RI of the liquid 2 and the volume expansion with temperature can be compensated.

With most liquids 2, the refractive index decreases when the temperature increases so that light is less deflected when entering the liquid 2.

Further, the impact on the lens' focal length is dependent on the lens deflection (the higher the lens deflection, the bigger the effect of the refractive index change). Thus, in order to have a constant focal length over a temperature range, lens deflection has to be increased when the temperature increases; thus, the actuator force pushing on the membrane 20 has to be increased when the temperature increases. Depending on the thermal expansion of the liquid volume VL and the corresponding expansion of the volume V, the pushing force needs to be different for different temperatures.

In one embodiment shown in FIG. 33 the lens 1 comprises a current-controlled actuator 40 (e.g. voice coil actuator), i.e., the focal length is controlled by the said control unit using a pre-defined current-to-focal-length relationship, wherein the refractive index change is compensated by adding a temperature sensitive resistor 45 electrically in parallel to the actuator coil 41. The resistor 45 has to be thermally coupled to the lens 1 in a way that its temperature is close to the temperature of the liquid 2. Further, resistors R1 and R2 can be added. By choosing suitable values and temperature coefficients of the resistors 45, R1 and R2, the compensation can be calibrated so that with increasing temperature, increasing current flows through the actuator coil 41 and the force of the actuator 40 increases.

Similarly, if the actuator's voltage is controlled, the resistors 45, R1 and R2 can be electrically placed in series with the actuator coil 41, if their values are set accordingly, as shown in FIG. 34.

It is to be noted that the various embodiments described above may also be combined with each other, particularly in order to configure a lens 1 that allows for the compensation of both temperature-related drifts, namely the thermal drift of the liquid's volume VL as well as the thermal drift of the refractive index (RI) of the liquid 2.

Furthermore, as indicated in FIGS. 36 to 39, the present invention can also be used/adapted to situations where changes in the focal power of the lens 1 take place due to dynamical effects caused by temperature and temperature-dependent viscoelasticity.

Generally, as shown in FIG. 36 an optical lens 1 can be tuned by deflecting the membrane 20 and may compromises an actuator 40 for achieving this, wherein a desired focal power/focal length of the lens 1 can be reached by adjusting the membrane deflection, particularly curvature of said area 21 using the actuator 40.

The lens 1 may be subject to temperature-dependent variations such as environmental temperature, temperature induced changes in the refractive index RI of the lens 1, of material expansion coefficients, or of the liquid's volume. As a first estimate one may assume that the temperature is uniform throughout the lens 1 and no temperature distribution or gradient occurs inside the lens 1. However, the present invention allows also to also deal with non-uniform temperature distribution and time-dependent temperature changes.

Particularly, time-dependent temperature effects may occur when tuning the liquid lens 1. Particularly, spatially localized heat sources that change over time or when lens 1 is mechanically clamped/held in an apparatus that has a non-uniform heat transfer which can induce temperature gradients. Furthermore, the viscoelasticity of polymer materials that may be used for the membrane 20 of the lens 1 may be temperature dependent.

Tuning the lens 1 may in general be achieved by applying a defined electrical power to an appropriate electrical actuator 40 resulting in a change of the actuator force. As an example, in case of an electromagnetic actuator, the coil current may be changed. This causes a change in the heat dissipation of the actuator 40 acting as a local heat source. The local heat source of the actuator in proximity to the liquid 2 in the lens 1 container causes a heat convection inside the liquid 2 and thus a time-dependent temperature gradient TG inside the liquid 2.

Further, when the lens 1 is clamped by a material that has a different heat diffusion coefficient than air or the clamping consist of several materials, wherein some of these materials are heat isolating and some of them heat conducting, a constant but yet directional temperature gradient is created that may result in a situation where the lens calibration during production differs from the actual situation at the users and the desired focal power may not be reached.

To summarize, the liquid lens system 1 may be exposed to the environmental temperature change as well as internal heating by the actuator 40. Any change in applied electrical current changes the consumed power (heat dissipation) and consequently the corresponding temperature gradient.

To also account for non-uniform temperature distributions within the liquid 2 and to particularly compensate for these dynamical effects a compensation scheme is proposed that is particularly implemented into a control algorithm in an embodiment of the present invention, which control algorithm can be carried out by a control unit 46 of the lens that is configured to control the actuator 40 and thus the focal power of the lens 1.

For this, the liquid lens 1 might feature a feedback system based on values from sensors such as a temperature sensor 700, displacement sensor 702 (Hall sensors and optical sensors), a motion sensor 703, means to measure the motor power 704. Further, the lens may also comprise a heater 705 in order to influence the temperature of the lens 1.

Further, the liquid lens might feature a memory 701 to save the past sensor values measured by said sensor(s).

Further, the liquid lens 1 might feature calibration data obtained by calibrating the lens 1 during the production or by calibrating the lens in situ and recurrently in its final application.

According to an embodiment, a control algorithm as shown in FIG. 37 that utilizes the above described information based on a functional model is used to tune the lens 1 and to compensate for said time-dependent temperature changes.

Particularly, the control algorithm can compromise several sub control algorithms concentrating on different aspects to compensate drifts in the focal power that might act in parallel and in series.

FIG. 37 shows in detail one iteration step n of such a control algorithm according to the invention, wherein the numbering (i)-(iv) corresponds to consecutive steps carried out by the algorithm In detail, the exemplarily depicted scheme of the proposed drift compensation comprises according to FIG. 37 comprises two control loops that act in series.

Sub control algorithm ii accounts for time-dependent (dynamic) changes and heat gradients inside the lens liquid 2 due to time-dependent local heat sources while sub control algorithm iii accounts for changes in the temperature of the environment assuming a uniform heat distribution inside the lens liquid 2.

Particularly, the drift compensation may be based on a function describing the dynamical change of the liquid temperature, e.g. by the sum of several n-th order lag-elements. It dynamically adjusts the focal power which is an input for the static temperature drift calculation iii provided by the second sub control algorithm iii.

In this regard, FIG. 38 shows three different contributions to the total drift compensation in units of dpt over time that may be estimated with a control algorithm according to the invention.

The dynamical change in the local lens temperature may have different time scales, may depend on the magnitude of applied power and may have a directional dependence, i.e. can differ when increasing as compared to decreasing coil power.

Further, in an embodiment, the control algorithm according to the invention (particularly presented in FIG. 37) may compute a control signal, which can be an input signal for a current controller or a set signal for another control algorithm, such as a PID controller that may be configured for controlling the position/deflection of the membrane and that may utilize all sensor values of the lens 1.

However, as a basic estimate, local heat effects and local changes may be neglected and the temperature compensation can be reduced to control algorithm iii that accounts for e.g. changes in the refractive index, a temperature dependent change of material parameter, a change in the liquid volume, etc.

Particularly, in an embodiment, by comparing the signals of several sensor values one can estimate the discrepancy of the values to each other with respect to the expected value and estimate dynamical effects and tune the lens accordingly to keep the focal power constant.

In an embodiment of the present invention the functional parameters of the drift compensation can be determined in a calibration.

Calibration for compensation of these effects is performed by exposing the lens 1 to be calibrated to theses specific environmental conditions while recording both these conditions and the resulting optical system properties.

The lens/membrane 20 can be deflected by using different constant actuator forces at different temperatures and the corresponding sensor values can be measured.

During calibration, the heat gradient inside the lens liquid is kept constant.

In an additional calibration, the drift in focal power over a defined time can be measured and all necessary sensor values can be recorded simultaneously.

A fit to the recorded sensor values, applied power and measured focal power with an appropriate function yields the drift parameters of the lens 1 that can be saved.

Further, in an embodiment, several temperature sensors inside lens 1 at different positions such as close to the actuator 40 and/or in the proximity of the liquid 2 and/or lens container 100 may by implemented to measure temperature gradients directly. In particularly, ideally these temperature sensors shall be as far apart as possible from each other on a direct path between heat source(s) and liquid.

From the recorded calibration data compensation algorithms are then derived.

Further, in an embodiment of the present invention a second coil 43 is wound around the actuator coils 41 as shown in FIG. 39. The second coil 43 has half the windings 43a in a first direction and the other half 43b of the windings in the opposite direction resulting in a zero actuator net force.

As the second coils 43 do not exert any force, the electrical current flowing through the second coil 43 can be adjusted such that the total consumed power of the actuator coil 41 and the second coils 43 remains constant and the local heat source distribution does not change.

In a further embodiment of the present invention, said second coil 43 does not need to be wound in two directions. The ratio between the currents of coil 41 and 43 can be adjusted such that the total current is constant and the ratio ensures that the net force of the actuator 40 can be varied.

Further, in an embodiment of the present invention, a change in the actuator force does not only result into a local heating source but also a membrane strain softening caused by viscoelasticity depending on temperature.

Here, upon sudden changes and constant stress the deformable membrane may show a viscoelastic creep and viscoelastic relaxation following.

The viscoelasticity may be temperature dependent and time dependent and can also be accounted for (e.g. in a control algorithm according to the invention) when tuning the lens to a desired focal power In particular, a sudden increase in the membrane's 20 deflection, results into a creep of the membrane 20 (less deflection of the membrane than expected) while it slowly relaxes over time to the desired membrane deflection when applying a constant actuator force. A compensation for/counteracting of the actuator 40 following the creep of the membrane 20 results into a constant focal power.

A sudden decrease of the membrane deflection results into the a relaxation of the membrane 20 which slowly stiffens up over time.

Using position sensitive sensors or by measuring the deflection of the membrane 20 of the lens 1, this temperature dependent viscoelasticity can be compensated when controlling the lens 1.

Particularly, a control algorithm as described above can be implemented to model the temperature-dependent viscoelasticity using a functional model such as the sum of several n-th order lag elements. The time-constants for viscoelastic creep and viscoelastic relaxation may be different.

Further, the control principles and related features described in conjunction with FIGS. 36 to 39 may also be applied to the other embodiments described herein.

Furthermore, FIGS. 40 to 44 relate yet to another aspect of the present invention described herein, namely an optical device 10 in form of a tunable prism that may be created using a flexible body or container 803 incorporating two transparent cover elements 800, 801 and filled with an optical fluid or liquid 804. The prism angle can be modified by controlling the two optical planes spanned by the cover elements 800, 801.

Such a system 10 may be actuated by a variety of methods: a simple solution is to fix one plane 801 and use three pin assemblies 900 (at least two of which are adjustable) to define the free plane 800 (cf. FIG. 40, 42, 43, or 44).

The refraction of a beam L' through such a prism 10 as shown in the upper part of FIG. 41, wherein the beam L' enters the prism 10 normal to one surface 801 is given by the equation stated in FIG. 41 on the upper left hand side.

If the prism geometry is held constant through temperature change then the refraction is a function of temperature that depends on the thermal sensitivity of the indices of refraction.

The thermal sensitivity of a liquid 804 with a refractive index (RI) of n=1.29 and that is transparent for the wavelength of the deflected beam used in a liquid prism 10 is considerable. The liquid 804 can be a water-based solution, oil-based solution or a liquid polymer.

As an example, the drift introduced through temperature change for a liquid 804 with n=1.29 and dn/dt=−3.30E-04 that is also used for liquid lenses is detailed in the table stated in the lower part of FIG. 41.

Assuming the prism 10 is actuated by pins 900, the sensitivity of the system to RI change of the liquid 804 can be offset by the thermal expansion of the pins 900. Here, the thermal drift of the system 10 can be minimized if the pin's 900 CLTE equals 1.13E-03 (per degrees Celsius)

A first passive compensation may be achieved through the differential of the pin expansion ($\Delta T \times CLTE \times \Delta L$), cf. FIG. 42.

The calculated drift with actuators (pins 900) of CLTE=1.13E-03 (per degrees Celsius) is stated in the table in the lower part of FIG. 42 and features a reduction in beam angle drift by a factor of up to 24.

However, suitable actuation materials with CLTE 1.13E-03 (per degrees Celsius) are difficult to provide. Therefore, the invention particularly aims at amplifying the thermal expansion of a lower CLTE material.

Rather than utilizing the effective pin length differential $\Delta L$ it is particularly proposed to tune the CLTE of the respective pin 900 over the effective length proportionally to the tuning of the prism 10.

This can be achieved by having the pins or pin assemblies 900 consist of e.g. two different materials. The inner pin 902 is rotationally locked by a fixation means 905 and threaded (e.g. with a custom thread) into the outer pin 901 of the respective pin assembly 900. The effective length L of both pin assemblies 900 changes as the outer pin 901 is wound in and out.

Assuming the CLTE of the outer pin 901 is very low and can be neglected as compared to the CLTE of the inner pin 902 the specific compensation addressed above will be approximately achieved if:

$$\Delta Li \times CLTEi \text{ (inner pin)} = \Delta L \times CLTE \text{ (required)}$$

Particularly, this leads to a basic design of the embodiments shown in FIGS. 43 and 44

Here, preferably, only the outer pins 901 are adjusted.

Preferably, the inner and outer pins 901, 902 are made out of materials of significantly different CLTE (in the above example stainless steel as a material of the respective outer pin 901 and polyamide (particularly Nylon or polyamide 6.6, CAS Nr.: 32131-17-2) as a material of the respective inner pin 902 have been used for purposes of calculation).

Further, the inner pins 902 are preferably rotationally fixed (indicated by a green line). A corresponding fixation means 905 may be formed as a plate as indicated in FIG. 44 which prevents rotation of the inner pins 902. Due to said fixation 905 both threads are active when the outer pin is turned Unscrewing outer pin 901 that may engage with its outer thread 901a an inner thread 903a of holding means 903 results in an increase of the effective pin length L of the respective pin assembly 900. At the same time, the outer thread 902a of the inner pin 902 engages inner thread 901b of the outer pin 901 and the effective length Li of the inner pin 902 is prolonged due to rotational fixation of the inner pin 902.

Preferably, according to an embodiment, the outer thread 902a of the inner pin 902 has a different pitch, particularly larger pitch, than the outer thread 901a of the outer pin 901 (particularly said threads have the same direction).

Particularly, this relation depends on the refractive index RI that may decrease or increase with temperature as well as on the CLTEs of the outer 901 and inner pin 902.

In case the RI of the liquid 804 decreases with increasing temperature and the inner pins 901 have the higher CLTE (compared to the outer pins 901) then the threads 902a of the inner pins 902 will have pitch in an embodiment that is larger than the pitch of the threads 901a of the outer pins 901 (for all the actuating pin assemblies 900).

Particularly, the inner and outer pins pitch ratio is a function of the material CLTE and the required CLTE in case the pin 900 is made of a single material. Using different pins 901, 902 it is a function of the CLTE of the inner and outer pin 902, 901 and of the required CLTE (in the case of a typical liquid 804 and stainless steel/Nylon pins 900 a pitch ratio of 1.08 could result for instance).

Particularly, the two-pin-approach according to the invention using an inner and outer pin 902, 901 in each adjustable pin assembly 900 mimics a single pin solution using a single material. Advantageously, this approach allows one to yield large effective CLTE that are otherwise difficult to find in a single material. Depending on their lengths and pitches a much larger CLTE can be achieved (see calculations) and one can successfully compensate for refractive index changes.

As the pin assembly length L increases the ratio of the pins 901, 902 changes (and therefore the effective CLTE changes).

The images and calculations presented herein represent the case of an inner pin 902 with a higher CLTE than the outer pin 901. However, this can also be easily reversed if necessary.

The following calculation can be used to determine the pitch ratio discussed above:

t=temperature
Co=CLTE of outer pin 901 x=independent variable, e.g. time, tilt angle
Ci=CLTE of inner pin 902
Ceq=Equivalent CLTE of dL(x)
Pi=Pitch Inner Pin
Po=Pitch Outer Pin
Rp=Pitch ratio=Pi/Po $$dL(t)=dt(Ci \cdot Li+Co \cdot Lo)$$

For dL(t,x):

$$dL(t,x)=dt \cdot (Ci \cdot Li(t,x)+Co \cdot Lo(t,x))$$

$$Lo(x)=Lo(0)-dL(x)/(Rp-1)$$

$$Li(x)=Li(0)+dL(x)\cdot Rp/(Rp-1)$$

$$dL(t,x)=dt(Co\cdot(Lo(0)-dL(x)/(Rp-1))+Ci\cdot(Li(0)+dL(x)\cdot Rp/(Rp-1)))$$

$$=dt(Ci\cdot Li(0)+Co\cdot L(0))+dt\cdot dL(x)((Ci\cdot Rp-Co)/(Rp-1))$$

$$\therefore dL(t,x)-dL(t,0)=dt\cdot dL(x)((Ci\cdot Rp-Co)/(Rp-1))$$

i.e. The thermal expansion introduced from a length differential dL(x) a function of Rp, Co and Ci and is therefore constant through the operating range acting per single material of:

$$CLTEequivalent=Ceq=((Ci\cdot Rp-Co)/(Rp-1))$$

And the Pitch ratio can be calculated for a desired effective CLTEequiv (Ceq):

$$Ceq=((Ci\cdot Rp-Co)/(Rp-1))$$

$$\therefore Ceq\cdot Rp-Ceq=(Ci\cdot Rp-Co)$$

$$\therefore Rp=(Ceq-Co)/(Ceq-Ci)$$

To summarize, the present invention allows to increase the control resolution (by a factor of 12 in the example presented above) and thus avoids the need for very fine pitch threads.

By using equal pitches the approach can also be used to make a constant length rod with a tunable CLTE.

The invention claimed is:

1. Lens, comprising:
    a container (100) defining a volume (V) which is filled with a transparent liquid (2), wherein the container (100) comprises a transparent and elastically deformable membrane (20) and a rigid member (30), wherein the membrane (20) and the rigid member (30) delimit said volume (V), and
    a lens shaping element (200) that contacts the membrane (20) and defines an area (21) of said membrane (20), which area (21) has an adjustable curvature for adjusting the focal length of the lens (1),
    the lens (1) is configured to compensate a thermal expansion of the liquid (2) and/or a change of the refractive index of the liquid (2) due to an increased temperature of the liquid (2) in order to reduce an unwanted thermally induced change of the focal length of the lens (1),
    the container (100) further comprises a ring member (50) for compensating said thermal expansion of the liquid (2), wherein said ring member (50) is connected to the rigid member (30) and extends circumferentially along an extension plane and comprises a dimension in a direction (z) perpendicular to said extension plane characterized in that the rigid member (30) comprises a linear thermal expansion coefficient that is smaller than the linear thermal expansion coefficient of the ring member (50), and the ring member (50) is arranged in a circumferential groove (31) of the rigid member (30).

2. Lens according to claim 1, characterized in that the linear thermal expansion coefficient of the ring member (50) is one of: equal to, smaller, or larger than the linear thermal expansion coefficient of said liquid (2).

3. Lens according to claim 1, characterized in that the ring member (50) is in thermal contact with said liquid (2) and is configured to expand when the temperature of the liquid (2) increases such that said volume (V) increases, wherein said increase in volume (V) corresponds to an increase of the volume (VL) of the liquid (2) that occurs when the temperature of the liquid (2) increases such that the curvature of said area (21) of the lens (1) remains constant when the temperature of the liquid (2) increases.

4. Lens according to claim 1, characterized in that said volume (V) comprises a first section (V1) having a first diameter (D1), and wherein said volume (V) comprises an adjacent second section (V2) having a second diameter (D2) that is larger than the first diameter (D1) of the first section (V1), and wherein said sections (V1, V2) comprise a different height in a direction perpendicular to said diameters (D1, D2).

5. Lens according to claim 1, characterized in that the ring member (50) protrudes out of said groove (31) in said direction (D) normal to said extension plane, or wherein said ring member (50) is completely arranged in said groove (31).

6. Lens according to claim 1, characterized in that the thermal expansion of the ring member (50) in said direction (z) is suppressed by a fixture means (60) such that the ring member (50) predominantly thermally expands in a radial direction (R) running perpendicular to said direction (z).

7. Lens according to claim 1, characterized in that the lens (1) comprises a bimetal actuator (71, 72) which is configured to expand the ring member (50) or container (100) in said direction (z) for compensating a thermal expansion of the liquid in said volume.

8. Lens according to claim 1, characterized in that the container (100) further comprises a chamber (80) for compensating said thermal expansion of the liquid (2), which chamber (80) defines a further volume (V3) separated from said volume (V), which further volume (V3) is filled with a further liquid (2'), wherein particularly said further volume (V3) comprises a dimension in said direction (z) that is larger than the dimension of the liquid (2) or volume (V) in the same direction (z), wherein particularly said further volume (V3) extends into a circumferential groove (32) of the rigid member (30), and is further delimited by said ring member (50) and a further ring member (81), wherein said ring member (50) protrudes from an inner edge (32a) of the groove (32) in said direction (z) and is encompassed by the further ring member (81) that protrudes from an outer edge (32b) of the groove (32) in said direction (z).

9. Lens according to claim 1, characterized in that the rigid member (30) comprises a base (300) extending along said extension plane and a protrusion (301) protruding from the base (300) in said direction (z) normal to said extension plane, wherein said ring member (50) encompasses said protrusion (301), and wherein particularly the ring member (50) and said protrusion (301) define a circumferential gap (35) being filled with said liquid (2), which gap (35) forms part of said volume (V) of the container (100).

10. Lens according to claim 9, characterized in that said protrusion (301) comprises a face side (301a) facing said membrane (20), wherein said face side (301a) comprises a recess (301b).

11. Lens according to claim 1, characterized in that the rigid member (30) forms a transparent optical element facing the membrane (20), particularly a corrective optical element, particularly a lens.

12. Lens according to claim 1, characterized in that the membrane (20) is connected to the ring member (50), particularly to a face side (50a) of the ring member (50) facing away from the rigid member (30).

13. Lens according to claim 1, characterized in that rigid member (30) comprises a through hole (303) for passing light through the rigid member (30), wherein the membrane (20) is connected to the rigid member (30), and wherein a transparent optical element (90) is connected to the ring member (50) and faces the membrane (20).

14. Lens according to claim 1, characterized in that for compensating said thermal expansion of the liquid (2), the lens (1) comprises a first and a second spring means (5, 6) being in thermal contact with the liquid (2), wherein each spring means is preloaded against the membrane (20) such that the latter is in a force equilibrium position, wherein said two spring means (5, 6) have a different change of Young's modulus over a certain temperature range so that said force equilibrium position of the membrane (20) depends on the temperature of the liquid (2) in a way that said thermal expansion and/or refractive index change of the liquid (2) is compensated such as to maintain the focal length of the lens constant.

15. Lens according to claim 1, characterized in that the container (100) comprises a bottom (111) comprising an expansion element (110), which expansion element (110) is connected to the rigid element (30) and faces the membrane (20), wherein the expansion element (110) is configured to expand with increasing temperature such that said bottom (111) of the container (100) bends outwards for compensating the thermal expansion of the liquid (2).

16. Lens according to claim 1, characterized in that the container (100) comprises a contraction element (112) comprising a negative thermal expansion coefficient, wherein the contraction element (112) participates in delimiting said volume (V) of the container (100) such that the contraction element (112) contracts with increasing temperature leading to an increased volume of the container (V) for compensating said thermal expansion of the liquid (2).

17. Lens according to claim 1, characterized in that the lens comprises a pump (120) being configured to pump discrete amounts of liquid (2) into or out of the volume (V) so as to compensate a thermal expansion of the liquid (2) and a change of the refractive index of the liquid (2) due to an increasing temperature of the liquid (2) at the same time.

18. Lens according to claim 1, characterized in that said volume (V) is separated into a lens volume (V') and a reservoir volume (V") being in flow connection with said lens volume (V'), wherein the reservoir volume (V") is configured to expand when the temperature of the liquid (2) increases such that said reservoir volume (V") increases, wherein said increase in reservoir volume (V") corresponds to an increase of the volume (VL) of the liquid (2) that occurs when the temperature of the liquid (2) increases such that the curvature of said area (21) of the membrane (20) remains constant when the temperature of the liquid (2) increases.

19. Lens according to claim 18, characterized in that the actuator (40) is designed to push liquid (2) out of the reservoir volume (V") into the lens volume (V') for adjusting the curvature of said area (21) of the membrane (20).

20. Lens according to claim 1, characterized in that the lens (1) further comprises an actuator (40) configured to adjust the curvature of said area (21) of the membrane (20) in order to adjust the focal length of the lens (1) by exerting a force onto the membrane (20).

21. Lens according to claim 20, characterized in that the actuator is configured to act on the membrane (20) in order to adjust the curvature of said area (21) via at least one spring element (206) comprising a lever.

22. Lens according to claim 20, characterized in that said actuator (40) is pretensioned against the membrane (20) by means of a spring member (401, 402) for compensating said change of the refractive index of the liquid (2) and/or the thermal expansion of the liquid (2) with temperature.

23. Lens according to claim 20, characterized in that for compensating said change of the refractive index of the liquid (2) and/or the thermal expansion of the liquid (2) said actuator (40) comprises a coil (41) and a temperature-dependent resistor (45) being thermally coupled to the liquid (2), wherein the resistor (45) is configured such that when the temperature of the liquid (2) increases an electrical current that flows through the coil (41)
    decreases such that the force of the actuator (40) onto the membrane (20) decreases, too, or
    increases such that the force of the actuator (40) onto the membrane increases, too.

24. The lens according to claim 1, characterized in that the lens (1) is configured to compensate a thermal expansion or contraction of the liquid (2) and/or a change of the refractive index of the liquid (2) due to a change in temperature of the liquid (2) in order to reduce an unwanted thermally induced change of the focal length of the lens (1).

25. The lens according to claim 24, characterized in that said change in temperature of the liquid (2) results from an external temperature change and/or at least one internal heat source of the lens (1).

26. The lens according to claim 24, characterized in that said change in temperature results in a non-uniform distribution of the temperature of the liquid (2).

27. The lens according to claim 24, characterized in that said change in temperature is time-dependent.

28. Lens according to claim 1, characterized in that the lens (1) comprises an actuator (40) configured to adjust the curvature of said area (21) of the membrane (20) in order to adjust the focal length of the lens (1).

29. The lens according to claim 28, characterized in that the lens (1) comprises a control unit (46) that is configured to provide a control signal for controlling said actuator (40) so as to adjust the curvature of said area (21) of the lens, wherein said control signal is generated such that it compensates for said change in temperature.

30. The lens according to claim 29, characterized in that the lens (1) comprises at least one sensor, wherein the control unit (46) is configured to generate said control signal using values from the at least one sensor, wherein said at least one sensor is particularly one of: a temperature sensor (700) configured to measure a temperature inside the lens (1) or close to the lens (1), a displacement sensor (702) configured to measure a displacement of the actuator (40) or the membrane (20), a motion sensor (703) configured to detect a relative motion or acceleration of the lens (1) with respect to an environment of the lens (1), a sensor (704) configured to measure the power of said actuator (40).

31. The lens according to claim 29, characterized in that the control unit (46) is configured to execute a control algorithm (ii, iii) that generates said control signal using said values and/or calibration data as well as a functional model in order to compensate for said change in temperature.

32. The lens according to claim 31, characterized in that the control algorithm compromises at least two sub control algorithms (ii, iii), particularly relating to different aspects of compensating a thermal drift in the focal length of the lens (1), which sub control algorithms are executed in parallel or in series by the control unit (46).

33. The lens according to claim 32, characterized in that the control algorithm comprises a first and a second sub control algorithm (ii, iii), wherein the control unit (46) is configured to execute these two sub control algorithms (ii, iii) in series, wherein the first sub control algorithm (ii) accounts for time-dependent changes in temperature of the liquid (2), particularly a temperature gradient, while the second sub control algorithm (iii) accounts for an overall change in the temperature of the liquid (2) assuming a uniform heat distribution inside the liquid (2) of the lens (1).

34. The lens according to claim 33, characterized in that, the first sub control algorithm (ii) uses a functional model describing said time-dependent changes in the temperature of the liquid (2), wherein said first sub control algorithm (ii) is configured to dynamically adjust the focal length of the lens (1), which adjusted focal length forms an input for said second sub control algorithm (iii).

35. The lens according to claim 1, characterized in that the lens (1) comprises a memory (701) for storing said values measured by said at least one sensor.

36. The lens according to claim 1, characterized in that the lens (1) comprises calibration data obtained by calibrating the lens (1) and stored in a calibration data memory.

37. The lens according to claim 28, characterized in that the actuator (40) comprises at least a first coil (41) for adjusting the curvature of said area (21) of the membrane (20) of the lens (1), and a second coil (43) wound around said at least one first coil (41) of the actuator (40).

38. The lens according to claim 37, characterized in that the second coil (43) comprises a plurality of windings, wherein one half (43a) of the windings is wound in a winding direction while the other half (43b) of the windings is wound in the opposite winding direction so that the second coil (43) does not exert any force on the membrane (20), wherein the lens (1) is configured to adjust a an electrical current flowing through the second coil (43) such that a total consumed power of the at least one first coil (41) and the second coil (43) remains constant and a local heat source distribution generated by the actuator (40) does not change.

39. The lens according to claim 37, characterized in that the lens (1) is configured to adjust a ratio between the electrical currents in said at least one first coil (41) and in said second coil (43) such that the total power is constant and a local heat source distribution generated by the actuator (40) does not change.

40. The lens according to claim 28, characterized in that the actuator (40) of the lens (1) is configured to adjust the curvature of said area (21) of the membrane (20) of the lens (1) during a duty cycle, wherein the lens (1) is configured to drive the actuator (40) at a different power outside the respective duty cycle, wherein said power is chosen such that the average total power of the actuator (40) remains constant.

41. The lens according to claim 28, characterized in that the lens (1) is configured to compensate for a temperature gradient inside the liquid (2) using at least one of: a spatial separation of the actuator (40) from the container (100) of the liquid (2), a thermal insulation, arranging the membrane (20) inside or on a lens shaping element (200) or inside or on a holding apparatus that is configured to induce a counteracting temperature gradient, a heater (705) comprised by the lens (1), which heater (705) is configured to keep the lens temperature constant, an active or a passive cooling means.

42. The lens according to claim 41, characterized in that the lens (1) is configured to measure the deflection of the membrane (20) to determine said strain softening of the membrane (20), wherein said control unit (46) is configured to compensate the temperature dependent strain softening.

43. The lens according to claim 28, characterized in that the actuator (40) is configured to generate an actuator force for adjusting the curvature of said area (21) of the membrane (20) of the lens (1), wherein a change in actuator force results in a membrane strain softening caused by viscoelasticity of the membrane (20) depending on temperature.

44. Lens, comprising:
a container (100) defining a volume (V) which is filled with a transparent liquid (2), wherein the container (100) comprises a transparent and elastically deformable membrane (20) and a rigid member (30), wherein the membrane (20) and the rigid member (30) delimit said volume (V), and
a lens shaping element (200) that contacts the membrane (20) and defines an area (21) of said membrane (20), which area (21) has an adjustable curvature for adjusting the focal length of the lens (1),
the lens (1) is configured to compensate a thermal expansion of the liquid (2) and/or a change of the refractive index of the liquid (2) due to an increased temperature of the liquid (2) in order to reduce an unwanted thermally induced change of the focal length of the lens (1),
the container (100) further comprises a ring member (50) for compensating said thermal expansion of the liquid (2), wherein said ring member (50) is connected to the rigid member (30) and extends circumferentially along an extension plane and comprises a dimension in a direction (z) perpendicular to said extension plane
characterized in that the rigid member (30) comprises a linear thermal expansion coefficient that is smaller than the linear thermal expansion coefficient of the ring member (50), and the thermal expansion of the ring member (50) in said direction (z) is suppressed by a fixture means (60) such that the ring member (50) predominantly thermally expands in a radial direction (R) running perpendicular to said direction (z).

45. Lens, comprising:
a container (100) defining a volume (V) which is filled with a transparent liquid (2), wherein the container (100) comprises a transparent and elastically deformable membrane (20) and a rigid member (30), wherein the membrane (20) and the rigid member (30) delimit said volume (V), and
a lens shaping element (200) that contacts the membrane (20) and defines an area (21) of said membrane (20), which area (21) has an adjustable curvature for adjusting the focal length of the lens (1),
the lens (1) is configured to compensate a thermal expansion of the liquid (2) and/or a change of the refractive index of the liquid (2) due to an increased temperature of the liquid (2) in order to reduce an unwanted thermally induced change of the focal length of the lens (1),
the container (100) further comprises a ring member (50) for compensating said thermal expansion of the liquid (2), wherein said ring member (50) is connected to the rigid member (30) and extends circumferentially along an extension plane and comprises a dimension in a direction (z) perpendicular to said extension plane
characterized in that the rigid member (30) comprises a linear thermal expansion coefficient that is smaller than the linear thermal expansion coefficient of the ring member (50) and the container (100) further comprises a chamber (80) for compensating said thermal expansion of the liquid (2), which chamber (80) defines a further volume (V3) separated from said volume (V), which further volume (V3) is filled with a further liquid (2'), wherein particularly said further volume (V3) comprises a dimension in said direction (z) that is larger than the dimension of the liquid (2) or volume (V) in the same direction (z), wherein particularly said further volume (V3) extends into a circumferential groove (32) of the rigid member (30), and is further delimited by said ring member (50) and a further ring member (81), wherein said ring member (50) protrudes from an inner edge (32a) of the groove (32) in said direction (z) and is encompassed by the further ring member (81) that protrudes from an outer edge (32b) of the groove (32) in said direction (z).

46. Lens, comprising:

a container (100) defining a volume (V) which is filled with a transparent liquid (2), wherein the container (100) comprises a transparent and elastically deformable membrane (20) and a rigid member (30), wherein the membrane (20) and the rigid member (30) delimit said volume (V), and a lens shaping element (200) that contacts the membrane (20) and defines an area (21) of said membrane (20), which area (21) has an adjustable curvature for adjusting the focal length of the lens (1), the lens (1) is configured to compensate a thermal expansion of the liquid (2) and/or a change of the refractive index of the liquid (2) due to an increased temperature of the liquid (2) in order to reduce an unwanted thermally induced change of the focal length of the lens (1), the container (100) further comprises a ring member (50) for compensating said thermal expansion of the liquid (2), wherein said ring member (50) is connected to the rigid member (30) and extends circumferentially along an extension plane and comprises a dimension in a direction (z) perpendicular to said extension plane characterized in that the rigid member (30) comprises a linear thermal expansion coefficient that is smaller than the linear thermal expansion coefficient of the ring member (50), the rigid member (30) comprises a base (300) extending along said extension plane and a protrusion (301) protruding from the base (300) in said direction (z) normal to said extension plane, wherein said ring member (50) encompasses said protrusion (301), and wherein particularly the ring member (50) and said protrusion (301) define a circumferential gap (35) being filled with said liquid (2), which gap (35) forms part of said volume (V) of the container (100), and said protrusion (301) comprises a face side (301a) facing said membrane (20), wherein said face side (301a) comprises a recess (301b).

* * * * *